United States Patent [19]

Yamaguchi et al.

[11] Patent Number: 4,847,648
[45] Date of Patent: Jul. 11, 1989

[54] VARIFOCAL CAMERA

[75] Inventors: Kunihisa Yamaguchi, Ichikawa; Kohichi Nishi; Ikuya Tsurukawa, both of Yokohama; Kosaku Sawabe, Narita, all of Japan

[73] Assignee: Ricoh Company, Ltd., Tokyo, Japan

[21] Appl. No.: 155,501

[22] Filed: Feb. 12, 1988

[30] Foreign Application Priority Data

Feb. 14, 1987 [JP] Japan .................................. 62-30687

[51] Int. Cl.⁴ ................................................ G03B 1/18
[52] U.S. Cl. .................................. 354/195.12; 354/288
[58] Field of Search ........... 354/195.1, 195.11, 195.12, 354/195.13, 288

[56] References Cited

U.S. PATENT DOCUMENTS 4,171,894 10/1979 Yamada .................................. 354/288
4,597,657 7/1986 Wakabayashi .................. 354/195.12
4,643,555 2/1987 Wakabayashi .................. 354/195.12
4,721,972 1/1988 Wakabayashi ...................... 354/288

FOREIGN PATENT DOCUMENTS 2704892 8/1978 Fed. Rep. of Germany ...... 354/288
0175038 9/1985 Japan .................................. 354/288

Primary Examiner—Russell E. Adams
Attorney, Agent, or Firm—Oblon, Spivak, McClelland, Maier, & Neustadt

[57] ABSTRACT

A varifocal camera, comprising a photographic lens barrel having a photographic lens able to change the focal distance and adapted to move rearwardly when the photographic lens is transferred to the first focal distance side and move forwardly when the lens is transferred to the second focal distance side, a photographic lens barrier movable between the opening position at which the photographic lens is exposed and the closing position at which photographic lens is screened, and a finder barrier movable between the opening position at which the finder lens is exposed and the closing position at which the finder lens is screened.

2 Claims, 31 Drawing Sheets

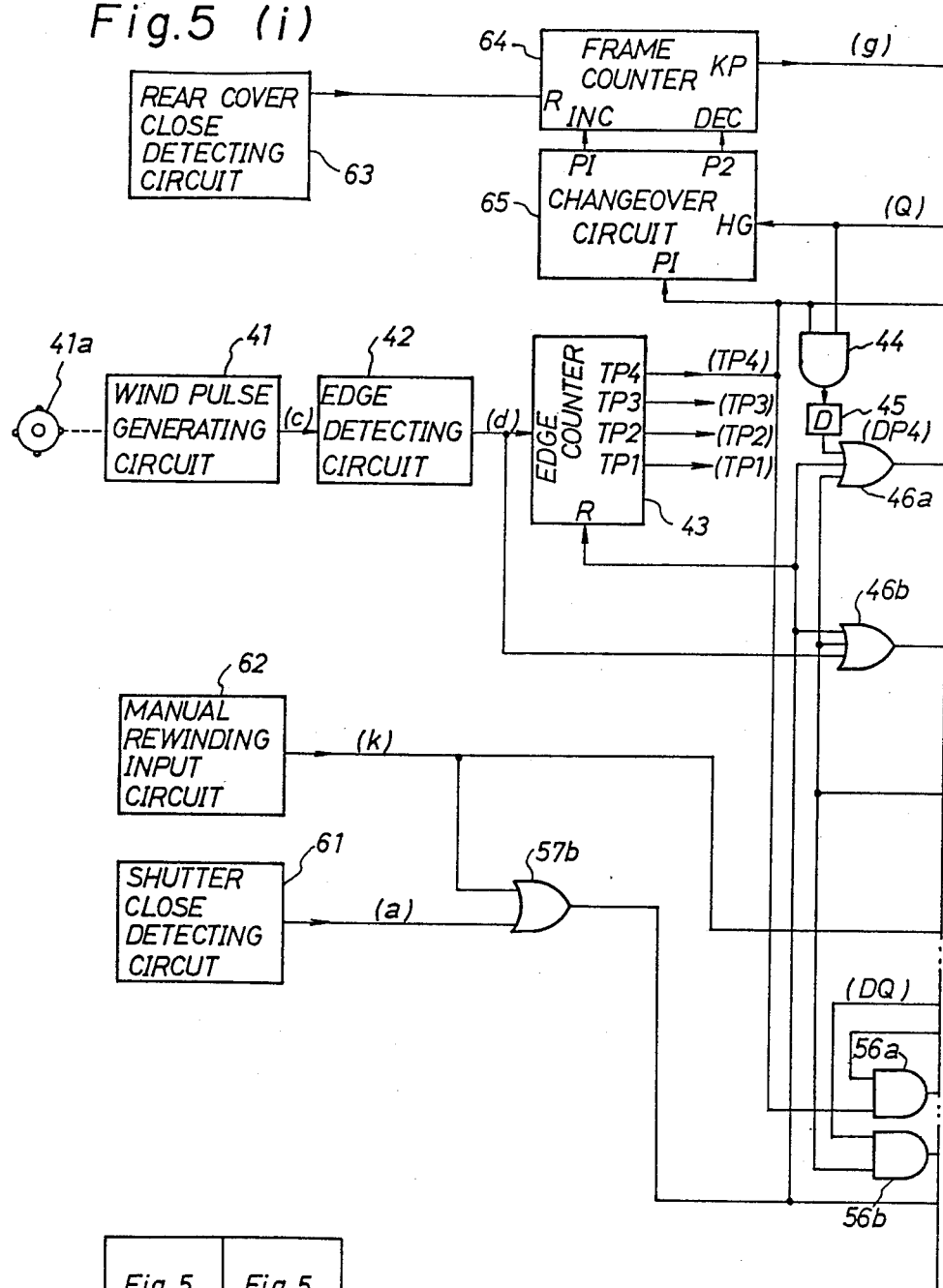

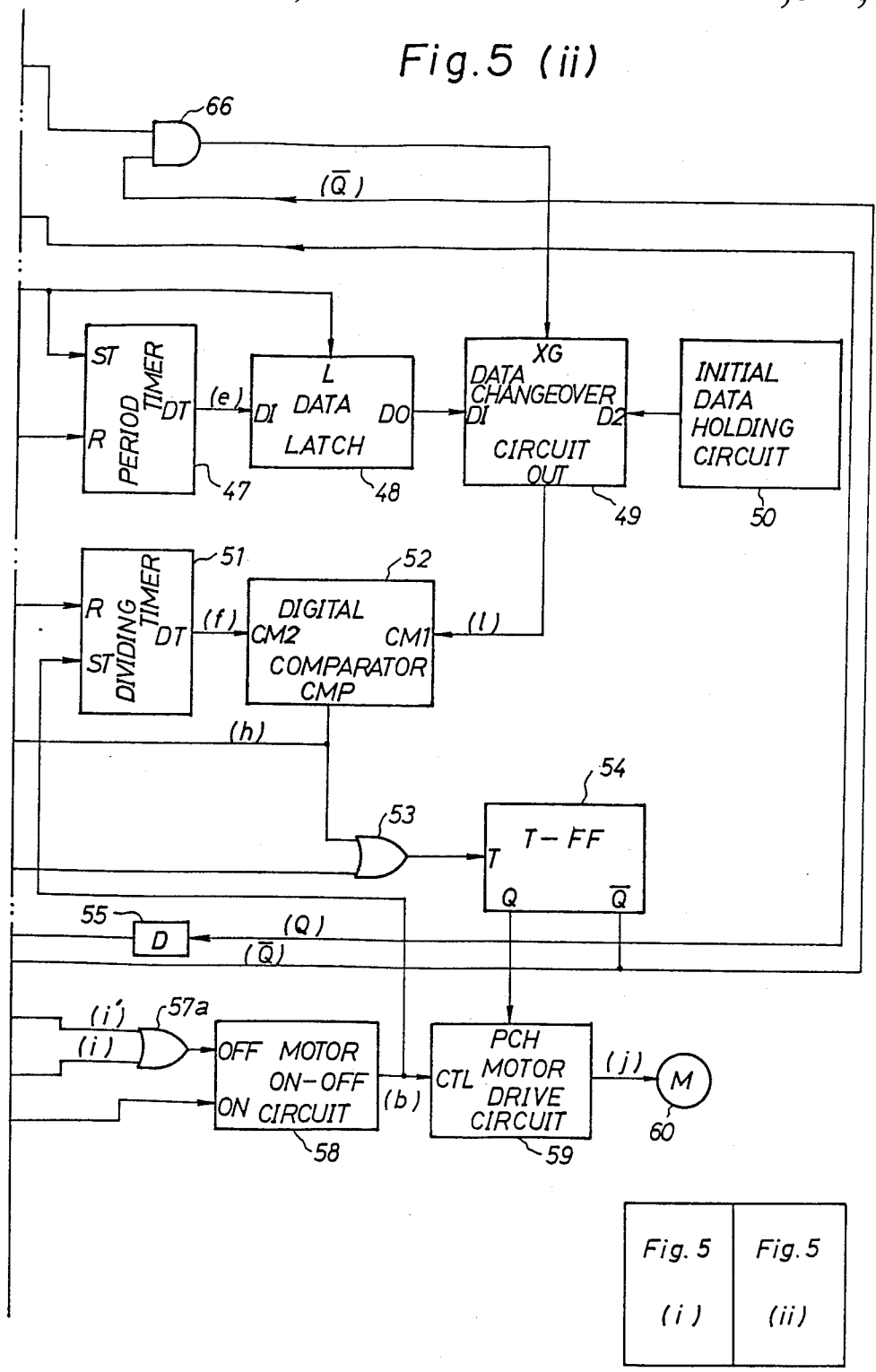
Fig. 5 (ii)

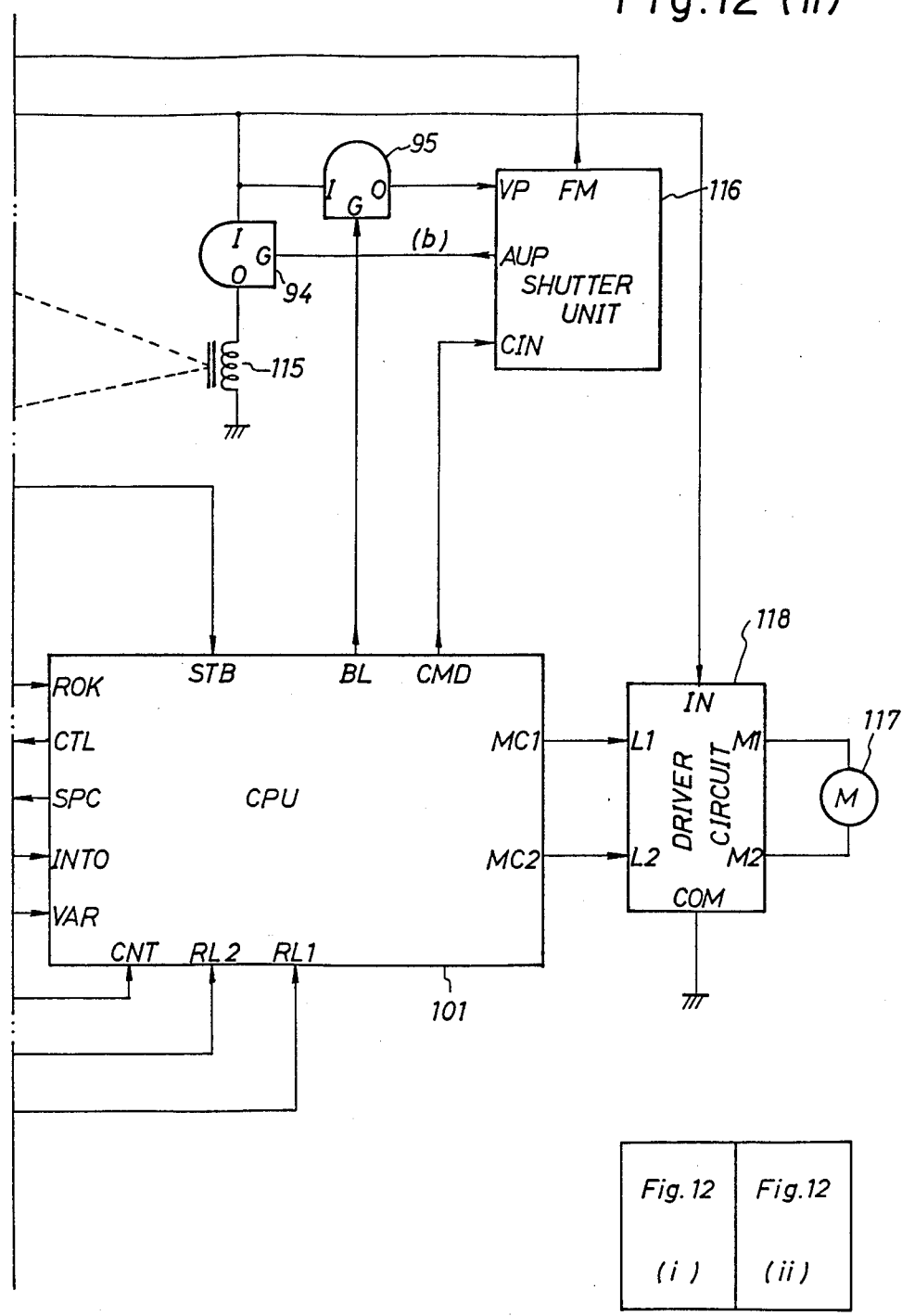
Fig.12 (ii)

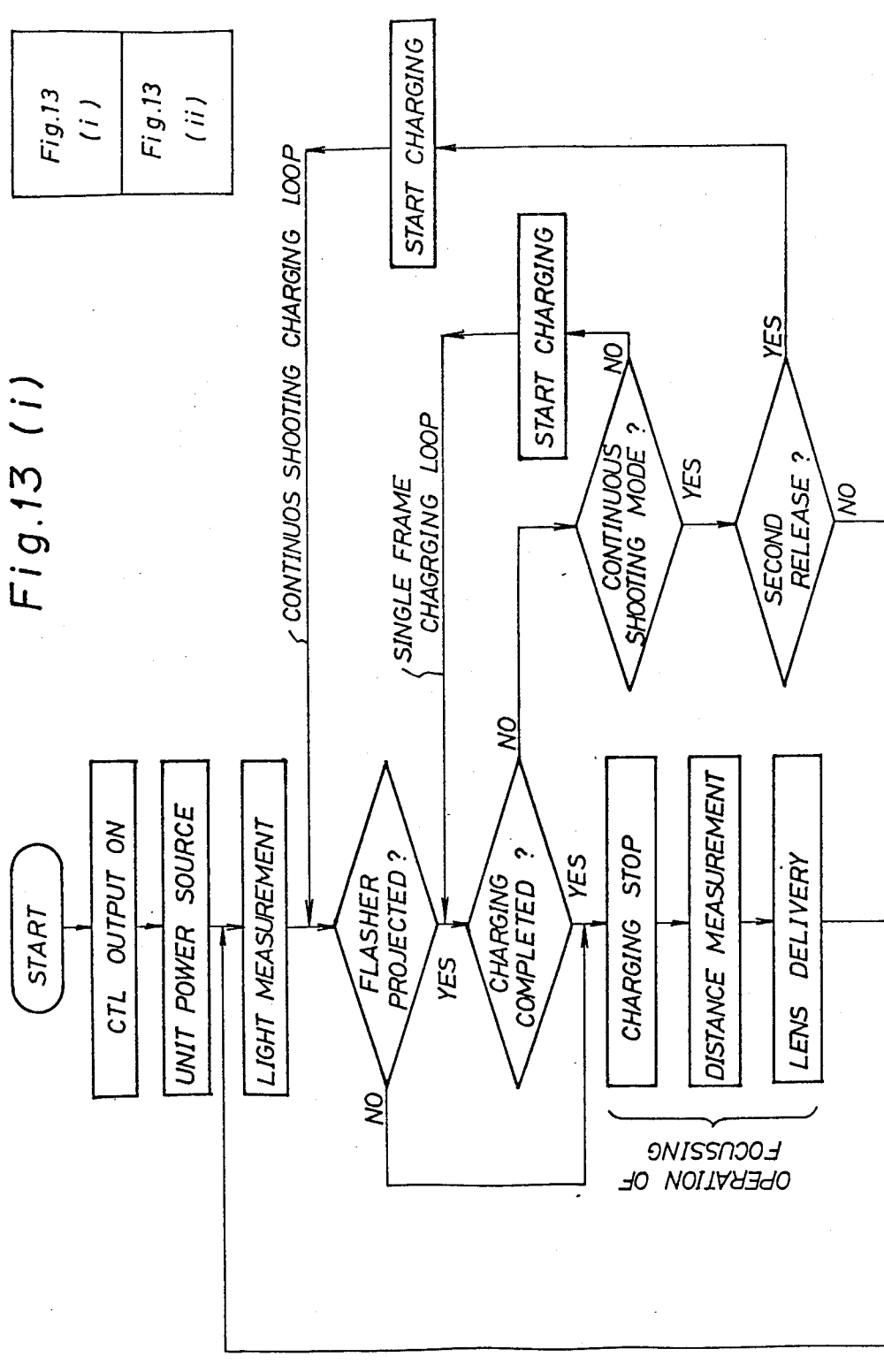

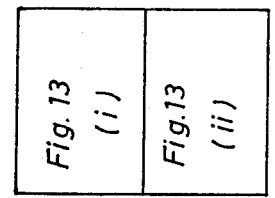
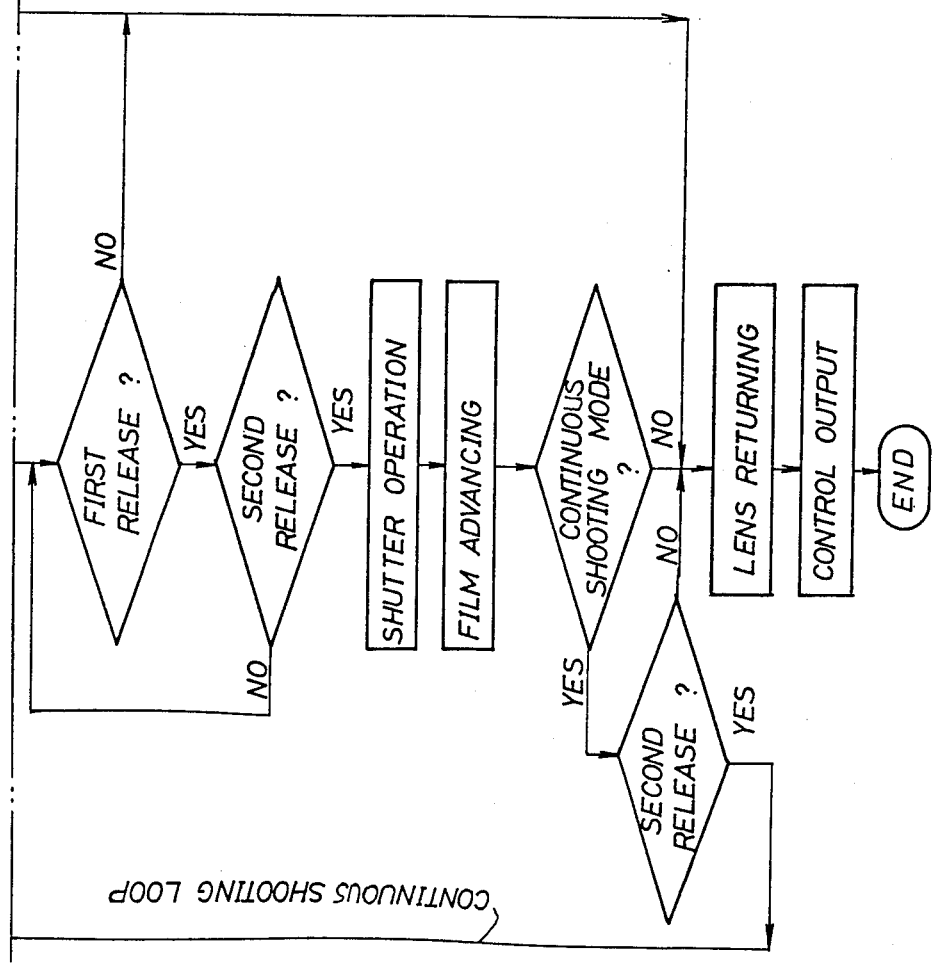
Fig. 13 (ii)

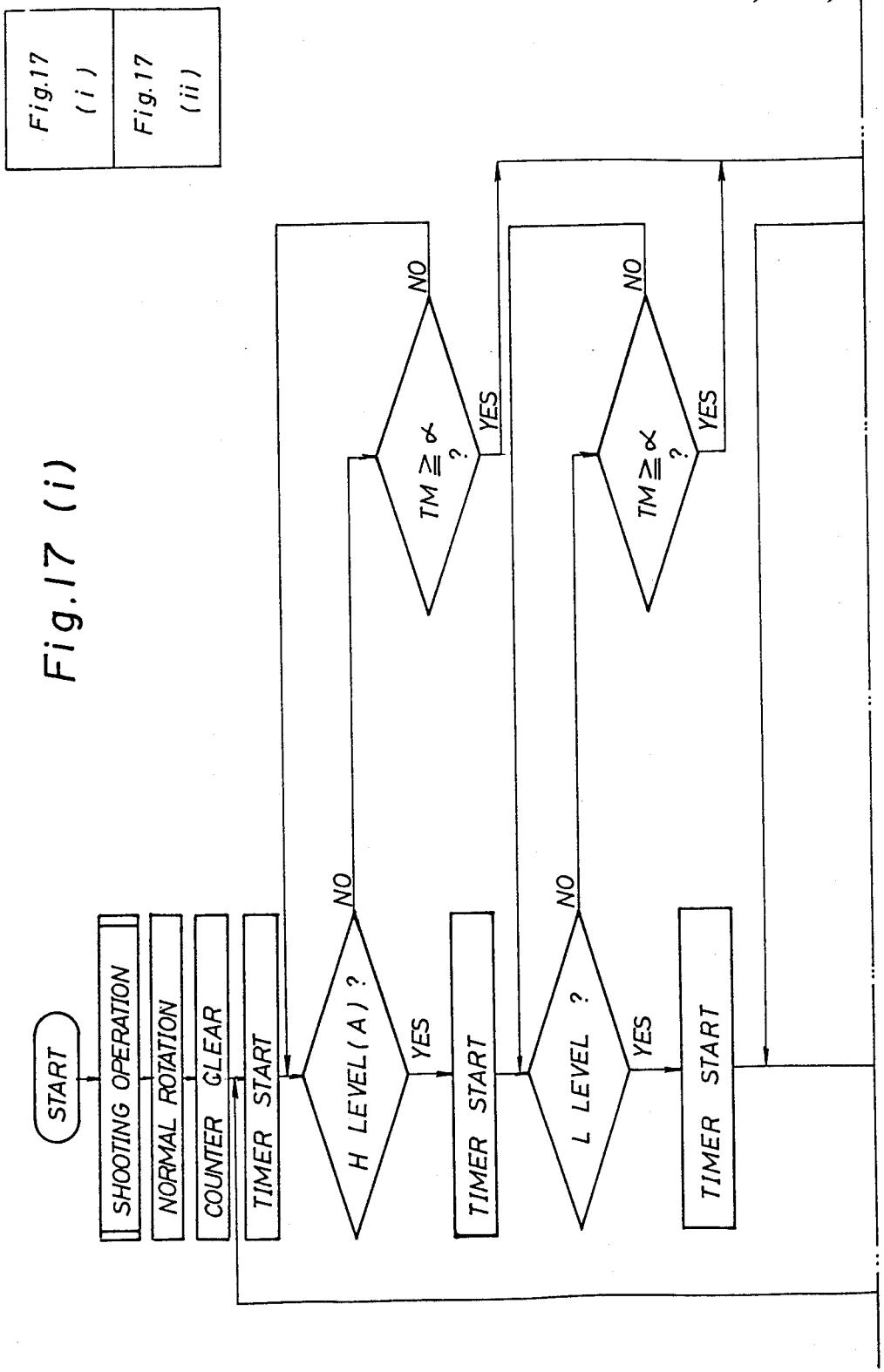

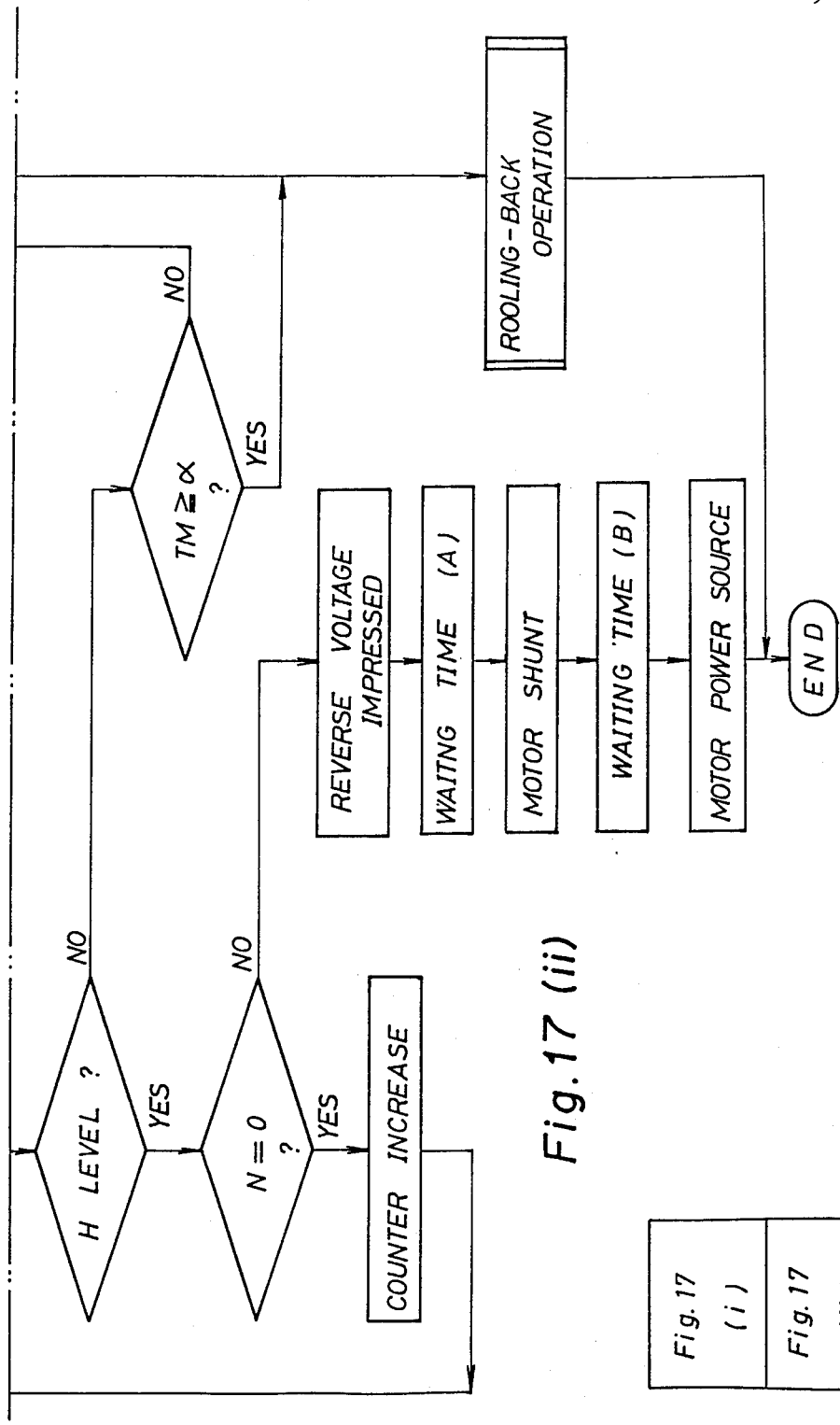
Fig. 17 (ii)

Fig.18

| REFERENCE TERMINAL | I | II | III | IV |
|---|---|---|---|---|
| MA | H | L | H | L |
| MB | L | H | H | L |
| CONNECTION OF MOTOR | NORMAL ROTATION | REVERSE ROTATION | SHUNT | STOP |

Fig. 20 (ii)
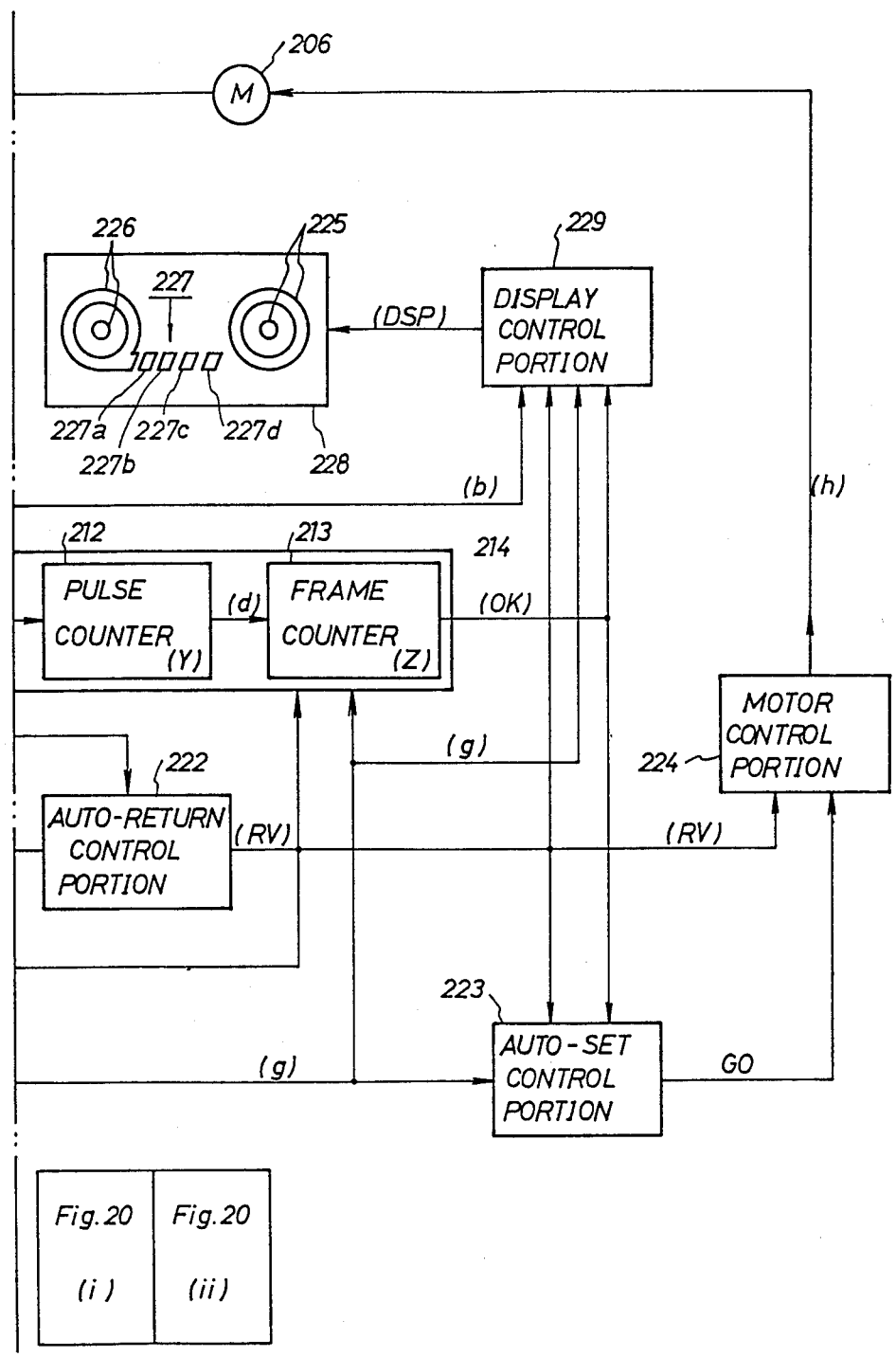

Fig. 22

| GRAPH(G1) | t1 | t2 | t3 | t4 | t5 | t6 | t7 | t8 | t9 | t10 | t11 | t12 | t13 |
|---|---|---|---|---|---|---|---|---|---|---|---|---|---|
| EDGE COUNTER :X | 1 | 2 | 3 | 4 | 5 | 6 | 7 | 8 | 9 | 10 | 11 | 12 | 13 |
| PULSE COUNTER :Y | 0 | 0 | 1 | 1 | 0 | 0 | 1 | 1 | 0 | 0 | 1 | 1 | 0 |
| FRAME COUNTER :Z | 0 | 0 | 0 | 0 | 1 | 1 | 1 | 1 | 2 | 2 | 2 | 2 | 2 |

| GRAPH(G2) | t1 | t2 | t3 | t4 | t5 | t6 | t7 | t7' | t6' | t5' | t4' | t3' | t2' | t0' |
|---|---|---|---|---|---|---|---|---|---|---|---|---|---|---|
| EDGE COUNTER :X | 1 | 2 | 3 | 4 | 5 | 6 | 7 | 6 | 5 | 4 | 3 | 2 | 1 | 0 |
| PULSE COUNTER :Y | 0 | 0 | 1 | 1 | 0 | 0 | 1 | 1 | 1 | 1 | 1 | 1 | 1 | 1 |
| FRAME COUNTER :Z | 0 | 0 | 0 | 0 | 1 | 1 | 1 | 1 | 1 | 1 | 1 | 1 | 1 | 1 |

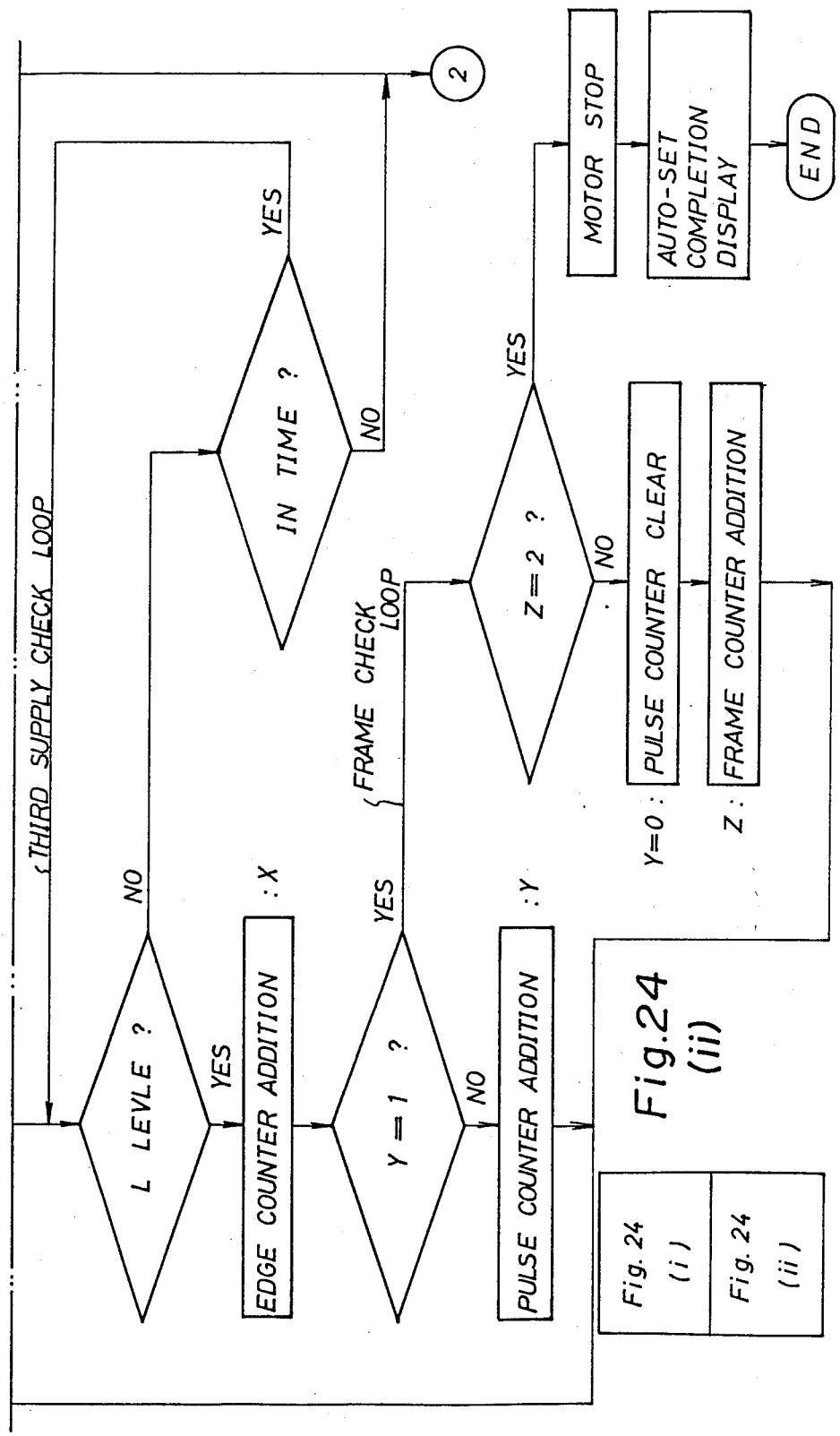
Fig.24 (ii)

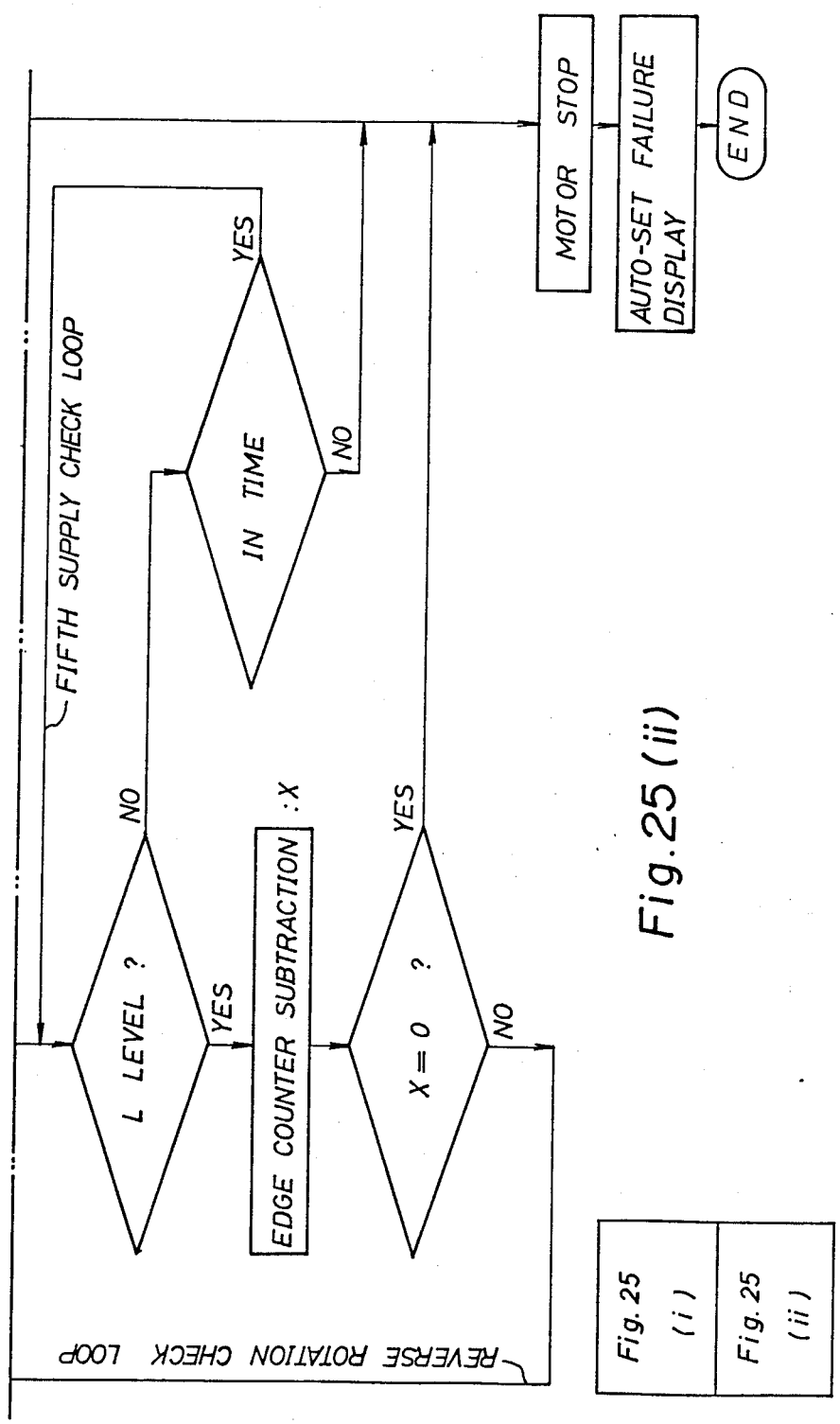
Fig. 25 (ii)

VARIFOCAL CAMERA

BACKGROUND OF THE INVENTION

This invention relates to a varifocal camera.

DISCUSSION OF BACKGROUND

Unlike single-lens reflex cameras, rangefinder varifocal (variable focus) cameras are usually equipped with no replaceable lenses and therefore an interchangeable photographic lens having a desired focal distance is not freely usable therefor. Notwithstanding, the rangefinder varifocal camera has come into wide use partly because it can commonly serve the intended photographic purpose and partly because it is extremely compact and admittedly handy to carry.

In the varifocal camera offering such advantages as mentioned above, the focal distance of the photographic lens is made changeable stepwise; namely, with two steps of wide angle focal distance and telephoto focal distance or of standard focal distance and telephoto focal distance. With a zoom lens, further, the focal distance is changeable in a stepless manner and a viewing image is formed with a finder optical path different from a photographic optical path.

A photographic lens barrel containing a photographic lens is moved back manually or by means of a motor-operated photographic lens barrel drive unit when the photographic lens is transferred to the first focal distance side, whereas the lens barrel is moved forth when it is transferred to the second focal distance side opposite to the first focal distance. The first focal distance side is normally intended for a short focal distance side but, depending on the lens arrangement, it may be intended for a long focal distance side. On the other hand, the second focal distance side is normally designed for the long focal distance side but, depending on the lens arrangement, it may be designed for the short focal distance side.

A conventional camera of this sort often has a photographic lens barrel mounted in front of the photographic lens, which is adapted to prevent foreign matter such as dust and the like from sticking on the front surface of the lens and to keep fingerprints from being left thereon because the presence of dust and fingerprints may deteriorate optical characteristics of the photographic lens. The photographic lens barrier may also be provided with a manual or motor-operated barrier drive mechanism for setting the barrier to an open position to expose the front face of the photographic lens during photographing and to a shut or closing position to cover the front face thereof during non-photographing, for example, during carrying the camera. Although not intended for the varifocal camera, the finder barrier may be installed on the finder lens portion of a camera in order to attain the same effect as that of the photographic lens barrier described above. This finder barrier may have such a manual or motor-operated drive mechanism for setting the finder barrier to the opening position to expose the front face of a finder during shooting and to the closing position to close the front surface thereof during carrying the camera.

Even if the photographic lens barrier drive mechanism and the finder barrier drive mechanism are installed and individually driven manually or by a motor-driven means, various drawbacks are still unavoidable as described below.

While the photographic lens barrier is set to the closing position and the finder barrier are set to shut position is set to the opening position, respectively, a photographer can determined the photographic composition by looking at the scene through the finder. When the photographer releases the shutter of the camera in that status, he/she is to run the risk of taking a non-exposure shot, thus wasting films and missing a precious photographing chance.

Assuming it is effective providing a camera with a release/lock mechanism, for instance, for preventing nonexposure photographing, the problem is that such a camera would become complicated in construction. In addition, if the photographer detects that the release/lock mechanism has worked to hold the photographic lens barrier shut or close at the moment he/she is about to release the shutter after determining the composition of a scene, he/she will have to open the photographic lens barrier in a hurry and fix the composition again before releasing the shutter. The photographer will anyway miss the precious photographing chance.

While the photographic lens barrier is held open with the finder held shut, on the contrary, the photographer is unable to look at the object being aimed at through the finder despite the fact that he/she is in a position to take shot of it. Consequently, there is still a fear for the photographer to miss the precious shutter-releasing chance while he/she manages to set finder barrier to opening position. At all events, the camera thus constructed poses a serious problem in view of operability and quick-shuttering.

The lens barrel is normally projected from the front part of the camera when the varifocal lens is set to the long focal distance side. Accordingly, it is so arranged that part of the lens barrel is retracted while the camera (of a so-called collapsible mount type) is not used so as to make it handy to carry. There has never been proposed such a camera incorporating a finder barrier and a photographic lens barrier and, as a matter of fact, no camera has ever been proposed which is equipped with the finder barrier and the photographic lens barrier, because it is not only extremely difficult but also unrealizable without trouble to interlock both the barriers with the barrel containing the varifocal lens striding in the direction of the optical axis.

The recent trend is for more of the varifocal cameras to be automatically operated owing to electronization of them. Above all, the function of automatically continuous shooting mechanism one after another continuously allows even beginners without practiced hands, especially on good shooting timing or chance making, to take a photograph of dramatic scene. In other words, cameras of this type are becoming very popular with camera fans.

Generally in conventional cameras, film advancing corresponding to an image plane is carried out by a motor after exposure operation is performed using its shutter and the completion of film advancing (sending) equivalent to an image plane is detected by rotating a dummy sprocket with perforations of the film and counting electric signals (pulses) outputted from a switch operated interlockingly with the dummy sprocket. The completion of film advancing in another case is detected by a clutch switch utilizing the tension loaded on the film, for example or the suspension of rotation of the dummy sprocket. On the other hand, the completion of film rewinding is detected by the suspension of rotation of the dummy sprocket or ON-OFF operation of a film detection switch.

Particularly in the case of detecting the completion of film advancing by the suspension of rotation of the dummy sprocket; i.e., detecting the end of the film by the presence or absence of pulses generated by the mechanism of the dummy sprocket, it is necessary to determine a reference time from the instant the film advancing operation is started up to the instant the film rewinding operation is substituted after no pulse is judged detectable (the dummy sprocket is stopped). According to the prior art, the reference time as a criterion has been fixed to a predetermined one.

In order to properly determine the conventional reference time, on whether it is requires an enormous amount of basic data, or whether such as the battery used is new or old (consumption) and the environmental temperature in which the camera is used as the motor torque, i.e., the film advancing time varies considerably. Therefore, a great deal of troublesome work including the work of analyzing the basic data has been needed. Obviously, the reference time thus determined can not always be used to deal with every situation.

If the reference time thus determined is shorter than an optimus reference time fit for use in critical condition, malfunction will occur, thus erroneously substituting film rewinding for film advancing despite the fact that the film end has net yet been reached, because stronger torgue is needed for the motor as a film advancing diameter particularly near the film end becomes large, as the battery is consumed and as the temperature changes. Consequently, the disadvantage is that unexposed part of the film may be rewound.

On the contrary, if the reference time thus determined is longer than the optimum reference time, such malfunction will surely be prevented. However, when the film end is then, reached considerable length of time is required to transfer the film advancing operation to the film rewinding one and, because a driving current is kept flowing through the motor in the film advancing direction during that time, there develop various problems such as the overheating of the motor, the consumption of the cell, and the overloading of members such as gears constituting the film advancing mechanism and of the film. specially, these problems becomes quite serious when the battery is new enough to generate greater electromotive force.

In general, the aforesaid continuous shooting mechanism is ineffective unless it is provided with the functions of at least automatic exposure and automatic film feeding. If, in addition to these functions above, a strobe flashing function is added, the shooting range of the camera is will conveniently increased.

Conventionally, a flash discharge tube for flashing strobe light necessitates a power source of several hundred volts but the battery of a camera as a power source usually has a potential power of only several volts. Consequently, strobe light flashing cannot be implemented unless the several hundred volts are secured using a DC-DC converter for to boost the voltage and stored in a large capacity capacitor as a main capacitor. The charging time necessary for raising and charging the power is about 6-8 seconds, though it varies with the types of strobes. When a subject of high luminance is photographed by a single-lens reflex camera with a motor drive mechanism without strobe light, it is generally possible to take about five frames per second continuously.

However, if a subject of relatively low luminance requiring strobe light is photographed continuously, the charging time ranging from 6-8 seconds mentioned above would be considered meangless, so that the continuous shooting operation is cancelled. In another type of the conventional camera, when the power source (main capacitor) of strobe has not completely been charged, the voltage raising and charging operation is continued without prohibiting the continuous shooting operation and the continuous shooting is carried out by means of the automatic exposure function under natural light. At the point of time the strobe power source has completely been charged, the strobe is flashed to expose the subject to the artificial light.

In the former case, however, the disadvantage is that it is necessary to wait until the completion of strobe charging, and to look aside from the finder during setting a continuous shooting mode; this results in determining the photographic composition again when the continuous shooting mode is restored after the charging is completed. As a result, the operability reduced because of troublesome operation may cause the photographer miss the long-waited shooting chance.

In the latter case, it is necessary for the photographer to determine the shooting recomposition as he/she is not needed to look aside from the finder. However, of the frames exposed during the continuous shooting operation, what has been exposed under low luminance conditions becomes a miss shot insufficiently exposed, thus causing waste of precious films. Like the latter case, the continuous shooting operation is carried out while the strobe is being charged means that the voltage rasing and charging operation equivalent to a heavy load, light measurement, shutter ON-OFF and film advancing operations are overlapped. This makes the charging time longer, having instantaneous overloading happen frequently. As a result these phenomena induce power voltage fluctuation and eventually causes abnormal operations.

As described above, the continuous shooting function of the camera is used to shut off the current supplied to the motor when the feed quantity of one frame is detected, to shortcircuit the motor and to stop the motor by applying the conventional electrical brake (hereinafter called a shunt brake) thereto with detecting means for receiving a signal designating the completion of the shutter switching operation to start the motor in the film advancing direction and to detect the quantity of film feeding (advancing) such as a detection device using a dummy sprocket engaged with the perforations of film.

In general, a moment of inertia of the rotor of the motor is not so small as is disappeared by the shunt brake instantly and inertia or residual rotary moment induces a motor overrun. Consequently, the film is stopped at a position little far from where it should have been stopped and this condition is repeated until the last film frame is set. Finally an erroneous scene appears on the last scene because of double exposed portion of the film. To the photographer, all scenes taken by him/her are precious photographic records, and it is quite unpleasant for him/her to find two scenes, overlapped which should have been taken as good ones and which may make the precious photographic records worthless. During the time the cell as the power source of the camera offers big charging performance, or just after the old battery has been replaced by a new one, the residual inertia rotary power is disadvantageously large and the overlapped erroneous portion is also mostly made large.

In order to eliminate the problems above, the current or voltage to be impressed on the motor, may be limited however, it would require an additional a circuit and to provide an installation space, resulting in higher cost. The limitation of the current or voltage will decrease the speed of the film advancing operation.

Practically, the conventional varifocal camera with a continuous shooting function has an initial film advancing mechanism (automatic film setting mechanism) after a roll of film contained in a container (patronic) is mounted on the camera and, for example, the rear cover of the camera is closed, to automatically advance a predetermined length of the film to the front end portion around the rolling spool.

However, when the continuous shooting mechanism is used, the length of film drawn-out of the film container before installation of the container in the camera body varies widely according to the setter or user of the camera, so that the predetermined result mentioned above is not necessarily obtained.

For example, in cases that the film doesn't reach the film spool, the film overrides on the spool and the perforations of the film doesn't engage with the engaging projections on the spool, and the film fails to run on the belt driven by the spool. Secondingly the predetermined result above is not attained.

In these cases, the photographer can not roll up the film on the spool. In order to adjust the position of the film on the spool, the rear cover is opened and the film container is pulled out of the camera body. If the film container is slantingly installed in the camera body, the perforations of the film engage with these claws formed on the spool and one side of the film is pressed against one side of the spool. So a result, the rotation of the spool is suspended.

When the volume of the film exceeding a predetermined value is rolled around the spool, the interior of a spool chamber is jam packed with the film, not enabling the spool to rotate. In this case, the user must rewind the film and reinstall it, resulting in a troublesome handling. Because the troublesome manipulation is done while the rear cover is open, the rolled-back film portion is exposed and the precious image records are disadvantageously lost.

SUMMARY OF THE INVENTION

The first object of the present invention is to provide a varifocal camera equipped with a barrier drive mechanism which mechanism is simple in construction, enables to set, during non-shooting, both its photographic lens barrier and the finder barrier at the closing positions and to keep a photographic lens barrel in its retracted position, and enables to set, during shooting, both the barriers at their open positions, having excellent manipulatability in compact size.

The second object of the present invention is to provide a varifocal camera with a film feed condition detector which mechanism is simple in construction, detector is able to set the most suitable value of a reference time from the instant the film advancing operation is completed up to the instant the film rewinding operation starts after the film end is reached during the film advancing operation.

The third object of the present invention is to provide a varifocal camera with a camera control device being able to, when an object of low luminance ia taken thereby with flash light in a continuous shooting mode, shoot a photograph, without any necessity of special or additional operation for the continuous shooting and of remaking of a photographic composition, without failure of the photograph due to unsatisfied exposure, and without wasting of the previous film, and still able to increase the number of shooting chances.

The fourth object of the present invention is to provide a varifocal camera with an inexpensive film control device simple in construction, which is able to instantly stop a motor just after the motor has finished to supply a part of film corresponding to one frame without decreasing film supply speed, and able to prevent the overlapping of exposed scenes at the end portion of the film.

The fifth object of the present invention is to provide a varifocal camera having an inexpensive automatic film feed mechanism simple in construction, which mechanism being able to make any re-installation of the film easy when the result of the initial film advancing operation is unsatisfactory and surely prevent the film and video scenes from being wasted due to the unintended exposure of the film part pulled out of the container.

The first object of the present invention is attained by providing a varifocal camera with a barrier drive mechanism, comprising a photographic barrel having a photographic lens able to change the focal distance and adapted to move rearwardly when the photographic lens is transferred to the first focal distance side and move forwardly when the lens is transferred to the second focal distance side, a photographic lens barrier movable between the opening position to expose said lens and the closing position to close the lens, and a finder barrier movable between the opening position to expose the finder lens portion and the closing position to close the finder lens portion, characterized in that the barrier drive mechanism comprises a finder barrier position detecting means for detecting the position of said finder barrier, a release control means for preventing or stopping a release operation when the finder barrier position detecting means outputs a signal indicating the closing position and allowing the release operation when said finder barrier position detecting means outputs a signal indicating the opening position, a cam member adapted to be attached on the camera body so as to be able to slide along the predetermined direction cooperatively with the finder barrer and having a cam surface inclined to the light axis, a first drive means for moving raid photographic lens barrier to the close position together with the finder barrier movement to the close position when the photographic lens is placed on the first focal distance side and for moving the photographic lens barrier to the opening position together with the movement of finder barrier to the opening position, and a second drive means for retreating the photographic lens barrel when receiving the closing position signal from the finder barrier position detecting means and for moving the photographic lens barrier to the closing position side in cooperation of the cam surface of the cam member when the photographic lens is placed on at least the second focal distance side.

According to the varifocal camera with a barrier drive mechanism of the present invention, making or setting the finder barrier at its opening position only before shooting makes open the photographic lens as well as the finder barrier, so that when a scene can be viewed through the finder means the photographic lens is set at its opening position and the user of the camera can determine a shooting frame before release operation. Consequently, no missing of precious shooting chance and excellent operability are ensured in the camera according to the present invention.

According to the varifocal camera with the barrier drive mechanism of the present invention, wherever the photographic lens is set at the position of focal distance, it is possible to drive the finder barrier to its close position of non-shooting state without trouble and, even for example, even the photographic lens is placed on the second focal distance side and the photographic lens barrel projects forwardly from the camera. It is also possible to close the photographic lens barrier and to retract (inset) the lens barrel. As a result, the outside size of the camera is made small while it is not used, it is readily put into a camera case and easy to carry.

In addition, as the finder lens portion and the photographic lens portion of the changeable focal camera according to the present invention are covered during non-shooting time, dust and fingerprints are prevented from adhering to them. Failure of the lens portion due to an external shock can be prevented.

The second object of the present invention is attained by the varifocal camera comprising a film supply condition detecting device for detecting any change of supply condition everytime a frame part of the film is supplied during film advancing the operation of the film installed or contained in the camera by a motor, characterized in that said film supply condition detecting device comprises a pulse generating means for generating pulses of the predetermined number following the supply of the film part for a frame, an edge detecting means for outputting an edge signal everytime raising edge and/or downing the edge of the pulse of the predetermined number are detected after receiving the output of said pulse generating means, an edge counting means for receiving and counting the output of the edge detecting means, and outputting a supply finishing signal indicating the completion of the supply of a frame part of the film at the time said edge counting means counts at least the last edge signal, a shutter operating completion detecting means for detecting the completion of exposing operation of the shutter, a motor ON-OFF means for turning the motor ON after receiving an output from the shutter operating completion detection means and turning the motor OFF after receiving an output of said supply completion signal, a first timing means for receiving outputs of said supply completion signal and the shutter operating completion detecting means in order to measure the time necessary to supply a film part of one frame, resetting itself to its initial condition at the instant said first timing means receives an output from said shutter operating completion detecting means, starting the counting or measuring operation at said instant to output the time counting data sequently, and for stopping said counting operation at the time said supply completion signal is received, a time counting data holding means for receiving the output of the first counting means and the supply completion signal to change the first time counting data indicating the time necessary to supply a film part of a frame just before the frame which has been kept at the time the supply completion signal is received to the time counting data from said first time counting means, and for keeping said time counting data changed as a second time counting data, a second time counting means for receiving outputs of said edge detecting means and said shutter operating completion detecting means, resetting the initial condition at that time, and for starting a time counting operation to output the time counting data one after another as third time counting data, a time counting data comparing means for comparing successively said third time counting data and second time counting data to output a judgement signal when the third time counting data is over the second time counting data by a predetermined number, and a motor polarity changeover means for receiving the judgement signal to change the direction of rotation of said motor.

According to the varifocal camera with a film feed condition detection device of the present invention, the film feed time is compared with the reference time of feed time of the preceeding one film frame and, when the feed time exceeds the reference time by a given degree, it is judged that the film advancing operation is finished to substitute for rewinding operation, so that the transfer operation from the film advancing operation to the film rewinding operation can be done smoothly without the effect of the consumed condition of the battery, environmental temperature, size of feed load, etc. and as in the prior art without erroneous transfer wherein the film advancing is transferred to rewinding state and current flow continues unnecessarily for a considerable length of time after the finish of rolling-up. Consequently, any failure of the motor and wasteful consumption of the battery are effectively prevented and no mechanical parts are necessary to detect the completion of film advancing, which results in a light weight and compactness of the camera.

The third object of the present invention is attained by a varifocal camera comprising a camera control device for measuring the brightness of photographic object before carring out of shutter operation and film rolling-up operation, functioning flashing operation for shooting an artificial light of flashing means cooperative to the shutter operation when the brightness of the object is less than predetermined one, carrying out continuously a film rolling-up operation, and having a continuous shooting mode which the respective operations are continuously repeated as a continuous shooting type camera, characterized in that said camera control device comprises a flashing means capable of becoming again of flashable condition after any flashing operation; a shutter means for carrying out the shutter operation; a film supply means for functioning the film rolling-up operation by means of a motor; a photographic mode setting means for selectively setting from outside either one of one-by-one shooting mode or the continuous shooting mode; a photographic operation start means operable from outside to start the photographic operation; and a control means for controlling the shutter means so as to immediately carry out said shutter operation and the flashing operation just after the preparation time for the flashing means is elapsed without delay, during a continuous shooting mode is set by the photographic mode setting means and an operative state of the photographic operation start means is kept when the brightness of the object is less than the predetermined one, and just after the control operation, for controlling the film supply means so as to carry out the film rolling-up operation without intermittence and to repeat the operations, respectively.

According to the varifocal camera with the camera control device of the present invention even when any object having low luminance is taken with flash light in the continuous shooting mode, there are compulsory no special or additional operation nor recomposition of the frame is compulsory during the continuous shooting time; no failure of taking a photograph with a poor exposure; and no waste of film material, and additionally the number of shutter releasing chance.

The fourth object of the present invention is attained by a varifocal camera comprising a film supply control device having a film feed mechanism for rolling-up a film part of a frame automatically by means of a motor after the shooting operation a frame of the film is completed, characterized in that said film supply control device comprises a motor rotating in a reverse direction after reversing the polarity of drive current source to be impressed to an input terminal and running little time duration when the drive current source is cut and the input terminal is shortened to apply it to an electric control, a motor driving means for carrying out change-over operation and cutting the polarity of the drive current source impressed to the input terminal of the motor and shortening the input terminal, a film supply signal generating means for generating a pulse signal of the predetermined number after or following a supply of the film, and a control means for controlling the motor drive means so as to apply the drive current source of the polarity by which rotate the motor along the rolling-up direction of the film rolling-up onto the input terminal of the motor, counting the pulse signal from the film supply signal generating means, applying the first control step by reversing the polarity of drive current source impressed to the motor for a short time, starting from the instant at which said pulse signal corresponding to a single frame has been counted, and for applying the second control step by shortening the input terminal of the motor after cutting of the drive current source.

According to the varifocal camera having a film feed control device concerning this invention, the pulse signal from the film feed signal generating means for generating the predetermined number of pulses together with supply of the film by the motor to be counted. First brake is applied by reversing the polarity of the drive current source impressed to the motor the instant the pulse signal corresponding to a single frame has been counted, thereas second brake is given by shortening the input terminal of the motor after the drive current source is stopped, so that the becomes simple in construction and inexpensive, and additionally can stop the motor instantly when the motor has fed or supplied the single frame and the length of that film part is constant and shorter than that of the conventional case, which results in preventing these exposed frames at the end of film from overlapping.

The fifth object of the present invention is attained by a varifocal camera comprising an automatic film supply device having a rolling-up mechanism for rolling-up the film contained in the camera around a spool or magazine thereof, and a rolling-back mechanism for rolling back the film rolled up by said rolling up mechanism to the opposite direction, and being able to automatically roll up as an initial rolling-up operation a predetermined length of the top end portion of film by the film rolling-up mechanism after a new roll of film is loaded in the camera, characterized in that said automatic film supply device comprises a motor for driving the rolling-up mechanism and the rolling-back mechanism, a pulse generating means for generating pulses of the predetermined number after a film part of single frame is supplied, a pulse counting means for counting the pulse output from the pulse generating means, an automatic initial film rolling-up means for receiving instructions from a separately provided initialization instructing means to rotate the motor along the rolling-up direction of the film, initializing the initial rolling-up operation, and for stopping the running of the motor at the time the pulse counting means has counted a counting value corresponding to the predetermined length of the film, a supply condition decision means for outputting a failure signal indicating the condition that the film has not been supplied when the pulse has not output by the instant after the standard time duration from the starting of the initial rolling-up is elapsed, and an automatic rewinding means for stopping the initial rolling-up operation after receiving the failure signal and starting rewinding operation of the motor to rotate the film along its rewinding direction and for stopping the motor after the film is rolled back by the length of film corresponding to the pulse number which said pulse counting means has counted until the time of outputting the failure signal, said film supply device is adapted to rewind the predetermined length of film which has been rolled up by the initial film rolling-up operation when the result obtained by the initial film rolling-up operation does not satisfy the predetermined level.

According to the varifocal camera with an automatic film supply device of the present invention, the device is constructed so as to count the pulse output after the film loaded in the camera is automatically fed in the initial film rolling-up operation of the film, the time duration from the initiarization of the initial rolling-up operation is measured; the supply direction of film is reversed when any pulse is not output even after the measured time duration is over the predetermined reference time in order to rewind the part of film whose length corresponds to the number of pulses counted, so that it is very easy to re-load the film done when the result of the initial film rolling-up operation does not satisfy the predetermined level, and there can effectively be prevented waste of film by unavoidable exposure of its portion pulled out of the container containing the roll of film during re-loading of film and missing of video records owing to the exposure.

The preferred embodiments of the varifocal camera provided with a barrier drive mechanism according to the present invention will be explained in detail with reference to the accompanied drawings. It is a matter of course that various embodiments will be obtained without departing from the subject matter of the present invention.

BRIEF DESCRIPTION OF THE DRAWING

FIG. 5 is a block view of the construction of an embodiment of the film supply condition detection device of the varifocal camera concerning the present invention.

FIG. 13 is a flow chart showing the sequential operations of the embodiment of FIG. 12.

FIG. 17 is a flow chart showing the sequential operations or steps of FIG. 14.

FIG. 18 is s table showing the control of a motor drive circuit shown in FIG. 14.

FIG. 22 is a table showing variable counts of the counters in FIG. 21.

DETAILED DESCRIPTION OF THE PREFERRED EMBODIMENTS

Figure 1:
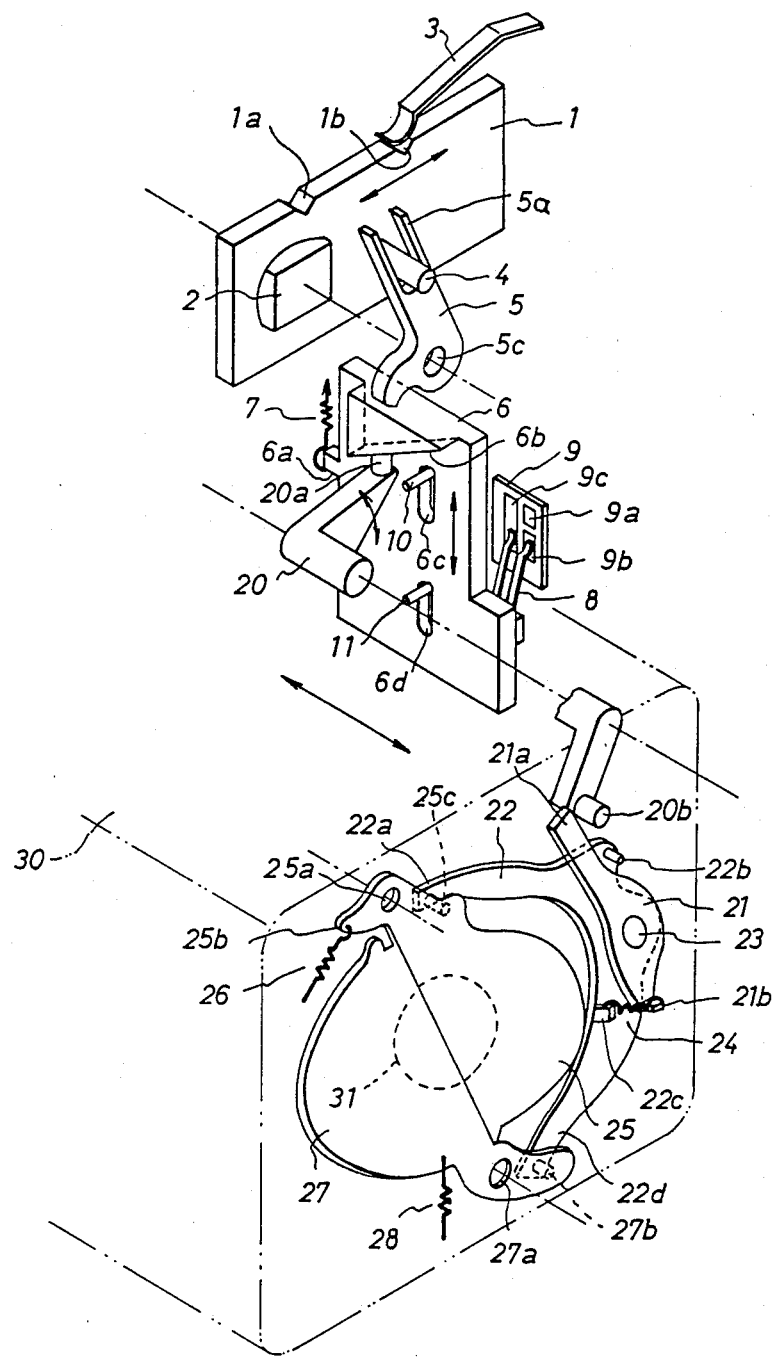
FIG. 1 shows a perspective view of the construction of an embodiment of the barrier drive mechanism of the varifocal camera according to the present invention, in which both the finder barrier and the photographic lens barrier are closed in a non-shooting, carrying condition of the camera.

Of the accompanying drawing, FIGS. 1 to 4, respectively show the construction of an embodiment of the barrier drive device of the varifocal camera according to the present invention.

As shown in FIGS. 1 to 4, a finder barrier (1) is supported in the camera body so as to be located at the back of a finder lens portion (2) (it is an eye lens in this embodiment) and be moved transversely to the light axis of the finder manually or automatically from the opening position to expose or open the finder lens portion (2) to the closing position to close or screen the portion (2).

The finder barrier (1) is formed in a shape of square plate made of light shielding material. On the upper portion of the square plate, there is a first click groove (1a) for holding the finder barrier (1) in the semi-fixed condition at the opening position by means of a click spring (3) as the end thereof presses the groove (1a) and, also, second click groove (1b) for holding the finder barrier (1) in the manner of and by means of the same as that of the first click groove (1a). At the center of the front face of the square plate of the finder barrier, there is a driving shaft (4) shaped in a round bar, extended in the direction perpendicular to the front face. The driving shaft (4) is sandwiched by the fork portion (5a) formed at the end of one arm of a driven lever (5) rotatably supported through a suitable shaft (not shown) and a supporting hole (5c) formed in the driven lever (5). A drive portion (5b) of another arm of the driven lever (5) is adapted to engage or be able to engage with the upper surface of a cam member (6).

The cam member (6) is supported so as to move vertically as two guide bars (10), (11), respectively fixed to the camera body are engaged to guiding oval holes (6c), (6d). The cam member (6) is always pressed upwardly by means of a spring (7) hooked to a spring holding portion (6a) projected from the rear side of the cam member (6). The cam member (6) has a slanted or inclined cam surface (6b) slanted to the optical axis. A brush (8) made of conductive leaf springs is fixed to another side of the cam member (6).

When the cam member (6) is moved upwardly, namely, the finder barrier is set to the closing position, the brush (8) contacts a first contacting pattern (9a) formed of membrane. When the cam member (6) is moved down, the brush (8) contacts a second contacting pattern (9b) formed of membrane. Also, the common contacting pattern (9c) is formed of membrane, and the first, the second and the common contacting patterns 9a, 9b, 9c are formed on a contacting plate (9) fixed to the camera body so that the contacting plate (9) is opposing to the brush (8).

On the other hand, the varifocal camera has a photographic lens barrel (30) provided with a photographic lens (31) changeable in two steps of Wide and Telephoto of the focal distance. The photographic lens barrel (30) moves backwardly (retract) when the photographic lens (31) is manually or with power changed onto the Wide side and the lens barrel (30) moves forwardly (project) when the lens (31) is changed onto Tele side. The barrel (30) has a barrel position detecting switch (not shown) operated when the lens (31) is completely retracted on the Wide side.

In the photographic lens barrel (30), a shaft portion of a driving lever (20) extending along the optical axis of the barrel (30) is rotatably supported. The driving lever (20) has a first contacting portion (20a) formed on one arm thereof and the first contacting portion is pressed by the slanted cam surface (6b) or presses the cam surface (6b). The driving lever (20) has a second contacting portion (20b) formed on the other arm thereof and the second contacting portion (20b) is engaged with a contacting portion (21a) formed on an arm of a first lever (21) rotatably attached to the front surface of the photographic lens barrel (30) by a supporting shaft (23).

On a spring holding portion (21b) formed on the other arm of the first lever (21), and one end of a tension spring (24) is hooked and the other end of the compression spring (24) is hooked on a spring holding portion (22c) of the second lever (22) rotatably supported on the supporting shaft (23). On an end of an arm of the second lever (22), a driving portion (22a) is formed so as to press a driven pin (25c), which will be explained later. On the other arm of the second lever (22), the other driving portion (22d) for pressing a driven pin (27b), which will be described later, is formed. On the mid portion of an arm of the second lever (22), a driven pin (22b) is embedded in order to contact a side portion of an arm of the first lever (21) and to restrict the rotary movement of the first lever (21).

Consequently, a clockwise rotary force around a supporting shaft (23) is applied to the first lever (21) by the tension spring (24) and a counterclockwise rotary force around the shaft (23) is applied to the second lever (22).

On the front surface of the photographic lens barrel (30), a photographic lens barrier consisting of a first lens barrier portion (25) and a second lens barrier portion (27) is formed, each of the first and second lens barrier portions is formed by dividing a circular plate into two semicircular plates. The photographic lens barrier is adapted to move from the opening position whose the photographic lens (31) opens to the closing position where the lens (31) closes. That is, the first lens barrier portion (25) is rotatably supported on the photographic lens barrel (30) by means of a supporting axis (not shown) extending through a supporting hole (25a). The second lens barrier portion (27) is rotatably supported on the photographic lens barrel (30) by a supporting shaft (not shown) extending through a supporting hole (27a) formed at a base portion of the barrier portion (27).

In addition, a spring holding portion (25b) is formed near the base portion of the first lens barrier portion (25) and a tension spring (26) is hooked on the holding portion (25b) in order to give a counterclockwise rotary force or opening force-around the supporting hole (25a) to the first lens barrier (25). A driven pin (25c) is fixed to the first lens barrier (25) so as to extend backwardly and the driven pin (25c) is pressed along a closing direction through a drive portion (22a) of the second lever (22).

In addition, a tension spring (28) is hooked near the supporting hole (27a) of the second lens barrier portion (27) in order to give a counterclockwise force or opening direction around the supporting hole (27a) to the second lens barrier portion (27). On the second lens barrier portion (27), there is a driven pin (27b) fixed thereon so as to extend backwardly and the driven pin (27b) is adapted to be pressed along its closing direction by means of the drive portion (22d) of the second lever (22).

Consequently, for example, when the second contacting portion (20b) of the drive lever (20) does not contact the contacting portion (21a) of the first lever (21) and no counterclockwise rotary force is applied to the contacting portion (21a), the first lens barrier portion (25) and the second lens barrier portion (27) rotate around these supporting holes (25a), (27a) counterclockwise owing to the force of the tension springs (26), (28). As a result, the second lever (22) rotates clockwise through the driven pins (25c), (27b) and, according to the rotation, the first lever (21) rotates clockwise by means of a tension spring (24), setting the photographic lens barrier at its opening position exposing the photographic lens (31).

A description will be given of the operation of the barrier drive apparatus installed in the varifocal camera, which apparatus being constructed according to the embodiment of the present invention as described above.

Figure 2:
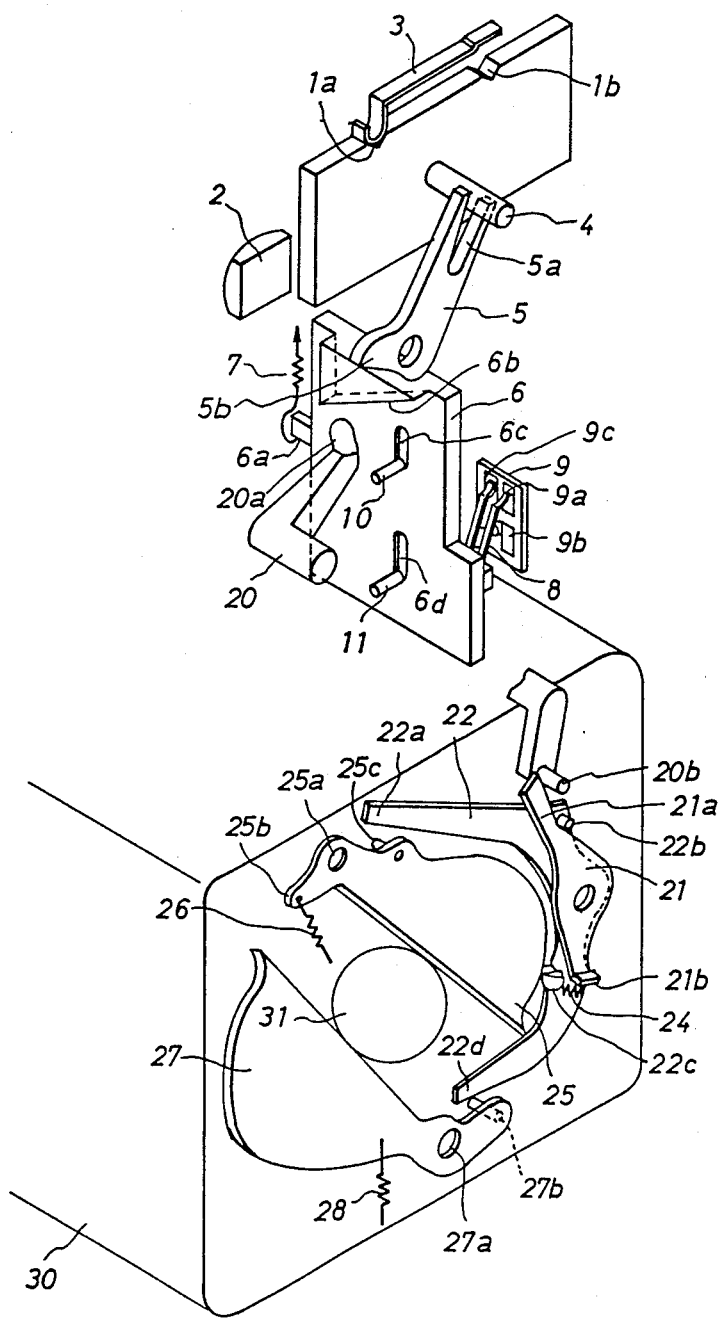
FIG. 2 is a perspective view showing the situation in which both the barriers are open and the lens is set at the wide position.

As shown in FIG. 1, when the finder barrier (1), the first lens barrier (25), and the second lens barrier (27), respectively, are placed at their closing position and the photographic lens barrel (30) is placed at its Wide position during nonshooting time or while the camera is being carried, and the finder barrier (1) is manually or automatically moved rightwardly (viewed from the drawings), the finder barrier-(1) is engaged with the first click groove (1a) in its semi-fixed condition by a click spring (3) as shown in FIG. 2.

At that time, as the fork portion (5a) is driven through the drive shaft (4) to revolve the driven lever (5) clockwise, releasing the lock for the cam member (6), the cam member (6) accordingly moves upwardly due to the forces of the tension springs (7), (26), (28). During the initial period of movement of the cam member (6), the cam member (6) is moved upwardly as shown in FIG. 1 by force of the tension spring (7) hooked on the cam member (6), and of those tension springs (26), (28) which is applied to the cam member (6) through the course of the first and second lens barriers (25), (27), the driven pine (25c), (27b), the second lever (22), the tension spring (24), the first lever (21), the second contacting portion (20b) of the drive lever (20), the first contacting portion (20a) thereof and the slanted cam surface (6b).

During the final period of its movement, the cam member (6) is moved by only the force of the tension spring (7) and the movement continues until the lower portions of guide oval holes (6c), (6d) contact the guide bars (10), (11) to restrict the movement and determine its position.

That is, the photographic lens barrier consisting of the first and second lens barrier portions (25), (27) rotate counterclockwise around the supporting holes (25a), (27a) due to the force of the tension springs (26), (28) as mentioned above, so that the photographic lens (31) is at its opening position to be exposed as shown in FIG. 2. A this position, it is ready shooting a photograph in the Wide situation.

The brush (8) constituting a part of the finder barrier position detecting means, which brush (8) has bridged previously or connected the common contacting pattern (9c) and the second contacting pattern (9b), connects at that time the common contacting pattern (9c) and the first contacting pattern (9a) when the cam member (6) move upwardly. Consequently, signal indicating the open condition of the finder barrier (1) is supplied from the finder barrier position detecting means to a system controlling circuit (not shown) and the open condition of the first and second photographic lens barrier portions (25), (27) followed by the movement of the finder barrier (1) is known so as to permit any releasing of the shutter through a release control circuit (not shown). When the cam member (6) is held at its lower position, the brush (8) is connecting the common contacting pattern (9c) and the second contacting pattern (9b) on the contactor plate (9), so that a signal indicating the closing position is supplied to a system control circuit (not shown) and the like in order to find the close condition of at least the finder barrier (1). If the photographic lens (31) is placed at the position other than the Wide side, a Tele Wide changeover drive circuit receives the position signal to drive the photographic lens (31), as well as the photographic lens barrel (30) to the Wide side and a release control means (not shown) prevent the shutter from releasing.

In the state shown in FIG. 2, Wide photographing is possible.

Figure 3:
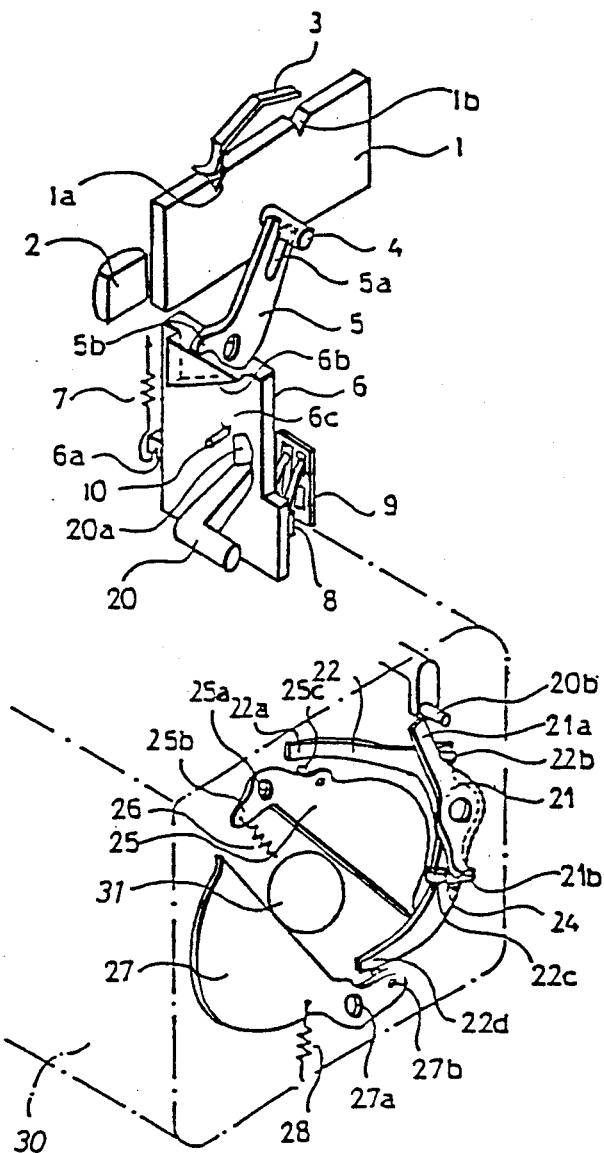
FIG. 3 is a perspective view showing a situation in which these barriers are open and the lens is set at the telephoto position.

While, when a tele switch individually formed in a Tele Wide changeover drive circuit (not shown) is turned ON to output a changeover signal in order to switch the photograph taking condition from a Wide one to a Tele one, an electric motor drives the photographic lens (31) to its Tele side and accordingly the photographic lens barrel (30) moves forwardly as shown in FIG. 3.

Thus, these first and second lens barrier portions (25), (27) and the drive lever (20) and accessories thereof, respectively maintained in front of the photographic lens barrel (30) are integrally moved forwardly. At that time, the first contacting portion (20a) on the drive lever (20) moves to the front of the slanted cam surface (6b) but, as the first contacting portion (20a) and the slanted cam surface (6b) have been separated from each other, no change occurs in the opening position of the first and the second lens barrier portions (25), (27). Consequently, Tele photographing becomes possible.

When a Wide photographic shooting is desired after carrying out of the Tele shooting, the Wide switch not shown is turned ON to impress a Wide changeover signal to the Tele-Wide changeover circuit and thus the photographic lens (31) is switched to the Wide side by means of an electric motor. At that time, the first contacting portion (20a) of the drive lever (20) moves to back side, however, and the first contacting portion (20a) is separated from the slanted cam surface (6b). Accordingly, the open positions of the first and the second lens barrier portions (25), (27), are kept, having no relation the condition of the photographic lens barrel (30).

Then, a desired Wide photographic shooting can be made in the open condition of the photographic lens (31).

Next, when the finder barrier (1) and the first and the second lens barrier portions (25), (27) are moved from their Wide shooting condition as mentioned above and shown in FIG. 2 to the closing position or to non-photographic shooting position or moved leftwardly (on the drawing), the driven lever (5) is rotated counterclockwise by means of the drive shaft (4) and consequently the cam member (6) is pushed down by means of a drive portion (5b). As a result, the first contacting portion (20a) of the drive lever (20) is moved through the slanted cam surface (6b) of the cam member (6) and the drive lever (20) rotates clockwise. The second contacting portion (20b) rotates the first lever (21) counterclockwise and the tension spring (24) rotates counterclockwise the second lever (22).

Through these drive portions (22a), (22d) of the second lever (22), the driven pins (25c), (27b) are pushed and these first and second lens barrier portions (25), (27) are rotated clockwise against the force of the tension springs (26), (28), covering the photographic lens (31) in its closing position.

When the finder barrier (1) moves leftwardly (on the drawing) from its Tele photographic shooting condition to the close condition or non-shooting state, in which the finder barrier (1) and the first and second lens barrier portions (25), (27) are closed, the cam member (6) is pushed down through the drive portion (5b) in the same manner as described above. At the time, the brush (8) connects the common contacting portion (9c) and the second contacting pattern (9b) on the contacting plate (9) to output a close signal to be impressed to the Tele-Wide changeover circuit. A barrel position detecting switch (not shown) outputs a signal indicating that the photographic lens barrel (30) is not placed on its Wide side or it resides on the Tele side of the Tele-Wide changeover circuit. The Tele-Wide changeover circuit drives, after it receives these signals with a desired timing, the photographic lens (31) to the Wide side and the photographic lens barrel (30) is driven backwardly.

Figure 4:
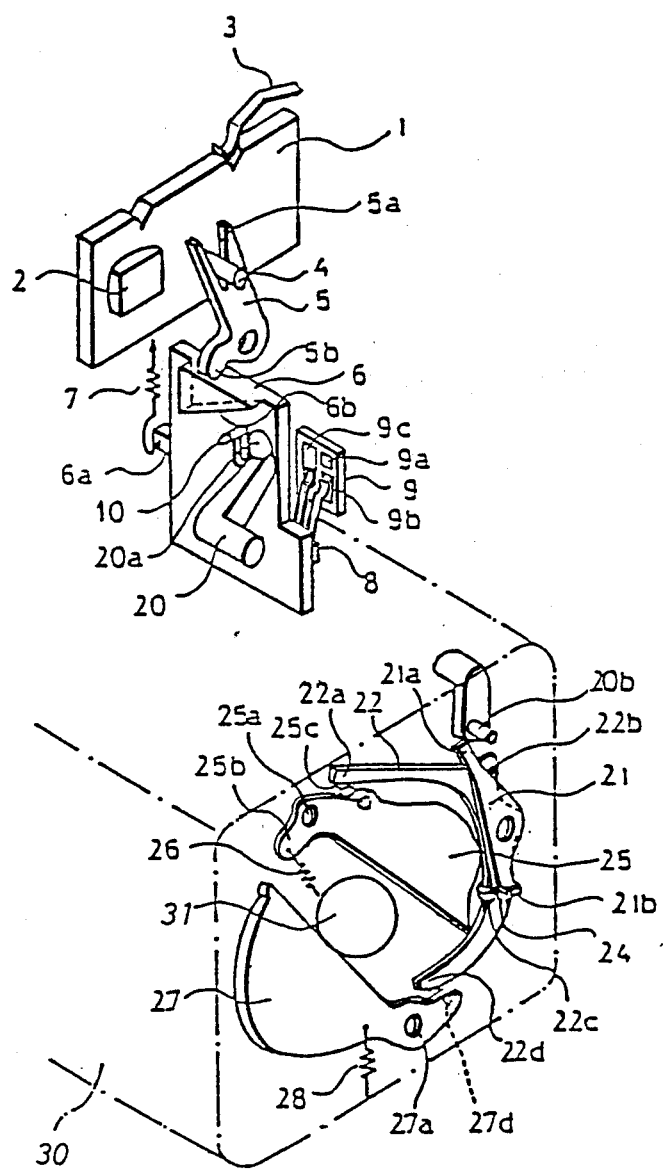
FIG. 4 is a perspective view showing a transient condition of the closing lens after the finder barrier is closed when the photographic lens is situated above.

As shown in FIG. 4, the photographic lens barrel (30) is driven backwardly and, together with this movement, the first contacting portion (20a) of the drive lever (20) contacts the slanted cam surface (6b) of the cam member (6). When the photographic lens (31) and the photographic lens barrel (30) are advanced further to the Wide side, the first contacting portion (20a) is pushed down along the slanted cam surface (6b) which is located at a restricted lower position, rotating the drive lever (20) clockwisely. Since such a rotary movement is generated, as described above, these first and second lens barrier portions (25), (27) are respectively rotated clockwise against the force of tension springs (26), (28) so as to place the photographic lens (31) at its close position.

The mechanism, which is reffered for as a first drive means, moves the photographic lens barrier consisting of the first lens barrier portion (25) and the second lens barrier portion (27) to its closing position when the finder barrier (1) is moved to the left on the drawing and to its close position side and moves, on the contrary, the finder barrier (1) to its opening position side on the right in order to move the photographic lens barrier to its opening position side. This first drive means is driven manually or automatically by a motor.

When a signal indicating that the finder barrier position detecting means is in its closing position, the photographic lens barrel is moved back and when the photographic lens (31) is placed on the Tele side, the photographic lens barrier is moved to its closing position side in cooperation with the slanted cam surface (6b) of the cam member (6), a mechanism functions, which is reffered to as a second drive means.

The photographic lens in the embodiment according to the present invention does not project forwardly from a front service of the photographic lens barrel during the Tele-mode and Wide-mode operations, however, the photographic lens may project when the Tele-mode functions in case that the lens has a particular construction. It is also possible to employ another photographic lens barrel projecting forwardly when the photographic lens moves to its short focal point side or to its long focal point side.

It is a matter of course that the photographic lens barrier capable of moving its opening position for exposing the photographic lens and its closing position for covering the lens, may be formed or constructed integrally, of a type of Venetian blind or of a type of bending or rolling, although the photographic lens barrier is divided twice in the embodiment shown above of the present invention.

It is the possible to place the fender barrier, movable to its opening position exposing the finder lens portion and its closing position covering the finder lens portion, not only at the back of the eye lens as in the embodiment above, but also in front of the object lens, or otherwise at the back of the eye lens and in front of the object lens.

The above explanation has been applied to the embodiment of the present invention related to double focus camera, however the present invention can be applied to another camera provided with a photographic lens, such as a zoom lens or varifocal lens of the type with a continuously changeable focal point.

Next, a varifocal camera provided with a film supply condition detecting apparatus according to the present invention will be described with reference to the drawings, of which FIG. 5 shows a block circuit diagram depicting the whole construction of the film supply condition detecting apparatus. In FIG. 5, reference numeral (41) indicates a wind pulse generating circuit functioning as a pulse generating means; (41a) a dummy sprocket; (42) an edge detecting circuit as an edge detecting means; (43) an edge counter as edge counting means; R a reset input terminal in the edge counter (43); (44) an AND gate of plus logic two inputs; (45) a 100 ns delay circuit, (46a) and (46b) OR gates of three positive logic inputs; (47) a period timer used as a first time counting means; (48) a data latch as a time counting data holding means; (49) a data changeover circuit; (50) an initial data holding circuit; (51) a dividing timer used as a second time counting means; (52) a degital comparator as a time counting data comparing means; (53) an OR gate of positive logic two inputs; (54) a T type flip-flop used as a motor polarity changeover means (hereinafter referred for as a T-FF); (55) a several 100 ns delay circuit; (55) and (56) AND gates of plus logic two inputs; (57) and (57) OR gates of positive logic two inputs; (58) a motor ON-OFF circuit used as a motor ON-OFF means; (59) a motor drive circuit; (60) a motor for film advancing; (61) a shutter close detecting circuit for detecting the completion of shutter operation; (62) a manual rewinding input circuit for inputting an operational instruction for manual rewinding; (63) a rear cover close detecting circuit; (64) a frame counter; (65) a changeover circuit; and (66) an AND gate of plus logic two inputs.

The dummy sprocket (41a) engages with the perforations formed in the film supplied or moved by a motor (60) and rotated in order to drive a switch, for example, included in the wind pulse generating circuit (41) and to produce two equal pulses during the time one film frame equivalent to one scene is advanced. The output of the wind pulse generating circuit (41) is connected to the input of the edge detecting circuit (42) and the output of the edge detecting circuit (42) is connected to the input of the edge counter (43) and also to the third input terminal of the OR gate (46b). The output terminal (TP4) of these terminals (TP1–TP4) of the edge counter (43) is connected to the pulse input terminal (PI) of the changeover circuit (65), the first input terminal of the AND gate (44), the stop input terminal (ST) of the period timer (47), the latch input terminal (L) of a data latch (48), and the second input terminal of an AND gate (56a).

The output terminal of the OR gate (46a) is connected to the reset start input terminal R of the period timer (47), the data output terminal (DT) of the period timer (47) is connected to a data input terminal (DI) of the data latch (48); the data output terminal (DO) of the data latch (48) is connected to the data input terminal (DI) of the data changeover circuit (49); the data output terminal (OUT) of the data changeover circuit (49) is connected to the comparison input terminal (CM1) of the degital comparator (52); the decision output terminal (CMP) of the digital comparator (52) is connected to the first input terminal of the OR gate (53), as well as to the second input terminal of the OR gate (46b), to the second input terminal of the AND gate (56b) and the third input terminal of the OR gate (46a); and the output terminal of the OR gate (53) is connected to the toggle input terminal (T) of T-FF (54).

A non-reversible output terminal (Q) is connected to the first input terminal of the AND gate (56), through the delay circuit (55), as well as to the polarity input terminal (PCH) of the motor drive circuit (59), to the second input terminal of the AND gate (44) and the changeover input terminal (HG) of the changeover circuit (65). A reversible output terminal ($\overline{Q}$) is connected to each first and second input terminals of the AND gate (56a), (66). While, both the output terminals of the manual rewinding input circuit (62) and of the shutter close detecting circuit (61) are connected to the first input terminal and the second input terminal of the OR gate (57b) and the output terminal of the manual rewinding input circuit (62) is connected to the second input terminal of the OR gate (53).

The output terminal of the OR gate (57b) is connected to the ON input terminal (ON) of the motor ON-OFF circuit (58), as well as to the first input terminal of the OR gate (46b), the second input terminal of the OR gate (46a) and the reset input terminal (R) of the edge counter (43). When the rear cover of the camera is closed, the output terminal of the rear cover close detecting circuit (63) outputs a reset pulse and the output terminal is connected to the reset input terminal (R) of the frame counter (64) for counting the number of frames shot of the film; pulse output terminals (P1), (P2) of the changeover circuit (65) are connected to an increment input terminal (INC) and a decrement input terminal (DEC); a count output terminal (KP) is connected to the first input terminal of the AND gate (66); and the output terminal of the AND gate (66) is connected to the changeover input terminal (XG) of the data changeover circuit (49). The output terminal of the initial data holding circuit (50) is connected to the data input terminal (D2) of the data changeover circuit (49). The output terminal of the AND gate (44) is connected to the first input terminal of the OR gate (46a) through the delay circuit (45); the output terminal of the OR gate (46b) is connected to the reset start input terminal (R) of the dividing timer (51); and the data output terminal (DT) of the dividing timer (51) is connected to the comparison input terminal (CM2) of the digital comparator (52).

Respective output terminals of the AND gates (56a), (56b) are connected to the first input terminal and the second input terminal of the OR gate (57a); the output terminal of the OR gate (57a) is connected to the OFF input terminal (OFF) of the motor ON-OFF circuit (58); the output terminal of the motor ON-OFF circuit (58) is connected to the control input terminal (CTL) of the motor drive circuit (59) and also the stop input terminal (ST) of the dividing timer (51); and the output terminal of the motor drive circuit (59) is connected to the motor (60).

Next, respective signals output from respective circuits will be described. (a) shows a shutter close pulse output from the shutter close detecting circuit (61) at the time of the completion of shutter operation; (b) is a motor ON-OFF signal becoming that of L level when a pulse is impressed to the OFF input terminal (OFF) of the motor ON-OFF circuit (58) and of H level when a pulse is impressed to the ON input terminal of the circuit (58); (c) is a wind pulse output from the wind pulse generating circuit (41); (d) is an edge pulse output as an edge signal from the edge detecting circuit (42) for detecting each leading and trailing edges of the wind pulse (c); (TP1) is output at the time the first edge pulse (d) is input; and (TP4) is output the instant the fourth edge pulse (d) is input. In particular, the count output pulse (TP4) is a feed completion pulse used as a feed finishing signal; (e) is a time counting data output, as second time counting data, from a period timer (47); (f) is a time counting data, output, as third time counting data, from the dividing timer (51); (g) is a count 1 output signal only when the count value of the frame counter (64) becomes 1 of the H level and it becomes the L level when the count value of the frame counter (64) becomes other than 1 , (h) is a decision pulse of a decision signal which becomes the H level only the instant that the time counting data (f) input to the comparison input terminal (CM2) becomes over reference data (l) input to the comparison input terminal (CM1); (i) and (i') are OFF pulses input to the second input terminal and the first input terminal of the OR gate (57a); (j) is a motor drive signal for driving a motor; (k) is a manual input pulse output, when a manual rewinding operation is desired, from the manual rewinding input circuit (62); (l) is a standard data input to the comparison input terminal (CM1); DP4 is a delayed supply completion pulse of the supply completion pulse (TP4) delayed by several hundreds nanoseconds, (Q) is a normal-opposite signal showing at the normal rotation (film is rolled up) of the motor when it is at the L level and showing the opposite rotational direction (rewinding) of the motor when it is at the H level; ($\overline{Q}$) is a reversed signal obtained by reversing the normal-opposite signal (Q); and (DQ) is a delayed normal-opposite signal of the normal-opposite signal (Q) delayed by several hundreds nanoseconds.

When a pulse signal is impressed to the reset-start input terminal (R), the period time (47), the dividing timer (51) are reduced to zero the time counting data (e) and (f) to start again the time counting operation. That is, the period timer (47) stops its time counting operation when a supply completion pulse (TP4) is impressed to the stop input terminal (ST) to hold the then time counting data (a) and the dividing timer (51) stops its time counting operation the instant the motor-ON-OFF signal (b) impressed to the stop input terminal (ST) becomes the H level to hold the time counting data (f) at that time.

The data latch (48) is constructed so as to renew the reference data (time T wn-1) of the first time counting data required to supply a part of the film just one preceeding what has been held at the time that the supply completion pulse (TP4) is impressed to the latch input terminal (L) to time counting data (e) to latch the data (e) as new reference data. From the data output terminal (D0), data latched are always being outputted.

The data changeover circuit (49) is constructed so as to connect the data input terminal (D2) to the data output terminal (OUT) when the signal to be impressed to the changeover input terminal (XG) is at the H level and to connect contrarily the data input terminal (D1) to the data output terminal (OUT) when it is at the L level. In this example, the initial data adapted to be output from the initial data holding circuit (50) is set one second and the initial data is output continuously T-FF (54) constructed to set the normal-opposite signal (Q) at the L level and to reverse the output everytime a pulse is input to the toggle input terminal (T). The motor drive circuit (59) turns the motor ON when the motor ON-OFF signal (b) impressed to the control input terminal (CTL) becomes the H level and rotates normally the motor (60) along the advancing direction when the motor is turned ON and the normal-opposite signal (Q) to be impressed to the polarity input terminal (PCH) is at the L level and rotates oppositely the motor along the opposite or rewinding direction when it is at the H level in order to control the motor (60).

The changeover circuit (65) connects the pulse input terminal (PI) to the pulse output terminal (P1) when the normal-opposite signal (Q) impressed to the changeover input terminal (HG) is at the L level and connects on the contrary the pulse input terminal (PI) to the pulse output terminal (P2) when it is at the H level. The frame counter (64) increments the counting value by one everytime one pulse is impressed to the increment input terminal (INC), decrements the counting value by one count everytime one pulse is impressed to the decrement input terminal (DEC), and zero-clears the counting value at the time a reset pulse is impressed to the reset input terminal (R).

FIGS. 6–10 show timing charts showing the operational wave of the respective parts shown in FIG. 5. In the drawings of FIGS. 6–11, these similar or corresponding to the signal, time, and timing and the like are shown by the same reference numerals and the same explanations applied to them are omitted from the following description. In this embodiment of the varifocal camera, a roll of 36 frame film is used.

In FIGS. 6 to 10, these reference numeral of ($T_0$), ($T_2$), ($T_4$), ($T_6$), designate timing at which respective shooting operations (shutter operation) are completed to start the film advancing functions, ($T_1$),($T_3$),($T_5$),($T_7$) are respectively indicate timing at which respective film advancing operations are finished; ($T_0$)–($T_1$) are periods of the advancing operations of the first part of film for the first frame; ($T_2$)–($T_3$) are those of the second frame; ($T_4$)–($T_5$) are those of the third frame; ($T_6$)–($T_7$) are those of the last 35th frame. Consequently, the first frame shooting operation is performed before the time ($T_0$) is reached; ($T_1$)–($T_2$) show the periods of shooting operations of the second frame; ($T_3$)–($T_4$) depict the periods of the third frame and so on; and ($T_7$)–($T_8$) depict those of the last 36th frame.

(ts) shows a half period of the wind pulse (c); ($t_1$, $t_2$, $t_3$, $t_4$) respectively show the first, second, third, and fourth rising timing of edge pulses (d); TW shows the supply time (in FIG. 6, it is film advancing time) for one film frame, and additional numerals show the number of shootings by the camera. Consequently, $TW_1$ is a time for feeding the first frame; and TWn is a time for feeding the (n)th frame. In this embodiment, n=36. In the period $(T_6)-(T_7)$, n=35.

$(T_8)$ is the timing at which the 36th frame advancing operation starts; $(T_9)$ is a transient time through which the film advancing operation is transfered to the rewinding operation or at which the rewinding operation of the 36th frame starts; $(T_{10})$ is the timing at which the rewinding operation of the 35th frame starts, $(T_{11})$ is the timing at which the rewinding operation of the 34th frame starts; $(T_{12})$ is the timing at which the rewinding operation of the first frame starts; and $(T_{13})$ is the timing at which the No. zero frame starts or at which the leading portion of the film being set in the camera body starts to be rewound; $(T_{14})$ is the timing at which the rewinding operation of the film finishes; and (td) is a delay time of several hundreds nanoseconds.

In FIG. 8(a), $(T_3')$ is the starting timing of the manual film rewinding operation and $(T_9')-(T_{10}')$ are rewinding operations for a single film frame shooting.

Figure 11:
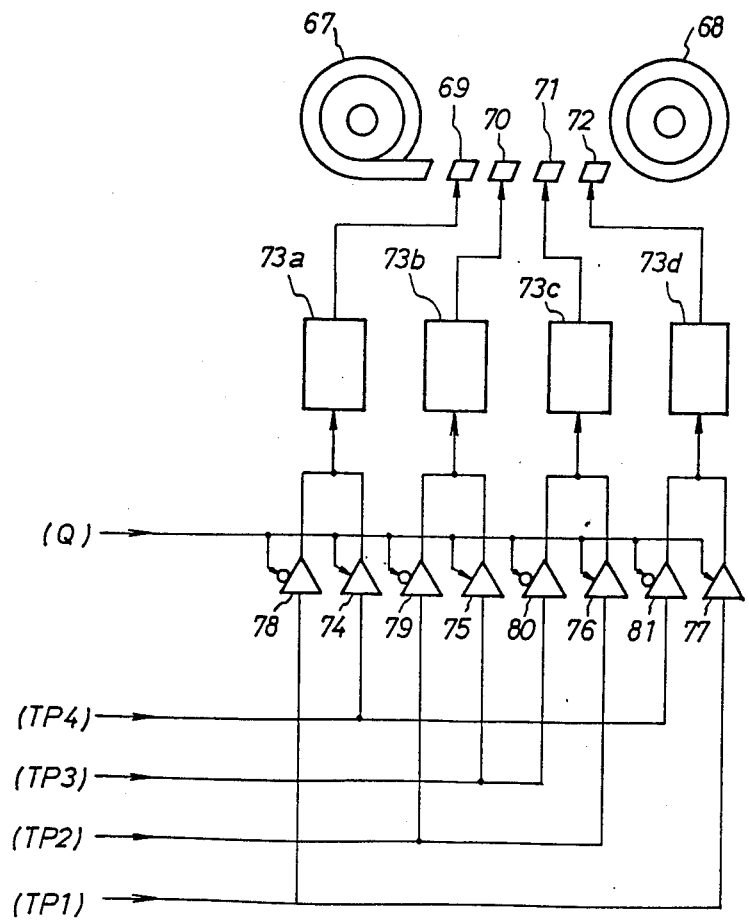
FIG. 11 is a block diagram showing a construction of the embodiment shown in FIG. 5.

FIG. 11 shows a block diagram of the construction of the embodiment according to the present invention. In this drawing, (67)-(72), respectively, show the display portions of a liquid crystal indicator, which portions are seen black when voltage is impressed to them. (67) shows a patrone (phonic) or film container side; (68) a film advancing side; (69)-(72) indicating dots for indicating the feeding condition; (73a)-(73d) drive circuits for the liquid crystal indicator mentioned above; and (74)-(81) three-state buffer gates having a high impedance at their outputs, of which (74)-(77) are constructed so as to be operable when the gate input terminal is at the H level and (78)-(81) are structured so as to operable when the gate input terminal is at the L level. A film advancing side indicator (68) (not shown) is constructed so as to flash when an autoloading, which will be described later, fails.

Input terminals of the buffer gates (78)-(81), respectively, are connected to each count output terminal (TP1)-(TP4) of the edge counter (43) input terminals of other buffer gates (74)-(77) are similarly connected to each of the count output terminals (TP4)-(TP1). Each gate input terminals of the buffer gates (74)-(81) are connected in parallel to these non-reverse output terminals (Q) of T-FF 14; output terminals of these pairs of buffer gates (74) and (88), (75) and (79), (76) and (80), (77) and (81) are connected to each other and they are connected to each input terminals of drive circuits (73a)-(73d) of the liquid crystal indicator. The output terminals of these drive circuits (73a)-(73d) of the liquid crystal indicator are individually connected to the indicating dots (69)-(72).

The operation of the embodiment constructed as described above will be explained.

Before describing the advancing operation of the film with reference to FIG. 6, previous or preliminary explanation will be made on the varifocal camera according to the present invention. A roll of film is loaded in the camera body and the rear recover thereof is closed to output a reset pulse from the rear cover close detecting circuit (63) and to make zero-clear of the frame counter (64). Additionaly, the motor (60) for feeding the film is impressed for the predetermined length of time to apply automatically the film part around the advancing spool or camera magazine. When the operation above is done normally, the frame counter (64) increments one by making the count value one. At that time, because no change occurred on the advancing side indicator (68) as shown in FIG. 11 or no flashing of light on the indicator, the operator knows the completion of preparation for shooting. Pushing a release button, light measurement, distance measurement, and focassing operations are automatically carried out. Thus, the camera waits for a series of shooting or photograph taking operation including the shutter operation. When a close operation of the shutter completes at the time $(T_0)$, a shutter close pulse (a) is output from th shutter close detecting circuit (61) and the advancing operation of the first frame film part starts.

The shutter close pulse (a) output at the time $(T_0)$ is input to the ON input terminal (ON) of the motor ON-OFF circuit (58) through an OR gate (57b), thus making the motor ON-OFF signal (b) at the H level and starting the motor (60) to rotate along the film rolling-up direction. While the shutter close pulse (a) reset the edge counter (43) in its initial condition to start the time counting operation of the dividing timer (51) and the period timer (47) through these OR gates (46a), (46b). Driving rotation of the motor (60) starts to supply the film to rotate the dummy sprocket (41a) engaged with the perforations of the film edges, generating wind pulse (c) from the wind pulse generating circuit (41). The edge detecting circuit (42) outputs the edge pulse (d), every a half period (ts), this wind pulse (C) or at the instants $(t_1)$, $(t_2)$, $(t_3)$, and $(t_4)$. Because the edge pulse (d) is input to a reset start input terminal (R) of the dividing timer (51) through the OR gate (46b), the time counting data (f) of the dividing timer (51) zero-clarifies the time counting data which has been stored at the instants $(t_1)$, $(t_2)$, $(t_3)$ and new time counting starts again.

Figure 9:
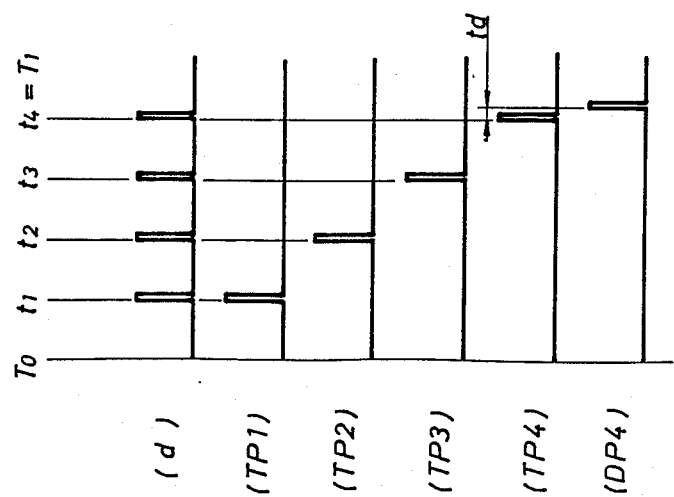
FIG. 9 is a timing chart showing the pulsation of an edge counter operation in the embodiment shown in FIG. 5.

Next, the operation of the edge counter (43) will be decribed in detail with reference to FIG. 9. The edge counter (43) outputs a count output pulse (TP1) instant $(t_1)$ the first edge pulse (d) is input and outputs another count output pulse (TP2) at the time $(t_2)$ the second edge pulse (d) is input. The similar operations will be continued. At the time $(t_4)$ the fourth edge pulse (d) is input, it outputs a film feed operation completion pulse (TP4). That is, it is said that the edge counter (3) keeps on the supply of a film part for one frame.

The time counting data (f) reset every time (ts) is input to the comparison input terminal (CM2) of the degital comparator (52). When the T-FF 54 is in its initial condition, the normal-reverse signal (Q) is at the L-level, and the reversed normal-reverse signal ($\bar{Q}$) is at the H level, so that these AND gates (66), (56) are kept at their ON condition and the AND gate (44) is in its OFF condition. Because that the count value of the frame counter (64) equals to 1, the output signal of count 1 is H level. As a result, the data changeover circuit (49), the data input terminal (D2) and the data output terminal (OUT) are connected to each other, so that the initial data of on second of an output of the initial data holding circuit (50) is input to another comparing input terminal (CM1) of the degital comparator (52) as the reference data (l). They are compared during that time $(T_0)-(t_4)$ and when the film is supplying normally, (ts) is far less than one second (ts < <l) so that no output of any decision pulse (h) occurs. When it reaches the time $(t_4)$ or $(T_1)$, a film supply completion pulse (TP4) is output and the supply completion pulse (TP4) is input to the pulse input terminal (P1) of the changeover circuit (65) and the pulse (TP4) is output from the pulse input terminal (P1) to be compressed to the increment input terminal (INC). Thus, the count value of the frame counter (64) is increased by one becoming two (2)

and the output signal (g) of count 1 at the L level. As a result, in the data changeover circuit (49), the data input terminal (D1) and the data output terminal (OUT) are connected to each other.

Additionally, the supply completion pulse (TP4) stops the counting operation of the period timer (47) and have the supply time ($TW_1$) of the first frame counted during the time of ($T_0$)–($T_1$) as time counting data (e) kept in the data latch (48). Simultaneously, the supply completion pulse (TP4) is input as an OFF pulse (i') to the OFF input terminal (OFF) of the motor ON-OFF circuit (58) through the AND gate (56), setting the motor ON-OFF signal (b) at the L level, stopping the motor (60). The L level motor ON-OFF signal (b) stops the time counting operation of the dividing timer (51). Thus, the film advancing operation for the first frame has thus been finished and the film part for the second frame is supplied.

Next, when the release button is again pushed at the suitable timing ($T_1$)–($T_2$), the series of operations above for the second frame will be carried out at the time ($T_2$) the shutter close pulse (a) showing the completion of photograph shooting operation is output. The advancing operation of the second frame after the time ($T_2$) generally equals to that of the advancing operation of the timing ($T_0$)–($T_1$), excepting that the supply time ($TW_{n-1}$) of the previous frame is surely used in the operation of the second frame and the further. However, there is no data of the previous supply time ($TW_{n-1}$) in the operation of the first frame, so that initial data (TW)=1 second is used exclusively in the case of the first frame.

When the thirty fifth frame is advanced during ($T_6$)–($T_7$) and the last thirty sixth film frame is supplied, the release button is pushed at the suitable timing of ($T_7$)–($T_8$), the shorting operation for the film part of the thirty sixth frame being carried out, whereas the shutter close pulse (a) is output at time ($T_8$). In this instance, it is presumed that there is no extra film part and the film part remained around the magazine care of the film container is slight strained.

The embodiment of the present invention will be described with reference to FIG. 7. The shutter close pulse (a) starts the operations of the period timer (47) and the dividing timer (51) then to raise the motor ON-OFF signal (b). Although the motor drive signal (j) is directed to the normal rotation side to make the motor (60) start to roll up the thirty sixth frame, the film has no margin due to the fact that no film part remains as it is. Consequently, no wind pulse (c) occurs and a decision pulse (h) is output from the degital comparator (52) the instant ($T_3$)–($TW_{36}$) is made longer than ($TW_{35}$) until ($TW_n$) becomes longer than ($TW_{n-1}$) without the dividing timer (51) is again energized during the time ($T_8$)–($T_3$) as shown in FIG. 6. This judgement pulse (h) is input to the toggle input terminal (T) through the OR gate (53) to invert the output of T-FF 54 and input to the period timer (47), the dividing timer (51) via these OR gates (46a), (46b) to restart them. Th judgement pulse (h) input to the second input terminal of the AND gate (56) does not output a OFF pulse (i), because the delayed normal-reverse signal (DQ) is raised after the delayed time (td) has elapsed from the time ($T_3$), keeping the rotation of the motor (60). Because no supply completion pulse (TP4) has not been input until the time ($T_3$), the data latch (48) keeps ($TW_{35}$) the proceeding time counting data by two.

Owing to inversion of the output of T-FF 54, the normal-reverse signal (Q) is set at the H level and the inverted normal-reverse signal (Q) is set at the L level, and the conditions of them are maintained. As result, the motor drive signal (j) is downed along its reversing direction at the time ($T_3$), making the AND gate (56a), (66) of OFF condition. In the changeover circuit (65), the pulse output terminal (P2) is made effective and the AND gate (44) is set in ON condition, and the AND gate (56b) is set in ON condition after the delayed time (td) has elapsed a mentioned above. The motor (60) starts reverse rotation for rewinding the film from the time ($T_9$), feeding the film along the opposite direction, whereas the dummy sprocket (41a) also starts its reverse rotation. It is transfered to the rewinding operation for the thirty sixth frame. The dummy sprocket (41a) is kept in position after the second wind pulse (c) downs at the time ($T_7$), so that when it starts along the reverse rotation direction, it will be raised from the time ($t_1$) just after the time ($T_9$). Consequently, the dividing timer (51) restarts at each of the ($T_9$), ($t_1$)–($t_4$). At the time ($t_4$) or time ($T_{10}$). The feed completion pulse (TP4) is output to stop the period-timer (47). The data of the supply time ($TW_{35}$) required to advance the thirty fifth (35) frame at ($T_6$)–($T_7$) kept in the data latch (48) is renewed to that of another supply time ($TW_{36}'$) required to roll back the film part at ($T_9$)–($T_{10}$) to complete the rewinding operation for the thirty sixth (36) frame of the film part.

The feed completion pulse (TP4) is used as a delayed supply completion pulse (DP4) after being delaying by (td) from the time ($T_{10}$) by means of the AND gate (44) and the delay circuit (45). The operation above is not shown in FIG. 7, however by replacing the reference numerals ($T_0$) and ($T_1$) with ($T_9$) and ($T_{10}$), respectively shown in FIG. 9 the operation is self-explanatory. At ($T_4$)=$T_{10}$, the dividing timer (51) is restarted and after the (td) time the period timer (7) is restarted to start the rewinding operation of the thirty fifth (35) frame. The delayed time (td) is several hundreds nano seconds (ns) and the supply time ($TW_n$) extends over several hundreds milli seconds, so that (td) is not made an error of the supply time ($TW_n$). Because the motor-ON-OFF signal (b) is kept at its H level during ($T_9$)–($T_{14}$), the dividing timer (51) doesn't stop.

During the time ($T_{10}$)–($T_{11}$), as described above, the film rewinding operation of the thirty fifth frame is carried out, the thirty fourth frame, the thirty third frame, and so on, and the second frame is similarly rewined and at ($T_{12}$)–($T_{13}$), the first frame is rewound. The film part to be shot is at the end of the first frame and at ($T_{13}$)–($T_{14}$) the leading portion of the film rolled around the spool or the advancing side is automatically rewound. At ($T_{13}$), the dividing timer (51) again starts its operation and the period timer (47) again starts at the time delayed by (td) to start the rewinding operation of the zero frame. At ($t_1$), passing of the leading portion of the film through the dummy sprocket (41a) is terminated to stop the dummy sprocket (41a). At ($t_1$), the edge pulse (c) is not input after then to the dividing timer (51) restarted, so that the dividing timer continues its time counting operation. When the time counting data (f) output one after another is over, the reference data (1) as supply time ($TW_1'$) necessary at ($T_{12}$)–($T_{13}$) or at time that ($TW_0'$) becomes greater than ($TW_1'$), and the degital comparator (52) outputs a decision pulse (h) at ($T_{14}$). This decision pulse (h) is input to the AND gate (56), and reverses the output of T-FF14 through the OR gate (53). At ($T_{14}$), the normal-reverse signal (Q) descends and the reversed normal-reverse signal (Q) rises, so that delayed normal-reverse signal (OQ) downs after (td) delaying.

As a result, at ($T_{14}$) an OFF pulse (i) is input to the OFF input terminal (OFF) of the motor ON-OFF circuit (58) through the OR gate (57a), setting the motor drive signal (j) at an OFF level to stop the motor (60). Thus, the automatic film rewinding is finished.

Figure 10:
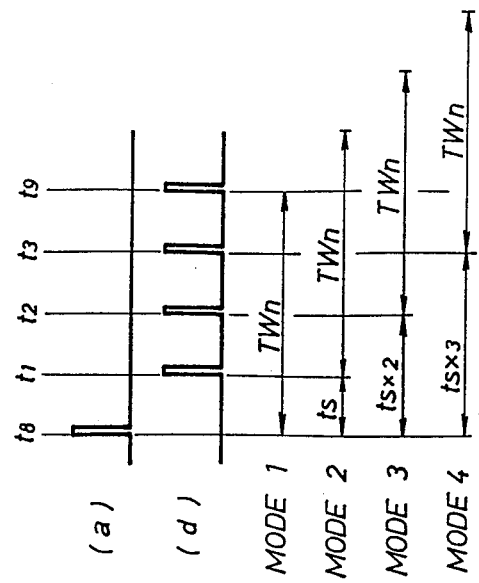
FIG. 10 is a timing chart depicting the pulsation of these modes of the dividing timer of the embodiment shown in FIG. 5.

Assuming that when the film part of the thirty fifth (35) frame at the timing ($T_6$)-($T_7$) is advanced with the thirty sixth (36) frame supplied, there is no extra part of the roll of film making the film tension, and the leading portion of the film at the times ($T_{13}$)-($T_{14}$) has a sufficient length so as to accomodate the situation at ($t_1$). For example, making the time ($T_8$)-($T_9$) by way of example, the time ($T_8$)-($T_9$) will be explained. The operation of the dividing timer (51) from the time ($T_8$) where it receives a shutter close pulse at ($T_3$) when a decision pulse (h) is output is divided into four modes (1)-(4) as shown in FIG. 10. The dividing timer (51) operates in the mode (1) until the time (Ts) at which the dividing timer (51) is started by a shutter close pulse (a) becomes the content of ($TW_n$) larger than ($TW_{n-1}$). The similar procedure will be continued and the dividing timer (51) is started by the first edge pulse (d) in the mode (2) and it will be started with the second and the third edge pulses (d) in the modes (3), (4). That is, the operation shown at ($T_8$)-($T_9$) in FIG. 7 corresponds to that of the mode (1) in FIG. 10, and the operation of ($T_{13}$)-($T_{14}$) is apparent correspondent to the mode (2). The modes (1)-(4) mean ending of the film during its advancing operation or allowable degree of less than four times of semi-period (ts) of at most the wind pulse (c) for detecting the completion of passing of the leading portion of the film during its rolling-back operation. That is, in case of the mode (1) in which there is no extra part of the film at the end thereof, so that it is reasonable to transfer the rewinding operation just after the previous supply time ($TW_{n-1}$) is over. In the case of the mode (4) there is extra part of the film corresponding to the length from the time ($t_3$) to the time (ts) multiplied by three (3), so that it is reasonable that the rolling operation of the film is transfered to its rewinding one at the time it exceeds the supply time ($TW_{n-1}$) from the time ($t_3$).

According to the prior art, because that the contents ($TW_{n-1}$) of the standard data (l) for the judgement is fixed, it is necessary to set the time at least longer than the max or longest time (ts×3)+$TW_{n-1}$ as shown in the mode (4) in order to as adapted to variations of the extra length of the end of film described as to the modes (1)-(4). Consequently, it has been improper to continuously drive for the longest the motor (60) for a long time even when there is no extra portion of an end portion of film as in the mode (1). According to the embodiment of the present invention, the drawbacks mentioned above are surely prevented.

Next, a manual rewinding operation of the film will be explained.

Figure 6:
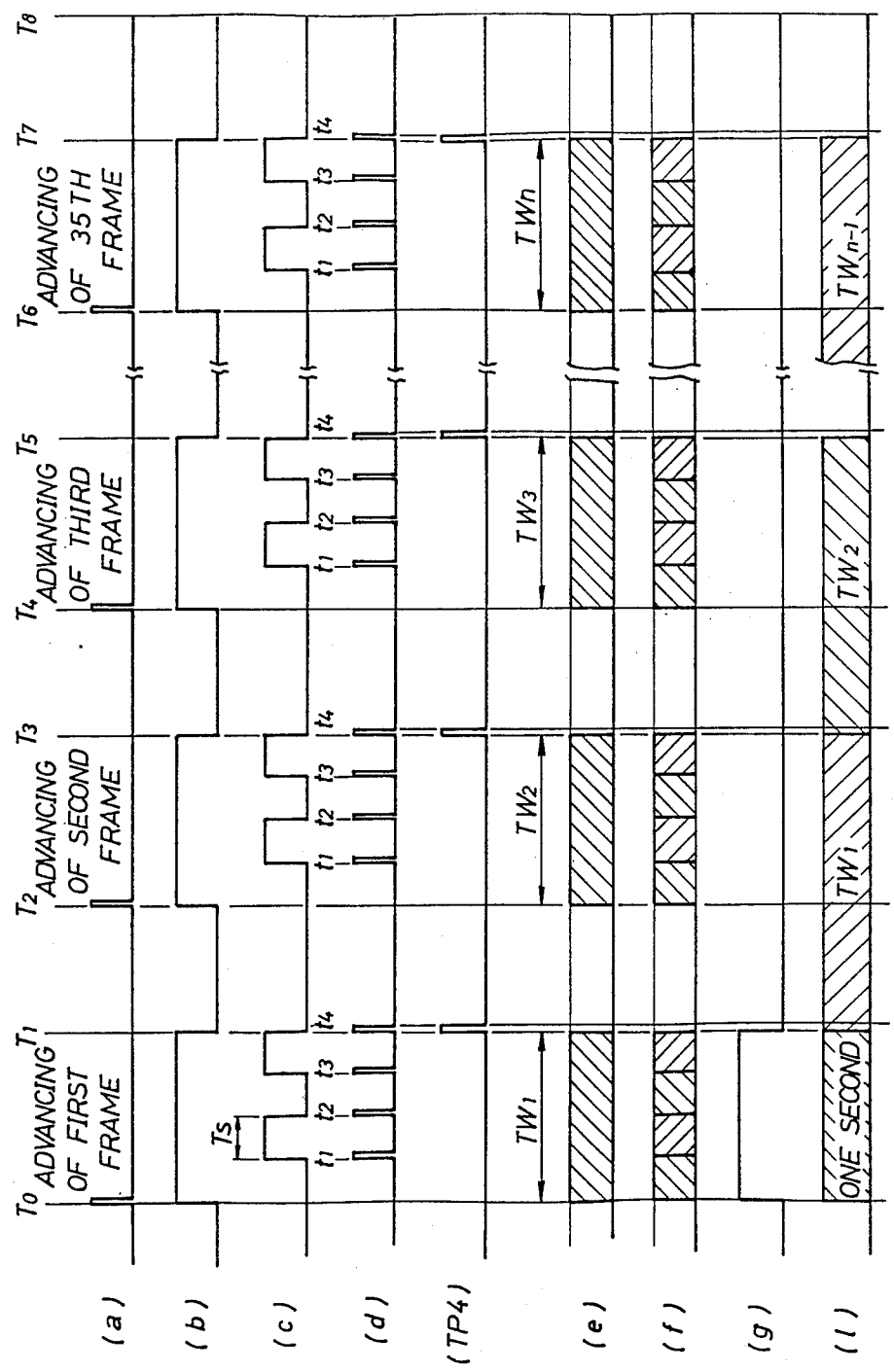
FIG. 6 is a timing chart showing the pulsation of film advancing operation in the embodiment shown in FIG. 5.
Figure 7:
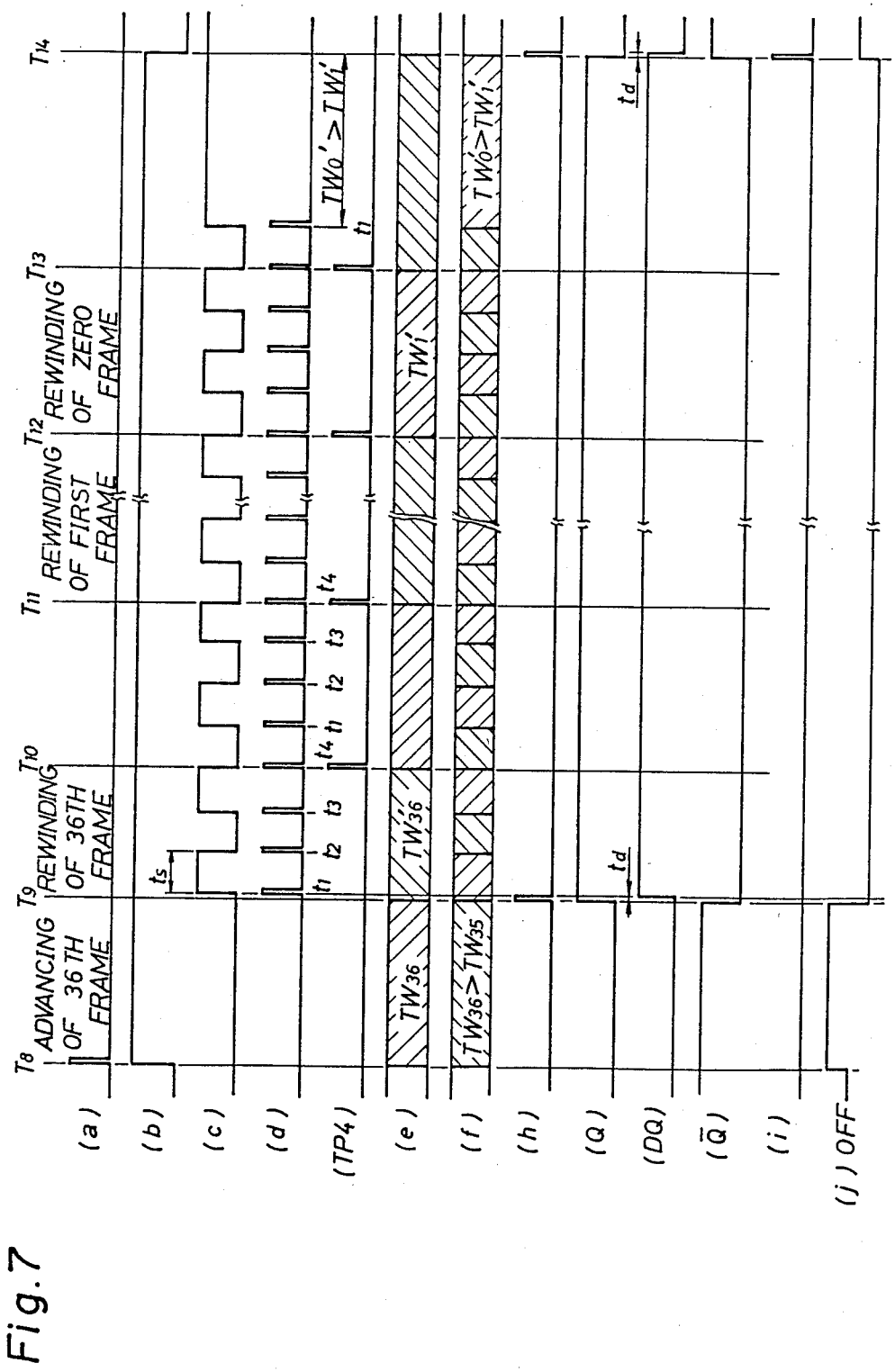
FIG. 7 is another timing chart showing the pulsation of an automatic rewinding operation in the embodiment shown in FIG. 5.
Figure 8:
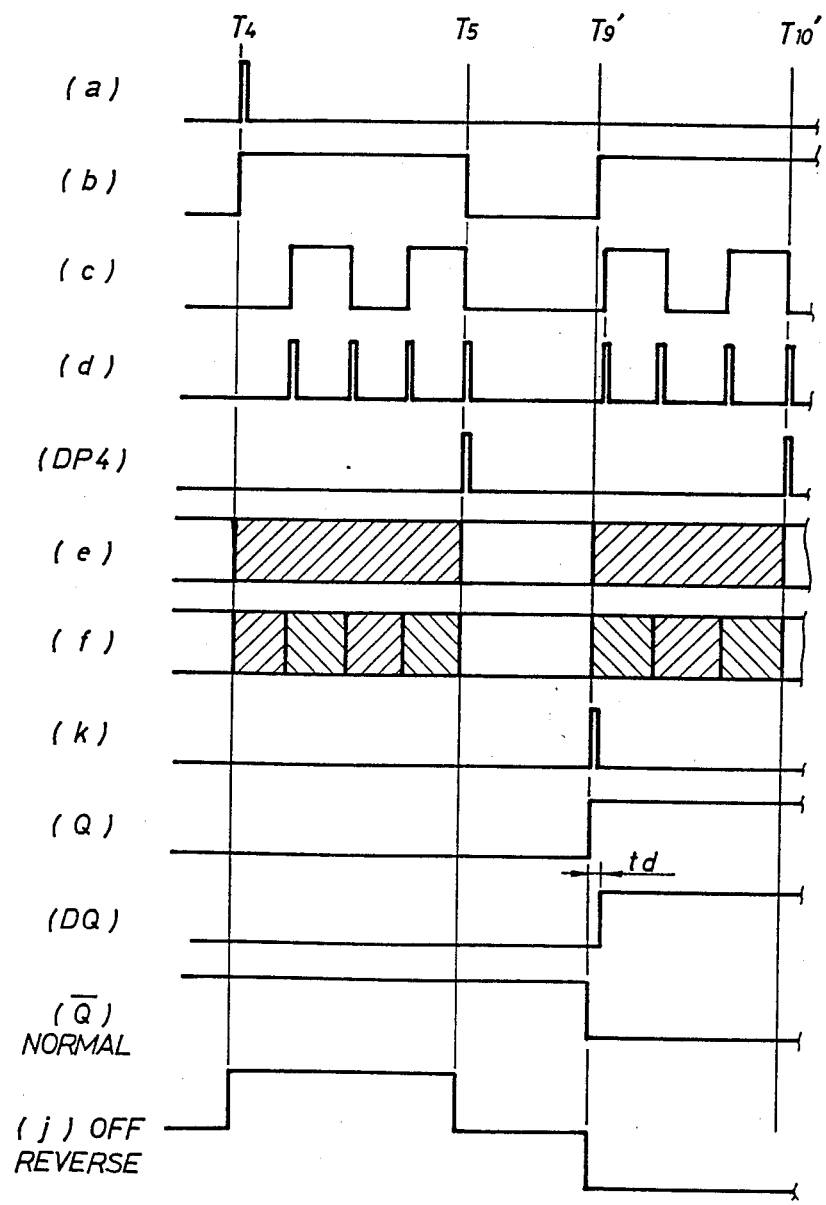
FIG. 8 is still another timing chart showing the pulsation of manual rewinding operation in the embodiment shown in FIG. 5.

As shown in FIG. 8, at ($T_4$)-($T_5$), rewinding the third film frame is completed (this operation is similar to that at ($T_4$)-($T_5$) shown in FIG. 6), then at the time ($T_3'$), the operator of the camera generates a manual input pulse (K) through the manual rewinding input circuit (62). The manual input pulse (K) is input to the toggle input terminal (T) through the OR gate (53) to invert the output of the T-FF 54, simultaneously motor ON-OFF signal (b) is set at the H level by means of the OR gate (57b) and the motor ON-OFF circuit (58). Then both the period timer (47) and the dividing timer (51) are operated to start their operations. The normal-reverse signal (Q) inverted to the H level has the polarity of the motor drive signal (j) switched to the opposite direction and reverses the direction of the motor (60) into the rewinding direction to carry out the rolling back of the third frame at ($T_3$)-($T_{10}'$). The operations at ($T_9'$)-($T_{10}$) are similar to that of the time ($T_9$)-($T_{10}$) shown in FIG. 7, excepting for the decision pulse (h) and the number of the frames shot by the camera.

Consequently, the operation advances further from that of the second film frame, of the zero frame or, as in FIG. 7, from the operations at the time ($T_{10}$)-($T_{11}$) to that at ($T_{12}$)-($T_{13}$), so that the manual rewinding operation is finished at ($T_{14}$).

The operation of the embodiment shown in FIG. 11 will be explained.

Assuming that, at the mode of the rewinding operation, the normal-reverse signal (Q) is that at the L level and the buffer gates (78)-(81) are in operational condition and the output terminals of the buffer gates (74)-(77) are in high impedance condition, so that the output terminals of the buffer gates (78)-(81) are connected to the input terminals of the drive circuits (73a)-(73d). When film advancing operation begins, count output pulses (TP1)-(TP4) are output from the edge counter (43) at timing of ($t_1$)-($t_4$) and the display dots (69)-(72) are displayed by means of the drive circuits (73a)-(73d). As a result, the display is moved from the left to right on the sheet of the drawing, so that the focal condition of the film can be confirmed in the manner of real time or on time. During the rewinding operation, the normal-reverse signal (Q) as similar to the case mentioned above becomes that at the H level and the buffer gates (74)-(77) are set in operational condition. So that, the display dots (72)-(69) are sequentially driven and moved leftwardly, and the feed condition of the film along its rewinding direction can be confirmed in the manner of real time.

As described above, according to the embodiment of the present invention, the feed time ($TW_{n-1}$) of the previous one as the contents of the standard data (l) is observed everytime a film part corresponding one frame is fed in order to detect or judge the end portion of the film (completion of film rewinding operation) and the pulled out portion of the film (completion of rewinding), so that the observing operation can be carried out in the best condition without being effected due to the variation of supply time for use or consumed condition of the cells installed in the camera. Because the feeding or supply time for one frame of a photograph is divided into four edge pulses (d) of substantially equal and the dividing timer (51) is restarted at the rising time (for example, $T_0$) of each shutter close pulse (a) and the rising ($t_1$), ($t_2$), ($t_3$) of each edge pulse (d), it is possible to suitably control the unknown extra length of the end portion of film. Consequently, a great deal of the basic data as in the conventional system is made unnecessary, whereas it is not necessary to analyze the basic data. No overload is applied to each part of mechanism such as a gear and the film in the film end portion can be dealt with. This means it is not necessary to provide some mechanism for detecting the film end portion. Accordingly, the whole mechanism of the camera can be made compact and suitably controlled, so that we can save energy of the battery being consumed in the varifocal camera according to the present invention.

It is possible to construct the camera so as to drive the display dots (69)–(72) by the count output pulses (TP1)–(TP4). Thus, it is possible to confirm the supply condition of the film in a manner of real time.

According to the another embodiment of the present invention, it is not exclusive to two (2) of the wind pulse (c) to single frame, and it may be increased or decreased in number. When it is made increased, more suitable control over film end detection is possible.

It is possible to install a micro computer in the construction shown in FIG. 5 and to operate it with software, obtaining simple and compact construction of the varifocal camera according to the present invention.

The frame counter (64) may not only use a count 1 (one) output (g), but also refer the count value. In this case, even the dummy sprocket (1a) and the like does not work well, it is possible to rewind the film while referring the indication of the frame counter (64).

It is possible not to use the content $(TW_{n-1})$ of the standard data (I) as it is, but use a modified one to obtaining such as $(TW_{n-1}) \times 2$, $(TW_{n-1}) \times \frac{1}{2}$. In this case, it is possible to set a time suitable for the function or structure of the mechanism so as to supply the film to the camera body.

In order to generate a wind pulse (c) from the wind pulse generating circuit (41), it is used in not only the system in which the rotation of the dummy switch (41a) turns a mechanical switch ON or OFF, but also another system in which a light projection element and a light receiving element are installed in the range in which the perforations of a film in the camera in order to produce wind pulses (c) in response to passing the perforations.

Next, the embodiment of the varifocal camera provided with a camera control means according to the present invention will be described with reference to the accompanied drawings.

Figure 12:
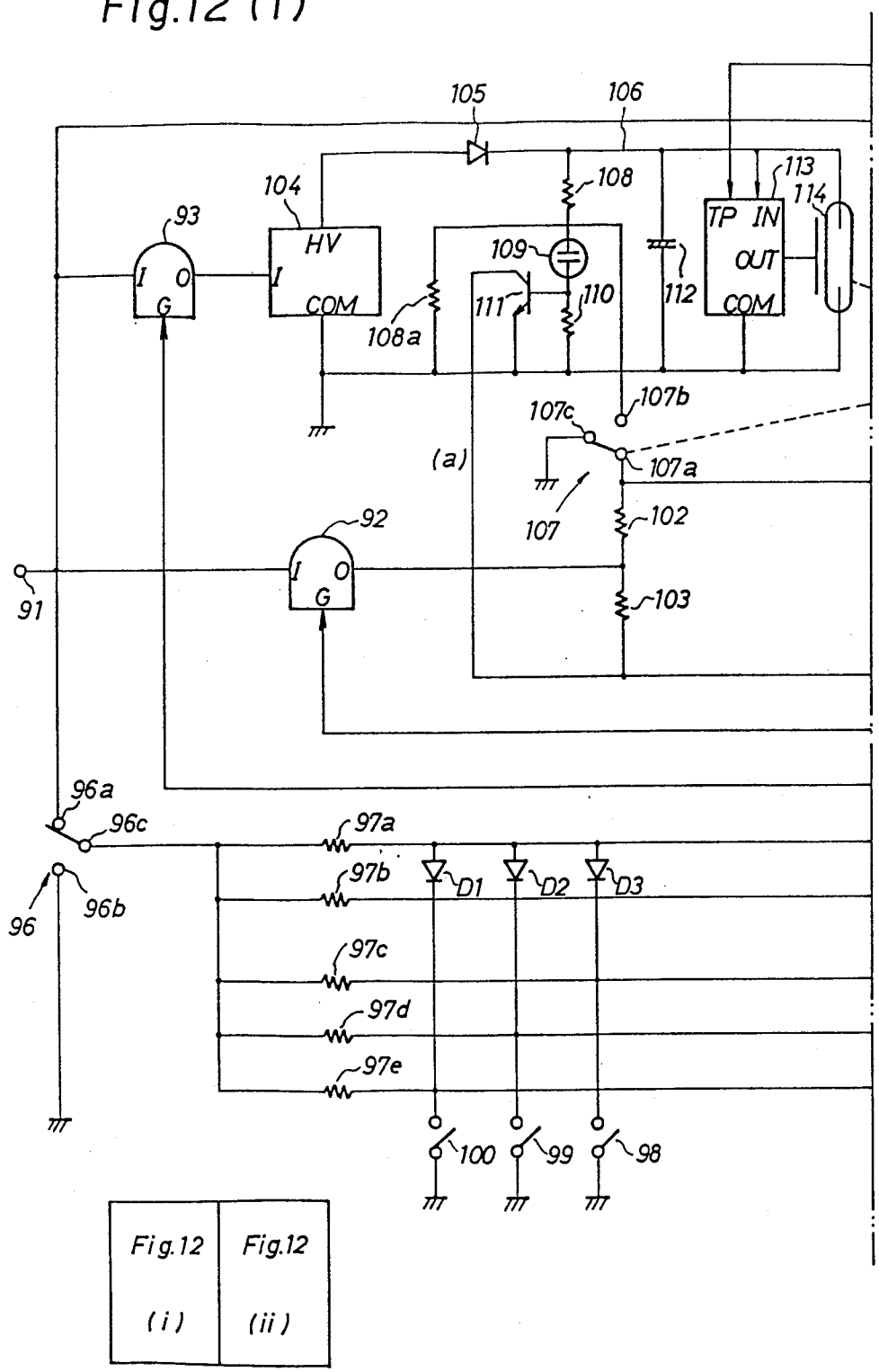
FIG. 12 is a block diagram depicting the whole construction of one of embodiments of the camera control apparatus in the varifocal camera according to the present invention.

FIG. 12 shows a block diagram depicting the whole construction of the embodiment of the camera control device of the varifocal camera. As shown therein, the reference numeral (91) indicates a power source input terminal to which a cell of several voltage (not shown) connected; and (92)–(95) are electronic switches constructed by transistors and resisters having each input terminal (I) connected to the power source input terminal (91) and each output terminal (0) connected to the loads mentioned below. When the level of the gate input terminal (G) becomes of a L level, each electronic switches (92)–(95) become ON condition and when they becomes the H level, the switches (92)–(95) become OFF condition. (96) is a barrier open-close switch operatively connected to a lens barrier (not shown), (96a) on an open side contact connected to the power source input terminal (91). (96b) is an earthed close side contact, and (96c) is a common contact.

Each terminal of these elements (97a), (97b), (97c), (97d), 97e) are connected to the common contact (96c) and another terminal of these elements is connected to the interruption input terminal (INT0), identification input terminals (VAR), (CNT), (RL2), (RL1) are pull-up resistors (98), (99), and (100) are a continuous shooting mode switch, the second release switch, and the first release switch. Each end of the elements (98), (99), (100) is earthed and other ends of the elements are connect respectively to identification input terminals (CNT), (RL2) and (RL1) are further connected to the interruption input terminal (INT0) through these short-circuit prevention diodes (D3), (D2), (D1). The continuous shooting mode switch (98), when it is closed (ON condition), become a continuous shooting mode and, when it is open, a single frame shooting mode. The operation of mode changing is effected by a shooting mode setting means constituted by the switch (98). The first release switch (100) and the second release switch (99) constitute a shooting operation starting means for initializing a photograph-taking operation when these switches are closed (ON Condition). As described below, the first release switch (100) initializes the light measurement operation and distance measurement operation, and the second release switch (99) mainly starts the shutter function and film rolling-up operation. (101) shows a control portion (hereinafter referred to as a CPU) constituted by, for example, a micro computer of 4 bit data service 4.

In this (CPU), (INT0) means is an interruption input terminal initializing interruption operation by edge-change of the signal impressed to the (INT0). (VAR), (CNT), (RL2), and (RL1) are identification input terminals for identifying which switch among (96), (98)–(100) are the interruption source when the interruption operation is initialized (CTL), (SPL), and (BL) are control output terminals, respectively, connected to the gate input terminal (G) of the electronic switches (92), (93), and (95) to keep the H level when it is not operated. (CMD) is a command output terminal for outputting a command for shutter operation, light measurement operation, and strobe flashing. (ROK) and (STB) are input terminals used to watch the conditions of the CPU (101) and others. (MC1) and (MC2) are control output terminals for controlling the film supply means.

Additionally, the CPU (101) is constructed so as to stop clock oscillation standardizing the interruption operation and keep it in a halt condition.

102), (103) have respective terminal connected to the output terminal (0) of the electronic switch (92) and other terminals which are connected to the input terminals (STB) and (ROK) of the CPU (101). (104) is a DC-DC converter having an input terminal (I), a common terminal (COM), and an output terminal (HV), the input terminal (I) being connected to the output terminal (0) of the electronic switch (93). The common terminal (COM) is earthed, and the output terminal (HV) outputs pulse-like AD voltage of several 100 volt when the electronic switch (93) is turned ON, the DC-DC converter being refered to as a (DDC) hereinafter. (105) shows a rectifying diode having an anode connected to an output terminal (HV) of the DDC (104). (106) is a high voltage line connected to a cathode of the rectifying diode (105). (107) is a pop-up switch. (107a) is an UP side contact connected to the input terminal (STB) of the CPU (101). (107b) is an OFF side contact. (107c) is a common contact grounded.

Furthermore, a reference numeral (108) is a current limit resistor whose terminal is connected to the high voltage line (106). (109) is an neon tube and has an end terminal connected to the other end of the current limit resistor (108), an OFF side contactor (107b) of the pop-up switch (107), and an end of a partial voltage resistor (107a). (110) is a voltage detecting resistor having an end connected to the other end of the neon tube (109), the other end being grounded together with the other end of the partial voltage resistor (108). (111) is a NPN junction type transistor having the base connected to an end of the voltage detecting resistor (110), a collector connected to an input terminal (ROK) of the CPU (101), and an emitter grounded to output a charging completion signal (a).

(112) is a main capacitor having an end connected to the high voltage line (106), the other being earthed. (113) is a trigger circuit having a common terminal (COM) grounded and an input terminal (IN) connected to the high voltage line (106). (114) is a flash light tube containing for example, xenon (Xe) gas and has one of the main electrode connected to the high voltage line (106), the other electrode being earthed, and an excitation electrode connected to an output terminal (OUT) of the trigger circuit (113). As well known, the trigger circuit (113) has a trigger capacitor (not shown) and a trigger transformer (not shown). When a trigger signal is impressed to the trigger input terminal (TP), the trigger capacitor charged through the high voltage line (106), a resistor and the like is discharged to output a high voltage current of several KV generated on the secondary side of the trigger transformer through an output terminal (OUT). The output from the terminal (OUT) is impressed to the excitation electrode of the flash light charger tube (114) in order to discharge and flash the tube (114).

(115) is a magnet one end of which is connected to an output terminal (0) of the electronic switch (94) with the other grounded and an illumination portion containing a pop-up switch (107) and the flash light discharging tube (114) is cooperatively connected to the magnet (115). That is, the illumination portion (not shown) including the tube (114) is contained in the camera body when stroke shooting is not carried out and projects out of the camera body when a strobe is necessary, in order to prevent the photograph from being red. The illumination portion projects owing to the function of the magnet. During this projection, the UP side contactor (107a) of the pop-up switch (107) is constructed so as to be earthed and, when the illumination portion is contained in the camera body, the OFF side contactor (107b) is grounded. The flash light driving portion (stroke) of a flashing means consists of various elements of DDC 104—the solenoid or magnet (115).

(116) shows a shutter unit for controlling the shutter operation and the flashing operation of an artificial light source after light measurement operation for measuring the luminance of the object of shooting. In the shutter unit (116), (VP) is a power source input terminal connected to the output terminal (0) of the electronic switch (95) in order to lead the power source into the shutter unit (116). (AUP) is a pop-up control output terminal outputting a pop-up signal (b) as a flashing demand signal, (FM) is a trigger output terminal connected to the trigger input terminal (TP) of the trigger circuit (113) in order to generate a light flash from the flash light discharge tube (114) in synchronization of the opening of the shutter. (CIN) is a command input terminal for receiving various commands from the CPU (101).

(117) is a motor for feeding the film by means of a film supply mechanism. (118) is a driver circuit for supply electricity from the output terminals (M1), (M2) of the power source supplied thereto from the power source input terminal (IN) according to the signal applied to these input terminals (L1), (L2) to the motor (117) in order to control ON-OFF operations, film advancing, and rewinding of film of the motor (117). COM is earthed through a common terminal. For example, the input terminals (L1), (L2) are connected to the control output terminals (MC1), (MC2) of CPU (101) and the signal level H/L of the input terminal (L91) corresponds to ON/OFF operation of the motor (119) and the signal level H/L of the input terminal (L2) corresponds to the rolling-up/rolling-back. A film supply means comprises the motor (117) mentioned above, the driver circuit (118), and a film supply mechanism (not shown).

The embodiment of the construction mentioned above of the varifocal camera will be explained on its operation with reference to the flow chart of FIG. 13.

The condition of mechanism shown in FIG. 12 is obtained after the operator of the camera opens a finder cover and the lens barrier cooperative to the finder cover in order to contact the open side contactor (96a) of the barrier open-close switch (96) and the common contactor (96c). In this case, CPU (101) carries out an interruption operation concerning the barrier opening and as it is not related to the gist of the present invention, description of the interruption operation will be omitted. At that time, the magnet (115) is in OFF condition and as a result the OFF side contactor (107b) of the pop-up switch (107) is earthed, resulting in no charge in the main capacitor (112).

The shooting operations are grouped in four, such as (i) single frame shooting in natural light, (ii) single frame shooting in artificial light, (iii) continuous shooting in natural light (hereafter refered for as a continuous shooting), and (iv) continuous shooting in artificial light with a strobe. The operation of (iv) above concerning deeply the present invention will be described first. In this case, the luminance of the object for shooting has low, thus necessitating some artificial light source.

An completing interruption operation concerning the barrier opening, the first release switch (100) is closed and then the second release switch (99) and, in this particular case, a continuous shooting mode switch (98) which is previously set to a continuous mode are closed. Closing of the first release switch (100) changes these levels of the interruption input terminal (INT0) and the identification input terminal (CNT) to the L level from H level. On detecting these edge changes, the CPU (101) initializes to recognize that it is an interruption of the first release switch (100) to start the interruption operation concerning the first release. The flowchart shown in FIG. 13 starts from START.

First, "CTL output ON" downs the signal of the control output terminal (CTL) to its L level. As a result, the condition of the electronic switch (92) is turned ON and the power source voltage is impressed onto the pull-up resistors (102), (103). These signals from the input terminals (STB), (ROK) are increased up to the H level and when they become L level, the condition change out of the CPU (101) is detected. At the next "unit power source ON", the signal of the control output terminal (BL) is downed to L level. Then, the electronic switch (95) is set in ON condition and power source is supplied to the shutter unit (116) through the power source input terminal (VP). Simultaneously, the power source is supplied also to an AF unit (not shown) for measuring distances. At the next "light measurement", the shutter unit (116) starts the operation of light measurement. When the result or the luminance of the shooting object is sufficient, no operation is done. In case that low luminance is presumed, the shutter unit (116) judges that it is necessary to use an artificial light source and the pop-up signal (b) of the pop-up control output terminal (AUP) is reduced to the level from H to L one. As a result, the electronic switch (94) is set in ON condition to supply the power source to the magnet (115), resulting in the ON condition of the magnet and a pop-up (project) of the illumination or flashing portion (not shown). The pop-up switch (107) is earthed through its UP side contactor (107a), becoming the pop-up completion signal impressed previously to the input terminal (STB) at the L level. The CPU (101) operates or divides the program at "is flasher projected?" to YES after waiting, for example, for 120 milli seconds which has been determined as an operative time of the magnet (115). In next step "is charge completed?", the neon tube (109) is not lit because there is no charge in the main capacitor (112). Consequently, because the signal at the input terminal (ROK) is at its H level, it proceeds to NO. In next step "is it continuous shooting mode?", because the continuous shooting mode switch (98) is closed and the identification input terminal (CNT) is at the L level, or it is in the continuous shooting mode, it proceeds to YES.

In next step "is second release ON?", the identification input terminal (RL2) is checked and since the second release switch (99) is in the condition of closing (ON condition), it is passed to YES. At the next "start charging", the CPU (101) makes the signal of the control output terminal (SPC) downed to start voltage rising and charging operation in the flashing drive portion. It is returned to "is flasher projected?" and the processes above are repeated. This operational loop is called a continuous shooting charge loop. On the other hands, because the signal of the control output terminal (SPC) has been at L level, the electronic switch (93) is set in ON condition to supply a power source to the DDC 104 and to start the voltage raising operation of DDC 104. The pulsing AC of several hundreds V output from the output terminal (HV) is rectified through a rectifying diode (105) to start charging of the main capacitor (112). After 6–8 seconds of charging time as preparation time, the charged voltage (Vc) of the main capacitor reaches the full charge voltage (Vf), so that a neon tube (109) is discharged and the base voltage of the transistor (111) is raised, making the transistor (11) ON.

As a result, the signal of the input terminal (ROK) is set at the L level and the CPU (101) recognizes the fact that the charged voltage (Vc) reaches a full charge voltage (Vf). When a condition branch of "is charging completed?" in the continuous shooting charging loop, it is branched to YES and come out of the continuous shooting charging loop. At the next "charging stop", the signal level of the control output terminal (SPC) is raised to stop the current to the DDC (104) and the voltage rising charging operation.

Next, at "distance measurement", an AF unit (not shown) measure the distance to the object according to the command from the CPU (101). The result of measurement is given to the CPU (101) and "lens delivery" for driving the lens to the focussing position is carried out by a lens drive portion (not shown), to complete the focussing operation. At the next "is first release ON?". The condition of the first release switch (100) is checked as described above and, provided it is held open, it branches to YES Similarly, in next step "is second release ON?" it proceeds to YES and to the next "shutter operation". Herein, the CPU (101) commands to carry out a shutter operation from a command terminal (CMD) to a shutter unit (116) and the shutter unit (116), after receiving the command, outputs a trigger signal from a trigger output terminal (FM) interlockingly with the open operation of the shutter (not shown). The trigger circuit (113) upon receipt of this trigger signal discharges and flashes the flash light discharging tube (114) to project artificial light source onto the object of low luminance.

In next step, "film advancing", the CPU (101) produces, for example, signals of the control output terminals (MC1) and (MC2) of H level to rotate the motor (117) along the film advancing direction. After the advancing operation of one film frame exposed, it proceeds to the next "is continuous shooting mode?". At this branch of conditions, the continuous shooting mode switch (98) is held in its closed condition, so that it is passed to the next step of "is second release ON?". When the condition above is held, it advances to YES, returning to "light measurement" as described above. This operational circle or loop is called a continuous shooting loop. That is, the continuous shooting mode consisted of this continuous shooting loop and the continuous shooting charging loop. As a result, in the continuous shooting mode, or the condition under the which continuous shooting mode switch (98) is closed, during the time both the first and the second release switches (100), (99) are closed (in ON condition), or the operational period, the continuous shooting charge loop and the continuous shooting loop are repeated alternately and the continuous shooting mode is maintained.

Under the continuous shooting mode, presuming that the first release switch (100) is hold in OFF condition, it proceeds to NO with "is first release ON?" in the continuous shooting loop. At "lens returning", the lens delivered out for focussing is returned to its predetermined reference position. At "control output OFF", the control output terminals (CTL) and (BL) are raised to up to the H level to shut off current to the pull-up resistors (102), (103) and a shutter unit (115) and an AF unit (not shown), thus having CPU (101) halted.

On the contrary, when only the second release switch (99) is turned OFF at "is second release ON?" in the continuous shooting loop or the continuous shooting charging loop, it returns to "is first release ON?" in the continuous shooting loop and this condition is kept and repeated until the first release switch (100) is OFF. In the continuous shooting charging loop, it branches off to NO and it ends at the halt situation through the conditions "lens returning", "control output OFF".

Next, the operation (single frame photographing using artificial light source of (ii) above will be explained. Presuming that the object is still in low luminance and the continuous mode switch (98) is held in the single frame mode (open condition) shown in FIG. 12, and the first and the second release switches (100), (99) are closed. Other conditions are the same as that of the operation of (iv) above.

In FIG. 13, the initial operation from START to "did flasher project?" to proceeding to NO through "is charge completed?" are the same as that of (iv) above. At "is continuous shooting mode?" after proceeding to NO, it branches off to NO. The operation of "charging start" is the same as that of "charging start" in the operation of (iv) and "it returns to is charge completed?" and the operation above is repeated until the charging completion signal (a) becomes the L level. The operational loop is called as a single frame charging loop. After charging time (6–8 seconds), it branches from "is charge completed?" to YES and out of the single frame charging loop, reaching "charging stop". Similar to the operation (iv), the operation of focussing is done to flash a strobe at "shutter operation". "Film advancing" is carried out, branched to NO at "is continuous shooting mode?" to carry out "lens return", "control output OFF" and halted. The operation from "charge stop" to a half condition is called single frame photographing line. That is, the operation of (ii) (single frame shooting using artificial lighting) consist of the initial operation, the single frame charging loop, and the single frame photographing line. The operation of (i) above is branched to NO after passing through the initial operation and its last operation "did flasher project?", reaching the single frame photographing line. The former half of the operation of continuous shooting of (iii) above is the same as that of (i) above. After the operation is done, it is connected to, not the single frame photographic line, the continuous shooting loop.

As mentioned above, in the embodiment of the present invention, even under the continuous shooting mode in which the object has low luminance, during the operating time of closing the second and the first release switches (100), (99), the continuous shooting mode is hold. The shutter operation is adopted to be carried out after it goes out of the continuous shooting charge loop or the charge of the strobe is finished through the focusing operation, without delay. So that, the varifocal camera according to the present invention can be used conveniently irrespective of the continuous shooting mode as that of the prior art, of being led to missing shutter of shooting chance and without any trouble of deterioration of its operability.

Until the charge of the strobe is completed, the continuous shooting charge loop operation is continued without failure of shooting due to an insufficient exposure, which is apt to happen when artificial light shooting is forced or compulsorily performed since the operation of the continuous shooting charge loop was carried out. Consequently, the film can be used without film wasting.

During the operation of the continuous shooting charge loop, both the shutter operation and the film advancing operation which applying overload to the motor and the power source are not carried out simultaneously, so that the variation of the power source can be restricted to the utmost, which results in shortening the charging time (recycle type).

According to the modified embodiment of the varifocal camera of the present invention, the charging time of the flashing light drive portion is not limited to 6–8 seconds and another flashing drive portion of a quick charger type using a lithium cell may be used, which reduces charging time by about 1.5–3 second. Even the shorten charging time is obtained in the conventional apparatus, the time from the completion of charging and a shutter operation in the prior part is lengthened, so that when the present invention is applied to the prior art, the shutter operation can be carried out just after the charging completion and the distance measurement operation and the focussing operation of the preoperation are performed automatically. Consequently, the time necessary to take a strobe photographing for a single frame can be made extremely simple, which results in the increased number of shutter operation chances.

Figure 19:
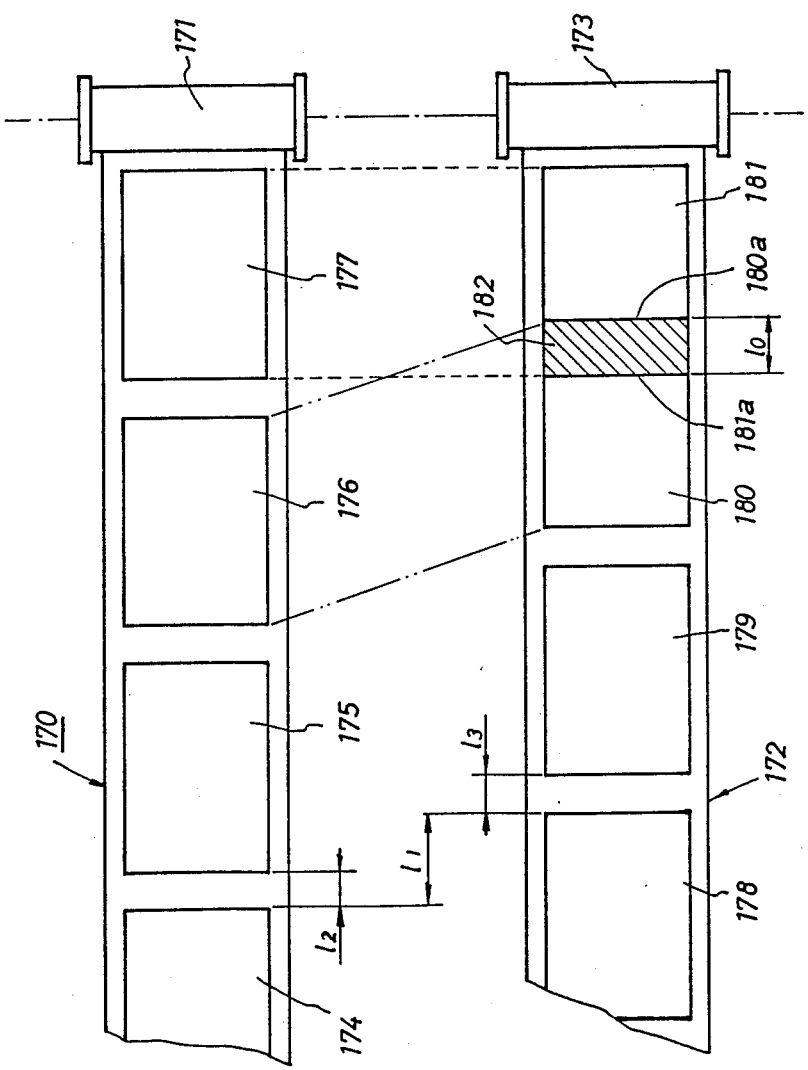
FIG. 19 is an exaggerated view of the conventional example with a part thereof omitted.

In connection with the varifocal camera provided with the film supply control apparatus concerning the present invention is explained with an embodiment thereof, a mistake in double-exposure will be described in detail. FIG. 19 shows an exaggeration in the manner of the double-exposing. The reference numerals (170), (172), respectively are films of the same kind and these cores of the films (170), (172) are secured or fixed as shown. As shown apparently, the film (170) has no error and another (172) has contrarily an error. These films (170), (172) are that of 36 (thirty six) frames type (174)–(177) are respectively in order thirty third (33) frame, thirty fourth (34) frame, thirty fifth (35) frame, and thirty sixth (36) frame. (178)–(181) are similarly thirty third frame (33)–thirty sixth frame (36). As a matter of course, the thirty sixth frames (177), (181) are the last frames. In the film (170), the frame (174)–(177) are positioned with a small gap z) which pass no practical problem. That is, at the time the last frame (177) is almost supplied, the film is almost caused to go its roll end, without no allowance of the film. In other words, in the case of the film (172), the gap between frames ($l_3$) is a little larger than ($l_2$) above and a disparity is produced along its end direction by the total overrunning error value. Except the last frame (181), the frames (178)–(180) are formed in the manner similar to the case of the film (170). Consequently, comparing the right end portion (180a) of the thirty fifth frame (180) with the frame (176) of the thirty fifth film part (170), they are overlapped on the last frame (181) by the value $l_0 = l_1 - l_3$. When the thirty sixth last frame (181) is fed, the film part on the midway reaches its end, it being stopped there. That is, until thirty fifth frame (180), the error ($l_1$) is relative so that, as similar to the case of the film (170) described above due to the film gap ($l_1$), there is no problem in the composition of each frame (178)–(180). However, in the case of the prior art, the relative error value totally appears on the installed last frame (181). In other words, the last frame (181) of the film (172) is exposed in the same position of the last frame (177) of the film (170), so that the overlapped portion (182) shown by oblique line encompassed by the right end portion (180a) of the thirty fifth frame and the left end portion (181a) of the last frame (181) is mistaken.

An embodiment of the film supply control apparatus installed in the varifocal camera according to the present invention will be described.

Figure 14:
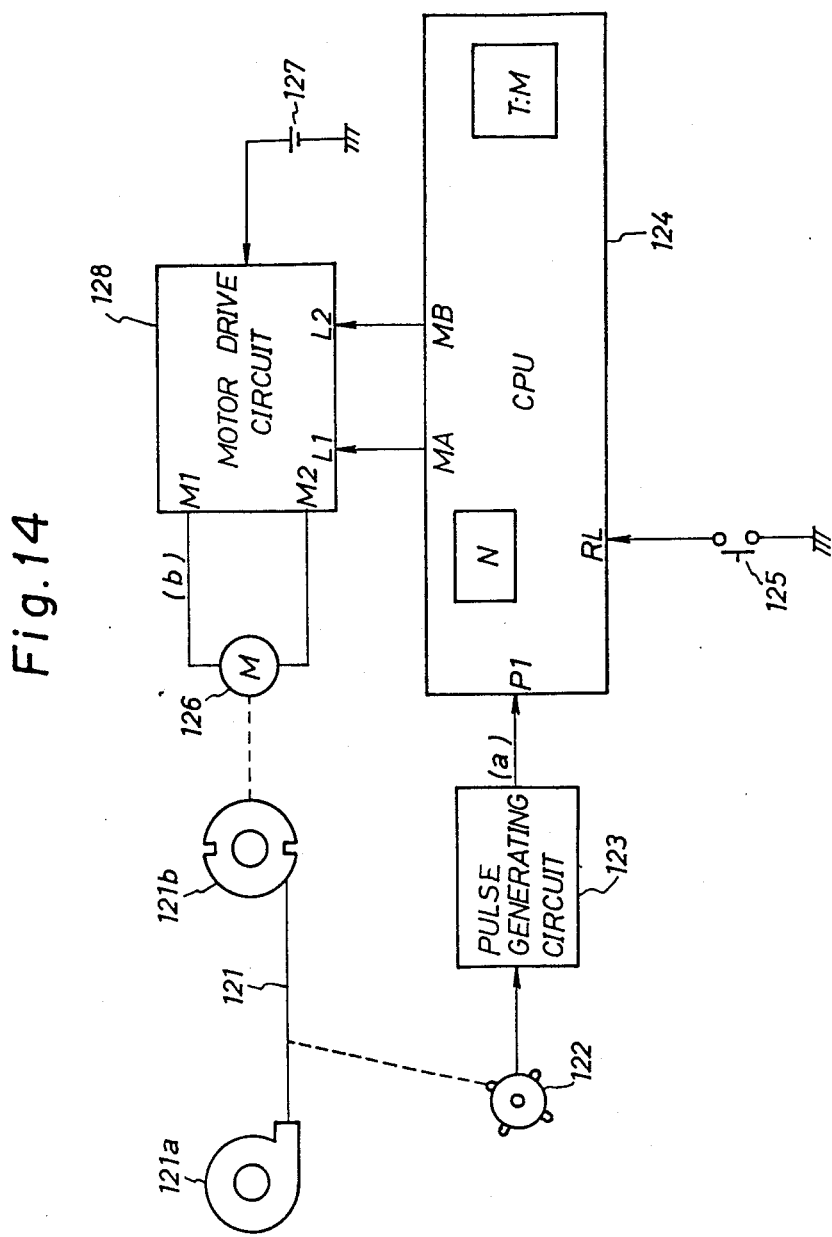
FIG. 14 is a block diagram showing the whole construction of the embodiment of the film supply control device of the varifocal camera according to the present invention.

In FIG. 14, (121) shows a film to be supplied; (121a) a film container for containing the film roll; (121b) a spool around which the film (121) is wound and driven by a rolling-up drive mechanism (not shown); and (122), (123) both parts of film supply signal generating means. (122) is a dummy sprocket engaging with the perforations of the film (121) to be rotated together with the rotation of the film (121) and (123) is a pulse generating circuit (hereafter it is refferred to PG) generating two pulses (a) when a film part of single frame of the film (121) is fed together with the rotation of the dummy sprocket (122), (124) is a control unit (hereinafter referred to CPU) containing therein a counter (N) and timer (TM).

In this CPU (124), (PI) is an input terminal receiving the pulse signal (a); (RL) is a starting input terminal receiving a starting signal for initializing the CPU (124); (MA) and (MB) are control output terminals which will be described in detail later (125) is a release switch consisting of a push button for generating the initializing or start signal; (126) is a motor for driving a spool (121b) through the rolling-up drive mechanism portion to feed the film (121); (127) is a power source used as one of the motor (126); and (128) is a motor drive circuit for the motor (126). In this motor drive circuit (128), (M1) and (M2) are drive output terminals connected to each input terminals of the motor (126) to output drive signal (b); and (L1), (L2) are control input terminals respectively connected to the control output terminals (MA), (MB) of the CPU (124).

Here, the control procedure of the motor (126) of the motor drive circuit (128) will be explained with reference to FIG. 18. The motor drive circuit (128) determines how to connect the power source (127) with these drive output terminals (M1), (M2) according to the level of H or L of the control signal output from the control output terminals (MA), (MB) of the CPU (124), and to control the four connections of I, II, III, and IV shown in FIG. 18.

In other words, the connection I is carried out when the control signal of the control output terminals (MA) and (MB) are at the H level and L level and the motor (126) is connected in a normal rotation manner for rotating it to roll up the film (121). The connection II is carried out when the control signals of the control output terminals (MA), (MB), respectively are opposite to that of I and of the L level and H levels, connecting the motor (126) in a manner of reverse rotation connection for feeding the film (121) along its rolling-back direction. The connection III is carried out when the control signals of the control output terminals (MA), (MB) are both at the H level, connecting the power source (127) to the drive output terminals (M1), (M2) and making the input terminal of the motor (126) electrically shorten. The connection is called a motor-shunt connection.

The connection IV is provided when the control signals of the control output terminal (MA), (MB) are both of the L level both, connecting of a stoppage connection of the motor (that is, power source is OFF) for shutting current of the power source (127) to the motor (126).

For example, when the motor drive circuit (128) is in the condition of a motor normal rotation connection I, if the motor reverse rotation connection II is carried out for only several tens ms, the motor (126) suddenly lowers its rotation speed without any reverse rotation of the motor. If the remaining or inertia rotary force makes the connection of the motor a motor shunt connection III, the rotary movement of the motor (126) continues for only a short time and is stopped after several tens ms.

The constructions shown with reference to FIGS. 15, 16, and 17 will be explained later.

The operation of the embodiment constructed as described above will be explained with reference to the flow chart of FIG. 17.

First, the release switch (125) shown in FIG. 14 is closed and the starting signal at the L level is input to the input terminal (RL), so that the CPU (124) is initialized and the flow chart shown in FIG. 17 is started from START. First of all, the predetermined photograph taking operation including the shutter open-close operation is carried out in the condition "shooting operation". Next, at "normal rotation start", the condition of the motor drive circuit (128) becomes that of a motor normal rotation connection I to start the film advancing operation of the film (121). This time of advancing operation of the film is that ($T_0$) in FIGS. 15 and 16. In next step "counter clear", the interior counter (N) of the CPU (124) becomes zero, that is N=0. In next step "timer start", the inner timer (TM) is cleared to zero and make a time counting operation start. On the other hands, together with the feeding movement of the film (121), the dummy sprocket (122) rotates to output a pulse signal (a) from the PG (123) as shown in FIG. 16.

The CPU (124) checks the level condition of the pulse signal (a) received through its input terminal (PI). At the next conditional branch "is H level (A)?", the condition of the pulse signal (a) is at the side of the time (T1) a little distance is separated from the time (T0), and it is still at the condition of a H level, so that it is branched to YES. The operation concerning "timer start" is as described above. At the next "is L level?", the level of the pulse signal (a) is checked, setting it at the H level. It is branched to NO. At "TM≧α", checked that the time counting value of the timer (TM) passes over or not the final end judgement time (α) for determining the final end of the film, and it divided to NO. In other words, the final end judgement time (α) judges, when there is no change in the pulse signal (a) for the film supply time ($T_s$) for a single frame as shown in FIG. 15, that the film reaches its end and stopped to pass to YES. At "rolling-back operation", the film (1) is rolled back and all operation is over at END.

In the flow chart shown in FIG. 17, there are three conditional branches of "TM≧α?" and they are the same in their operational contents. (A) described in "is H level (A)?" added to discriminate it from another "is H level?" and both operations of these conditions are the same. Consequently, the same explanation on these condition will be omitted from the following description.

At "TM≧α", it is branched to NO and returned to "is L level?" and the same operation above will be repeated. This operational loop is called "L level check loop". After then, at the time (T1), the pulse pulse (a) downs to the L level, at "is L level?", and branched to YES. Then it advances to "is H level?" through "timer start". Since it is passed a little over the time (T1), it is branched to NO and branched to NO at "is TM≧α?" to be back again to "is H level?". The operation above will be repeated. The operational loop above is called hereafter "H level check loop". After then, time (T2) the pulse signal (a) rises so that it is branched to YES at "is H level?". At "N=0?", because N has been made zero, it is branched to YES, the content of the counter is renewed to N=1 at "counter increase" and returned to the original "timer start".

At "is it H level (A)?", it is readless to say to branch to YES and transfered to the L level check loop through "timer start". After then, at the time (T3), the pulse signal (a) is downed to a L level and it is branched to YES from "is it L level?". It is transfered to the H level check loop through "timer start". At the time (T4), the pulse signal (a) is raised to a H level and it is branched to YES from "is it H level?" At "N=0?", since it was N=1, it is branched to NO, judging from that a film part of single frame has been supplied. The following operation is a gist of the present invention and at the next "reverse voltage impressed", the CPU (124) controls or makes the motor drive circuit (128) the condition of the motor reverse connection II.

At the next "waiting time (A)", for example, the reverse connection condition II of the motor is kept for 10 ms. These conditions happened in the time correspond to that happened in the times (T4)–(T5). In other words, the rotation force of the motor (126) suddenly downs from its constant rotary condition before the time (T4) and an opposite phase brake is applied to the motor as a first brake. In next step "motor shunt", the CPU (124) controls and makes the motor drive circuit (128) a condition of a motor shunt connection III. Next "waiting time (B)", the condition of the motor shunt connection III is kept for, for example, 100 ms. In other words, the shunt brake is applied as the second brake. The situation happened in this time corresponds to that of the times (T5)–(T7) shown in FIG. 16. The rotation force of the motor (126) is suddenly downed at (T4)–(T5) and it disappears completely during the times (T5)–(T6), for example, for about 30 ms, halting the motor (126). In order to make sure the operation, the shunt brake is applying for the times (T6)–(T7). Next "motor power source OFF", the motor drive circuit (128) is held under condition of the motor stoppage connection IV and all operation is finished at END. This time, any reference is made to (T7) in FIG. 3.

Figure 15:
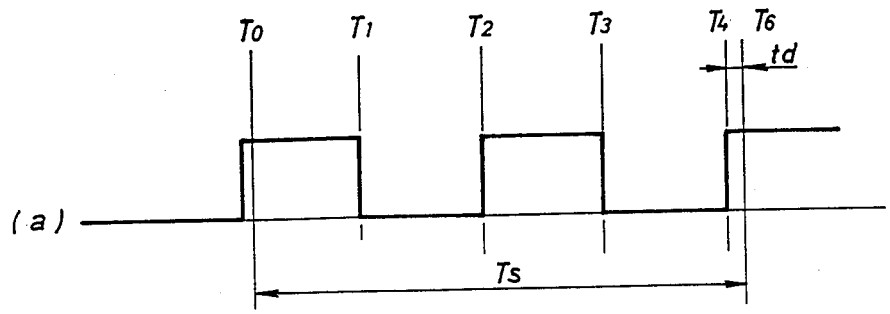
FIG. 15 is a timing chart depicting the pulsation of a pulse signal used as a film supply signal in the embodiment of FIG. 14.
Figure 16:
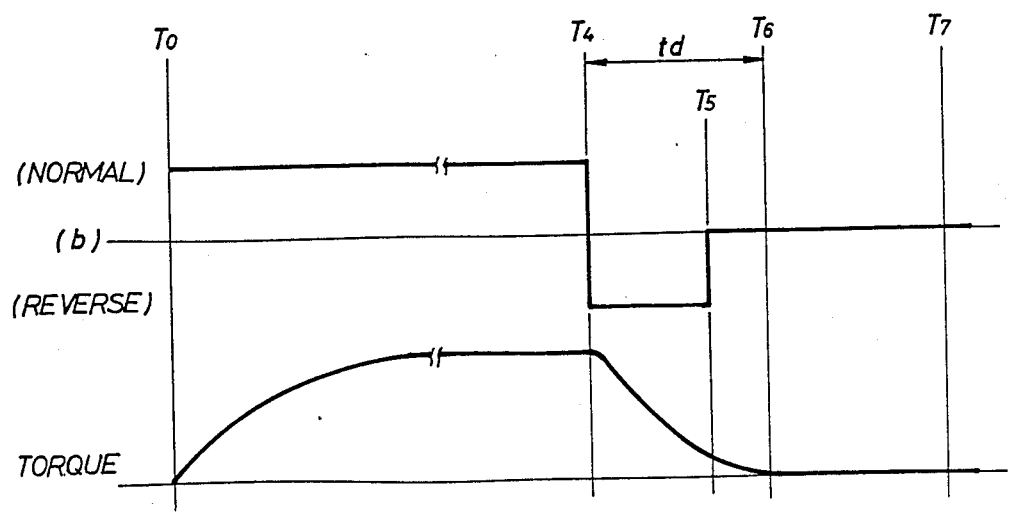
FIG. 16 is another timing chart showing waves of the relationship between drive power source impressed to the motor and its torque in the embodiment shown in FIG. 14.

As mentioned above, according to the embodiment of the present invention, as shown in FIGS. 15 and 16, it is ideal that the motor (126) is to be stopped at the time (T4), however it is physically impossible to do so. Consequently, some delay time ($t_d$) may happen until the motor (126) stops completely. However, the delay time ($t_d$) in this embodiment drops within the time range corresponding to the frames gap ($l_2$) of the film (170) when it is made to correspond to that of FIG. 19, so that, when the film reaches its end after the last frame (177) has been supplied and the film is halted, it can prevent that the overlapped portion (182) at the last frame (181), such as that of the film (172) taken by the conventional camera from happening.

When the cell is employed to the power source (127), even the charging function of the cell is large, the rotation force (remaining or inertia rotary force after the time ($T_4$)) of the motor is suddenly downed by means of the reverse braking at the time or during the times ($T_4$)–($T_6$) and the rotation force is completely disappeared due to the shunt braking during the time ($T_6$)–($T_7$), leaving some allowance in time at the time ($T_6$)–($T_7$). As a result, notwithstanding the charging function of the cell, it is possible to stop the film (121) about the predetermined position. In addition, the varifocal camera can be made simple and compact, because no addition of individual circuitry for limiting the voltage and current of the cell. FIG. 17 shows another embodiment of the varifocal camera according to the present invention, in which "waiting time (A)" is not limited to 10 ms and may be set freely within the range in which the motor (125) can not be started reversely.

Similarly, "waiting time (B)" in FIG. 17 does not necessary limit 100 ms and may be freely set within the range in which variations of the motive force of the power source (127) or of torque of another motor (126), and of friction force of the film (1) are compensated without any bad effect on the operation of the following operation.

Concerning the pulse signal (a) is not limited to two number of pulsation for a single frame of the film and can be increased or decreased if it is suitably balanced with the manufacturing cost and controlled speed of the CPU (124).

Some problems of the conventional film automatic feeding apparatus will be described with reference to FIGS. 26 and 27 in detail, before describing an embodiment of the varifocal camera provided with the film automatic supply apparatus according to the present invention.

Figure 26:
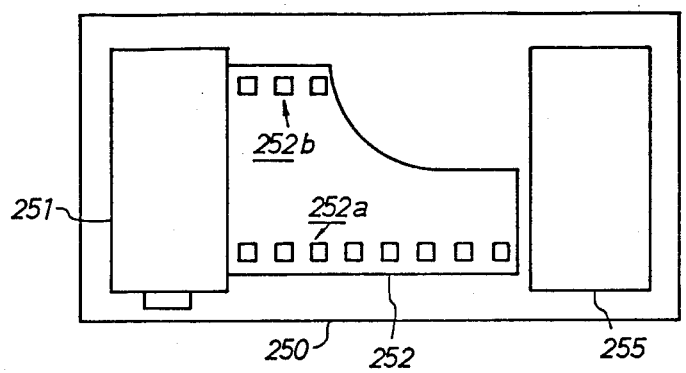
FIGS. 26 and 27 show conventional varifocal cameras, respectively.
Figure 27:
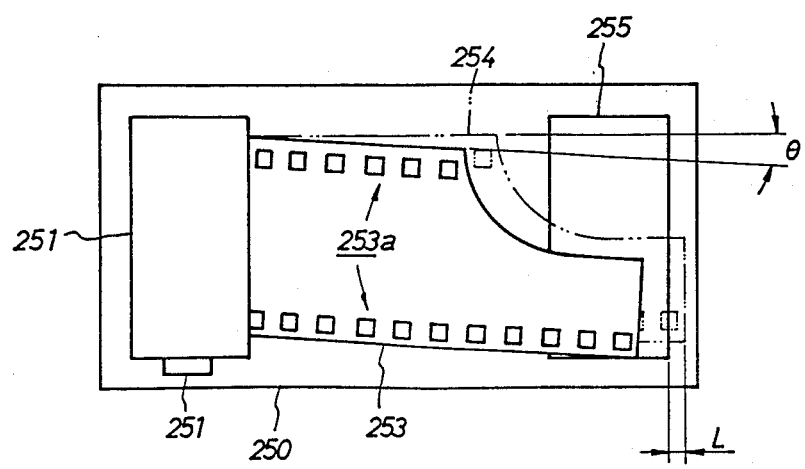

In the drawings of FIGS. 26 and 27, the condition is shown, in which these films (252), (253), and (254) are pulled out of the patrone (phonic) or the film container (251) to the patrone chamber (not shown) in the camera body (250), and fixed thereto. In case that as shown in FIG. 26, it shows the condition in which the film (252) pulled out by the operator of the camera does not reach the rolling-up side spool (255) and installed in the camera body. Similar to the case, there are cases in which the film (252) reaches the rolling-up side spool (255) and overrides the rolling-up side spool (255), and the perforations (252a) (252b) formed in the film are disengaged from the claw for rolling-up film (not shown), and on the rolling-up belt (not shown) to be moved in cooperation with the spool (255) the film does not ride Even the film (252) is installed in the camera body in that case, closing the rear cover starts the automatic setting mechanism, the spool (255) and the film advancing belt are rotated to roll up the film (252). However, this rotation force is not transfered to the film (252), failing to effect the rolling-up motion of the film (252). It means the failure of the automatic setting operation. When, of the automatic setting failure, the case in which the film (252) fails to rolled up the spool (255), it is remedied by only opening the rear cover and further more a little pulling out the film part from the patrone (251) in order to recharge the film.

As shown in FIG. 27, even when the perforation (253a) of the film (253) engages with the rolling-up claws of the spool, the installation is made slant to the spool (255) as shown by an angle (D), so that, before a predetermines length of the film is pulled up, the lower portion of the film (253) is pressed against either end surface (the lower end surface as shown in the drawing) of the rolling-up spool (255) shaping the cylinder. Finally, the spool is made unable to rotate sooner or later due to the frictional force of the pressed film part.

If the film part (254) is rolled onto the spool (255) when the length to be pulled is longer than the that of the spool (255) by a length L, the length L is bent back and rolled into the spool (255), clogging the film (254) into the spool chamber (not shown) containing the spool. As a result, sooner or later the spool is made impossible to rotate. As described above, in the case of the failure of an automatic setting of film due to abnormal rolling-in of the film (254), it is necessary to pull the part of films (253) or (254) rolled in the spool (255) so as to make it possible to recharge the film. Then, the operator must rotate by hand a core (251a) of the patrone (251) pulled out of the camera previously and rewind the film (253) or (254) until a suitable length of the film part is restored. After that the operator is made possible to recharge the film and it is very troublesome.

In addition, the operation mentioned above must be made after opening of the rear cover of the camera, so that the part of the film (253) or (254) rolled back is exposed wastefully. Additionally, if the time at which the spool (255) is made impossible to rotate thereafter, for example, the shooting of a photograph, the precious image record is wasted.

Figure 20:
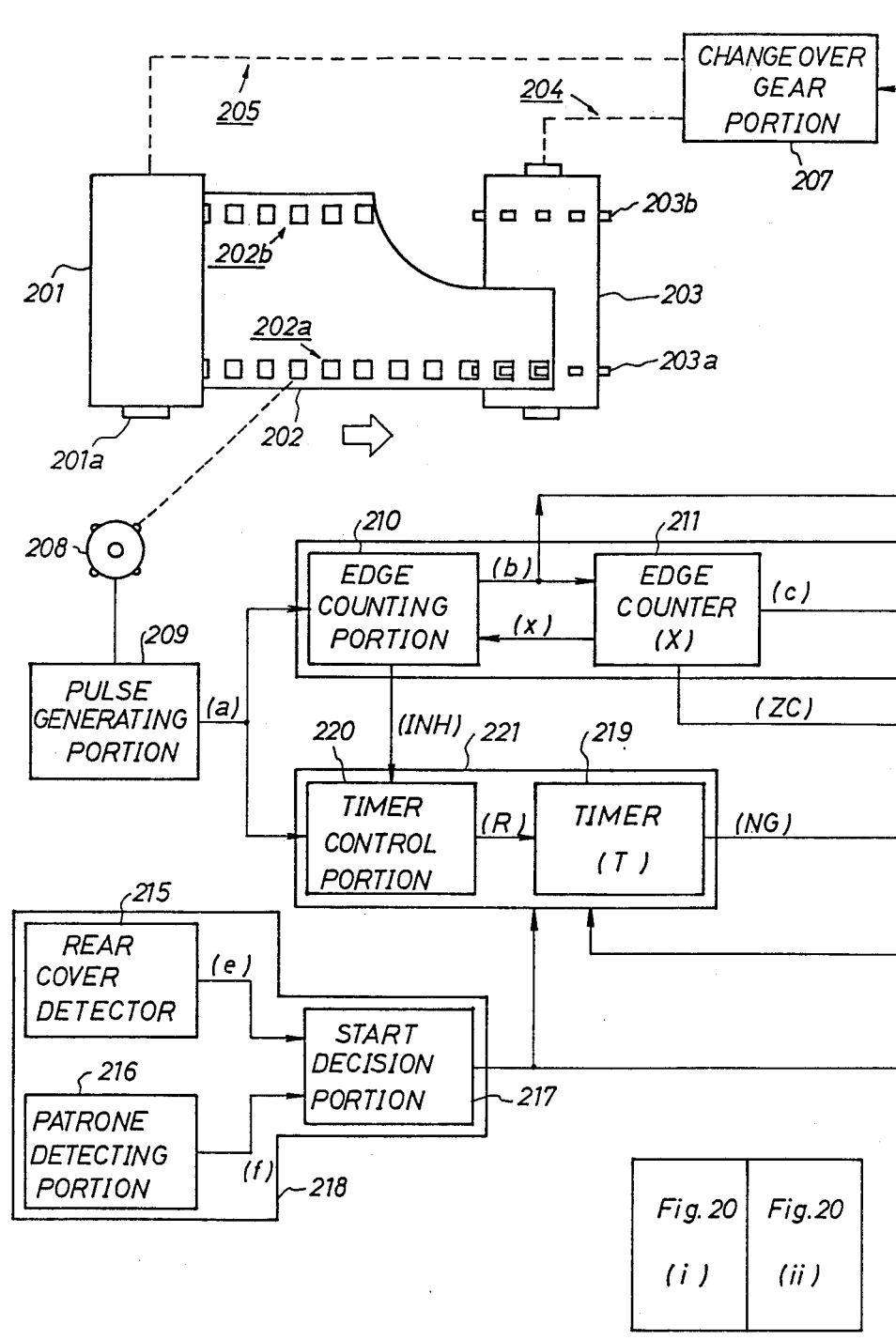
FIG. 20 is a block diagram showing the whole construction of the automatic film supply device installed in the varifocal camera according to the present invention.

The embodiment of the varifocal camera provided with an automatic film supply device according to the present invention will be described with reference to FIGS. 20-25. FIG. 20 is a block diagram showing the whole construction of the automatic film supply apparatus. In this figure, (201) shows a patrone installed in a patrone chamber (not shown) of the camera, (202) is a film pulled out of the patrone, (202a) and (202b) are perforations formed in the film (202), (202c) is a leading portion formed at the front end of the film (202), (203) is a spool for pulling-up the film (202), (203a) and (203b)

are engaging claws for rolling-up film, projected from the spool (203) so as to engage with the perforations (202a), (202b) of the film (202). (204) and (205) are rolling-back mechanism portions constructed by gears for driving the spool (203) to pull out the film (202) and functioned as a rolling-back mechanism means for driving the core (201a) of the patrone (201) to roll-back the film (202) into the patrone (201), (206) is a motor. (207) is a changeover gear portion driven by the motor (206) to transfer the rotary force along the normal direction of the motor (206) to the rolling-up mechanism portion (204) and to transfer the reverse directed rotation force to another rolling-back mechanism portion (205). (208) is a dummy sprocket rotatably engaging with, for example, the perforations (202a) of the film (202) fed by the motor (206). (209) is a pulse generating portion receiving the rotation force of the dummy sprocket (208) to drive the wind switch (not shown) and to generate two pulses (minus logic) of substantially equal during a film part of a single frame of the film (202) is feeding. A pulse generating means for the present invention is constructed by the pulse generating portion (209) and the dummy sprocket (208). (201) is an edge detecting portion receiving a supply pulse (a) output from the pulse generating portion (209) and detecting the rising edge and descending edge of the supply pulse (a) to output a signal (b) everytime it detect these edges. The edge detecting portion (210) outputs a reset prohibition signal (INH) prohibiting any resetting of the timer described alter and releasing the reset prohibition only the instant the content of the edge counter described later changes. When the reverse signal (RV) is at the H level and the content of the edge counter is not zero, the reset prohibition is instantly released. On the contrary, when the reverse signal (RV) is at the L level and the edge counter is zero, an edge signal (b) is output if the supply pulse (a) input thereto is of a L level. (211) is an edge counter (showing its content by the symbol x) receiving the edge signal (b) to in order to add when the motor (206) rotates along its normal direction and to reduce when the motor rotates along a reverse direction, outputting the result in a shape of the count value (x). When the count value (X) is an odd number excepting of $X=1$, the edge counter (211) outputs an operational signal (c). When the count value reaches $X=0$ after reducing it from any count value (x), it outputs a zero count signal (zc). (212) is a pulse counter (its contents are shown by Y) for receiving the operation signal (c) to count the pulse number of the film supply pulse (a). The pulse counter (212) is constructed so as to add the operation signal (c) when it is $Y=0$ everytime the operation signal (c) is received to obtain $Y=1$ and on the contrary when it is $Y=1$ being cleared to $Y=0$ and to output the count output (d) at the time carrying out the zero clear operation. (213) is a frame counter (the counter contents are shown by Z) for receiving the count output (d) to count the number of the frame of the film (212). The frame counter (213) is constructed so as to output an auto-set completion signal (OK) when three film frames (212) is counted. The edge counting portion (210), the edge counter (211), the pulse counter (212), and the frame counter (213) constitute an integrated counting portion (214) used as a pulse counting means. (215) is a rear cover closing detector for detecting the open-close condition of the rear lid by means of a switch in cooperation with the rear cover (not shown) of the camera and for outputting a rear cover close signal (e) when it is closed. (216) is a patrone detecting portion for detecting the existence of the patrone (201) by means of a switch installed in the patrone chamber (not shown) of the camera and outputting an existence signal (5) when the patrone (201) is existed or installed therein. (217) is a start decision portion for receiving the existence signal (f) and the rear cover close signal (e) and outputting a start signal (g) as a starting command only when both the signals (f) and (e) are simultaneously received. The start decision portion (217), the rear cover close detecting portion (215), and the patrone detecting portion (216) constitute a start commanding portion (218) used as a start commanding means.

In addition, the integrated counting portion (214) is constructed so as to receive the start signal (g) and to make a zero clear the contents of each counter (211), (212) and (213), in which $X=0$, $Y=0$, and $Z=0$. (219) is a timer receiving the reset signal (R) described later to reset it and to start counting, the content thereof is shown by T. The timer (219) is structured so as to have the reference time ($\alpha$) which is larger or longer than the pulse width of at least the film supply pulse (a) and to output a failure signal (NG) when $T \geq \alpha$ is obtained. (220) is a timer control portion for judging the level of the supply pulse (a) received and outputting the reset signal (R) when it receives a start signal (g) in the reset inhibition signal (INH) is released. The timer control portion (220) and the timer (219) constitute a supply condition decision portion (221) used as a supply condition decision means. (222) is an auto-return control portion used as an automatic rolling-back means which receives the failure (NG) and the zero count signal (zc) and setting the reverse rotation signal (RV) at a L level when the failure signal (NG) is received in order to show the OFF condition of the motor (206). The edge counter (211) of the integrated counter portion (214) is constructed so as to do subtraction successively when the reverse signal (RV) is at the H level and do an addition successively when the reverse rotation signal (RV) is at the L level. This reverse rotation signal (RV) is also output to the timer control portion (220) of the supply condition decision portion (221). (223) shows an autoset control portion functioning as an automatic initial rolling-up means for making the normal rotation signal (G0) at the H level the instant that it receives the start signal (g) and making the normal rotation signal (G0) at a L level meaning an OFF condition of the motor at the instant it receives the reverse signal (RV) and the signal (RV) becomes a H level or it receives the auto-set completion signal (OK). (224) is a motor control portion for receiving the normal rotation signal (G0) and the reverse rotation signal (RV), and a power source (not shown) for the motor (206), outputting the power source as a drive signal (h) of the polarity at which the motor (206) rotates normally the instant the normal rotation signal (G0) becomes the H level and outputting the power source as another drive signal (h) of the polarity at which the motor (206) rotates reversely the instant it receives the reverse signal (RV), and turning the motor OFF by shutting off the drive signal (h) when either the normal rotation signal (G0) or the reverse rotation signal (RV) becomes the L level. (225) depicts a rolling-up side display member lit when the initial rolling-up operation (auto-set) is fail to do normally. (226) is a patrone display member indicating the existence of the patrone (201) and the initialization of the auto-set operation. (227) is a running display member consisting of four display dots (227a), (227b), (227c), and 227d) and displays a running of the film. (228) is a film supply display device consisting of display members (225), (226), and (227). (229) is a display control portion receiving the edge signal (b), the start signal (g), the autoset completion signal (OK), and the reverse rotation signal (RV) to suitably control the display condition of the fil supply display device (228) by means of a display output (RSP).

The arrow situated below the film (202) in the drawing shows the running direction of the film (202) when it is rolled-up.

Figure 21:
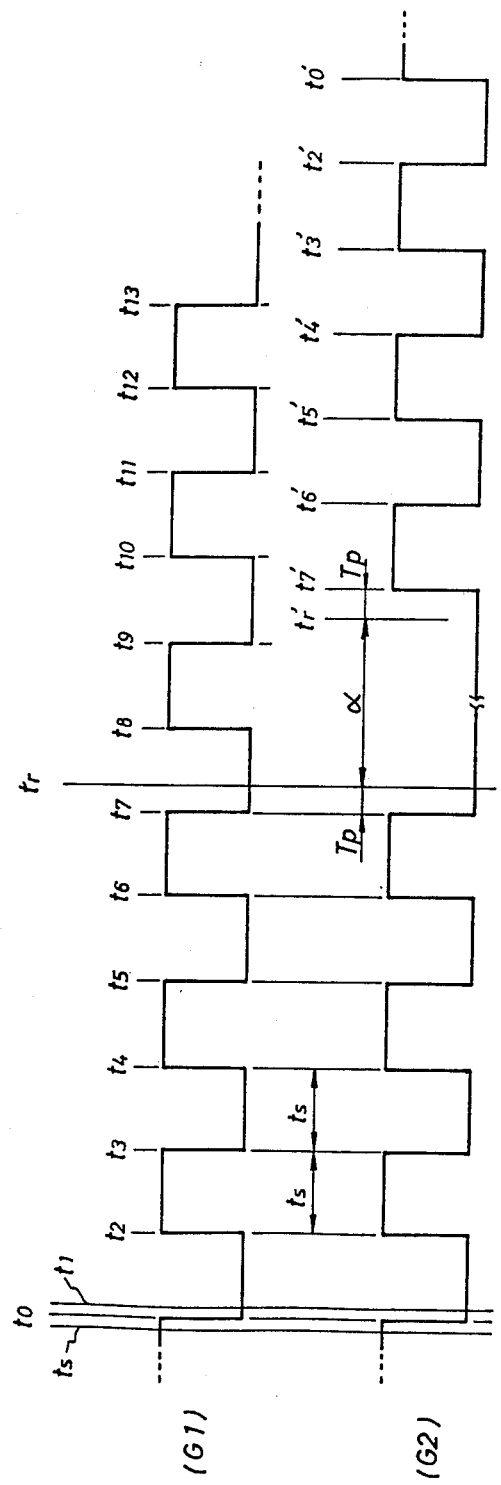
FIG. 21 shows the typical operation in the embodiment of FIG. 20 by the pulsation of supply pulse.

FIG. 21 shows graphs (G1)–(G2) of typical operations in FIG. 20, FIG. 21 is intended for explaining the operation wave form of the supply pulse (a). In which the graph (G1) shows the case the auto-set operation is succeeded; and the graph (G2) shows the case the auto-return (automatic rewinding) operation is effective or the auto-set operation is failed. In FIG. 21, these times (ts), (t$_0$) and (t$_1$)–(t$_7$) are commonly used in these graphs (G1) and (G2). The time (T$_7$')–(t$_0$'), respectively corresponds to the time (t$_7$)–(t$_0$) when they are seen as a rotation angle of the dummy sprocket (208). (Ts) is a pulse width and (2Ts) is a period and (4Ts) corresponds to a single frame. It is apparent that the graph (G1) shows three frame film supply.

FIG. 22 shows a table depicting X, Y and Z of the contents of each counters (211), (212), and (213) in the integrated counting portion (214) so as to correspond to the times of graphs (G1) and (G2). The construction of the drawings of FIGS. 21–25 will be explained with their operations.

Figure 23:
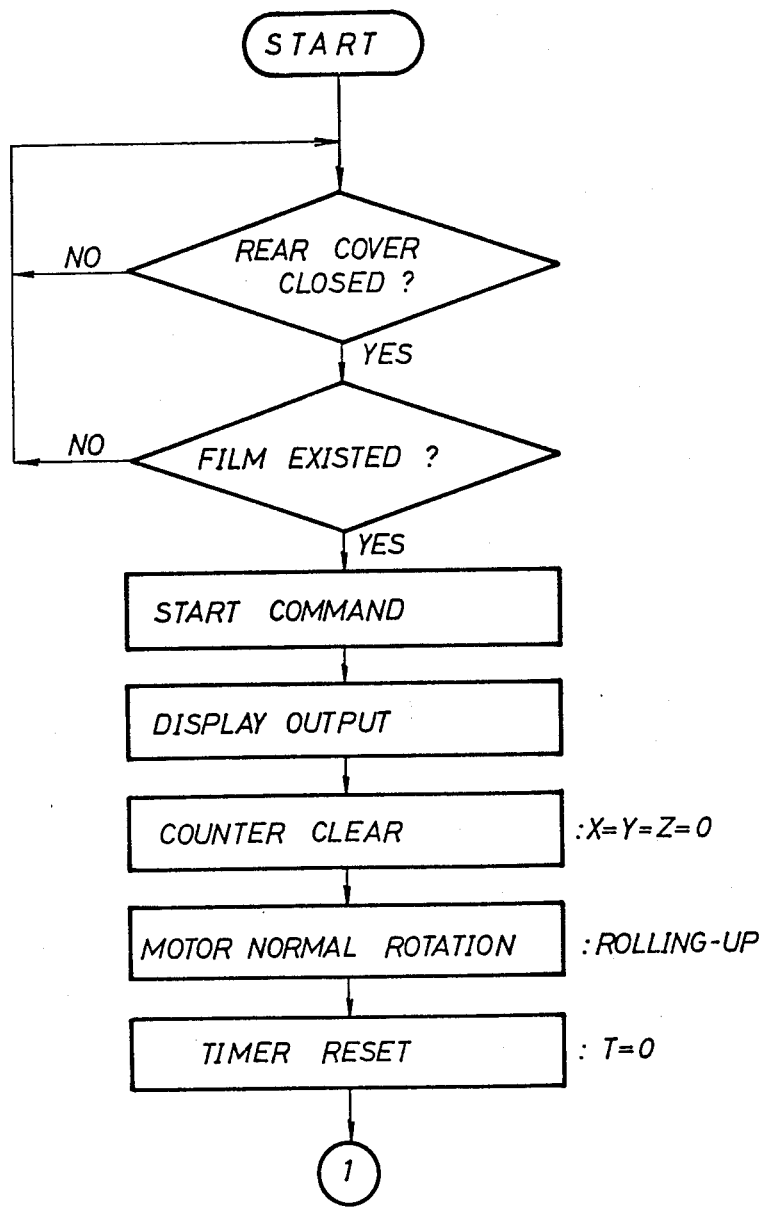
FIG. 23 is a flow chart of the initialization operation in the flow chart of the sequential operation in FIG. 20.

The operation of the embodiment thus constructed will be described with reference to the flow chart of FIGS. 23–25.

In the case that the result of the initial rolling-up (auto-set) operation satisfies the predetermined contents or the auto-set operation is succeeded will be explained. First, a part of the film of a suitable length is pulled out of the patrone (201) as shown in FIG. 20 and the perforations (202a) formed in the film (202) are engaged with the claw (203a) formed on the spool (203) in order to install the film together with the patrone (201) in the camera body. In this condition, no display is indicated in the film supply display device (228). When the rear cover (not shown) is closed, the flow chart of FIG. 23 starts with START. At the first conditional branch "is rear cover closed?", the condition of the rear cover is detected by the rear cover close detecting portion (215) to output the rear cover close signal (e) and branched to YES. At the next conditional branch "as film existed?", the patrone detecting portion (216) detects the existence of the patrone (201) to output an existence signal (f) and to be branched to YES. The start decision portion (217) receives the rear cover close signal (e) and the existence signal (f) in the next step "start command" to output the start signal (g). Next "display output", the display control portion (229) with the start signal (g) received outputs a display output (DSP) for lighting the patrone display member (226). Thus, only the patrone display member (226) of the film supply display device (228) receive the output (DSP), so that the operator knows that the auto-set operation starts. Next "counter clear", the start signal (g) makes clear each counter (211), (212), and (213) of the integrated counting portion (214) constituting contents X=Y=Z=0.

In next step "motor normal rotation" the auto-set control portion (223) receives the start signal (g), raising the normal rotation signal (GO) to the H level. Then, the motor control portion (224) previously received the normal rotation signal (GO) outputs a drive signal (h) to rotate the motor (206) along a normal rotation or a rolling-up direction of the film. Further, at "timer rest" the supply condition judgement portion (221) receives a start signal (g) through its timer control portion (220). The contents of the timer (219) are made clear; T=0 by means of a reset signal (R) to start time counting. The operation from START to ①  is called a starting operation. When both "is rear cover closed?" and "is film existed?" are not satisfied, it is branched to NO and returned to "is rear cover closed?" and the operation is repeated.

Owing to the normal rotation of the motor (206), the changeover gear portion (207) transfers the rotary force of the motor (206) to the rolling-up mechanism portion (204) and the spool (203) starts its rotation along the direction of film advancing (along the arrow in FIG. 20) the film (202). Due to the rotation of the spool (203), the engagement claw (203a) engaged with the perforations (202a) rolls in the leading portion (202c) of the film (202), whereas the perforations (202b) engage with the claw (203b) to further advancing the film (202) around the spool (203). On the other hand, the dummy sprocket (208) engaged with the perforations (202a) rotates together with the run of the film (202), thus the wind switch (not shown) in the pulse generating portion (209) is driven to output a supply pulse (a). The waveforms of the film supply pulse (a) are shown in the graph (G1) of the figure FIG. 21. What condition of the pulse waveforms at which the waveform begins is determined by the rotation angle of the dummy sprocket (208) and the rotation angle is determined freely, so that the starting time of the pulsation can not determined at an instant. The starting time may be these (t$_5$), (t$_0$), (t$_1$) and each is presumed that the film supply pulse (a) starts at the time (t$_1$).

Figure 24I:
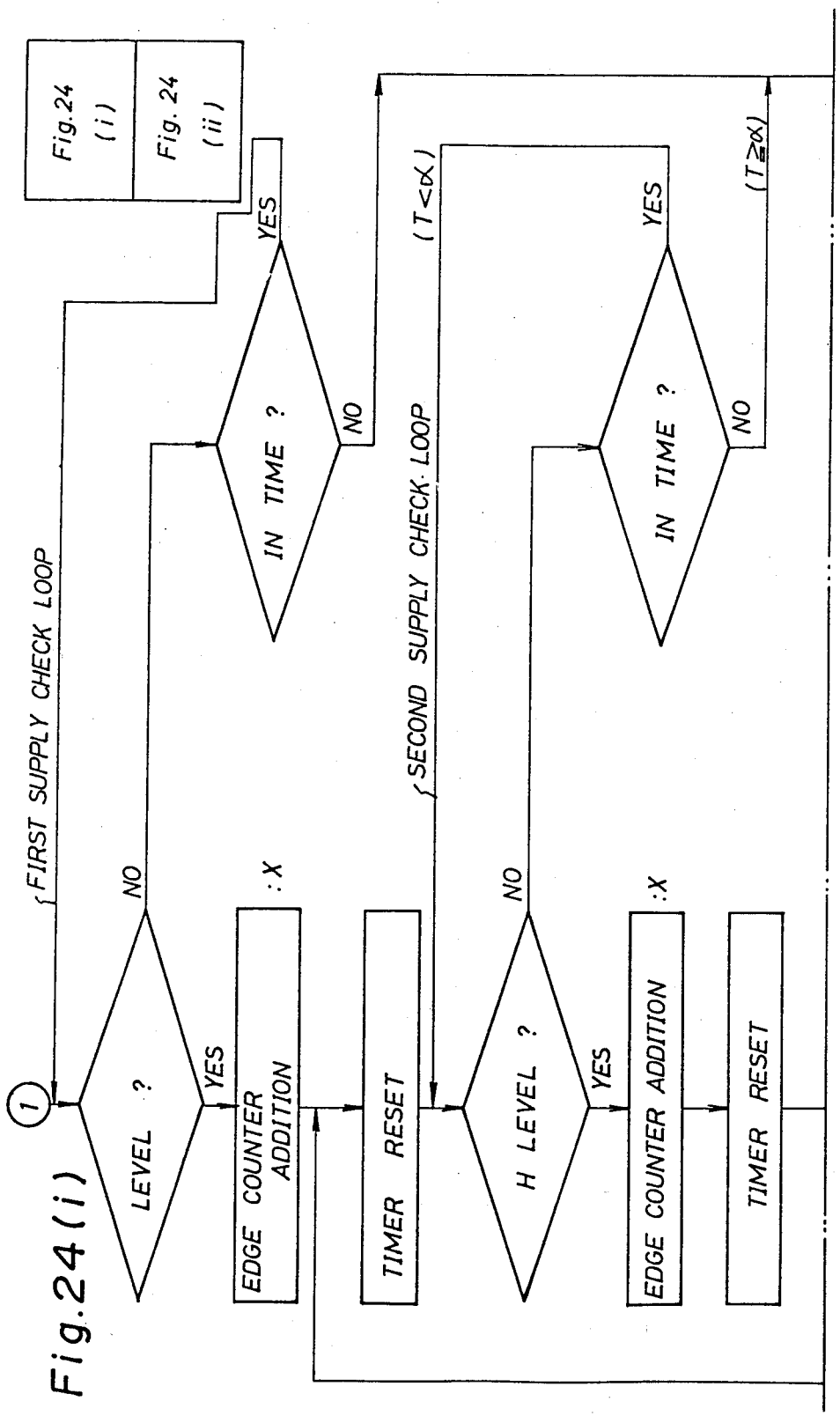
FIG. 24 is a flow chart showing the automatic setting operation in the flow chart showing the sequential or operative order of FIG. 20.

The flow chart is transferred to ①  in FIG. 24 and, at the list conditional branch "is it L level?" the timer control portion (220) checks if the supply pulse (a) at the L level or not and refers the count value (X) to confirm that X equals 0 (zero) and the reverse signal (RV) are at the L level. Then, provided it is not so far from the time (t$_1$), it is set at L level to output an edge signal (b) unconditionally and branched to YES. In next step "edge counter addition", the edge counter (11) receives already the edge signal (B) make the count value transfer from X=0 to X=1.

The loop in which it is branched to NO at "is it at L level?" and branched to YES in the next stop "is it in time?" and again returns to "is it L level?" called for the first supply check loop.

In next step "timer reset", the edge detecting portion (210) has not yet detect an edge of the supply pulse (a) and the reset inhibition signal (INH) is instantly released. after confirming that the content of the edge counter (211) has changed to X=1. The timer control portion (220) received the signal resets the timer (219) by the reset signal (R) and starts simultaneously a time counting operation again. At the next conditional branch "is it H level?", the timer control portion (220) judges that the supply pulse (a) is at a H level or not. The supply pulse (a) is placed far from the time (t$_1$) a little and of a H level, so that it branched to NO. At the next conditional branch "is it in time?", the timer (219) compares the inner standard time ($\alpha$) and the present time count value (T) and branched to NO if it is T$\geq\alpha$, and to YES if it is T$<\alpha$. In this case, it is branched to YES and returned to "is it H level?" The operation above will be repeated This operational loop is called a second supply check loop. Presuming that the film (202) is fed normally, then the supply pulse (a) rises at the time ($t_2$), becoming that of a H level. Here, it is branched to YES from "is it H level?" of the second supply check loop and at the next "edge counter addition" the edge counter (11) received the edge signal (b) at the time ($t_2$) carrys out successively X=2. In the next step "timer reset" the edge detecting portion (210) confirms that X=1 is changed to X=2 and instantly releases the reset prohibition signal (INH). The timer control portion (220) received the signal (INH) outputs a reset signal (R) and the timer (219) starts time counting operation from T=0. At the conditional branch "is it L level?", the timer control portion (220) similarly checks the level of the film supply pulse (a). Because the supply pulse (a) is not far from the time ($t_2$) and H level, it is branched to NO and "is it in time?" is carried out. The film supply operation is ordinal and it is $T < \alpha$, so that it is branched to YES and returned to "is it L level?". The operation above is repeated. The operational loop above is called the third supply check loop.

After the time elaption for that almost same as the pulse width (Ts), it reaches the time ($t_3$) and the supply pulse (a) down to the L level. Here, "is it L level?" in the third supply check loop is branched to YES and at the next "edge counter addition", the edge counter (211) received an edge signal (b) at the time ($t_3$) successively adds the contents of the counter, making x=3.

At that time, because an operation signal (c) is output from the edge counter (211), at the next conditional branch "is it Y=1?" the pulse counter has Y=0, confirming the operation signal (c), and it is branched to NO. At the next "pulse counter addition" it is known that almost one period ($t_1$)–($t_3$) of the supply pulse (a) is elapsed and the content is added to make Y=1. Returning to the "timer reset", the same operation is repeated. This operational loop is called a normal rotation check loop.

Seeing the operations above with reference to the graph (G1) of the table for counter contents of FIG. 22, during ($t_1$)–($t_3$), the content X of the edge counter (211) is added to X=1-3 and the content of the pulse counter (212) becomes Y=1, being kept the content of the frame counter (213) yet at Z=0. Further, the normal rotation check, loop is continued and at the time ($t_4$), X is added through the second supply check loop, becoming X=4, keeping Y and Z at Y=1, Z=0. At the time ($t_5$), X becomes 5 through the third supply check loop and branched to YES at "is Y=1?" and at the next conditional branch "Z=2?" it is branched to NO because Z=0. In next step "pulse counter clear" it is cleared to Y=0 and then "frame counter addition", the frame counter makes its content Z=1 after it receives the counting output (d). After then, in the flow chart, it is returned to the normal rotation check loop again. These operations of branching "Y=1?" to YES and returning to the normal rotation check loop through "Z=2?" and "frame counter addition" is called a frame check loop.

When the frame check loop or the normal rotation check loop is continuously carried out, the display control portion (229) to receive an edge signal (b) of the edge detecting portion (210) lits successively the display dots (227a)–(227d) of the running display member (27) due to a display output (DSP), so that the operator notices that the film is normally supplying.

Returning to FIG. 22, at the time ($t_5$), X=5, Y=0, Z=1 are presumed, the normal rotation check loop is continued until ($t_6$)–($t_8$), and at ($t_9$) it is branched from "is Y=1?" in the normal rotation check loop to the frame check loop, obtaining X=9, Y=0, and Z=2. Again during ($t_{10}$)–($t_{12}$), the normal rotation check loop is continued and at ($t_{12}$), it is obtained X=12. Keeping Y=1, Z=2, at the time ($t_{12}$), it is branched YES from "is Y=1?" in the normal rotation check loop and from "is Z=2?" branched to YES. At "motor stop" the frame counter (213) presumes that the counting three film frames have been completed to output a completion signal (OK). The auto-set control portion (223) received a completion signal (OK) makes the normal signal (GO) at the L level to stop the motor (206). At "auto-set completion display", the display control portion (229) lits the rolling-up display member (225), after the portion (229) receives the completion signal (OK) by means of a display output (PSP). Seeing the display member lits the operator notices that an auto-set operation is completed i success. The flowchart shown in FIG. 24 concerning an auto-set operation is completely finished at END.

The operation in that the automatic rolling-back (autoreturn) operation and the auto-set operation is made in failure will be explained. FIGS. 21 and 22, respectively, show the graph (G2). As shown in FIGS. 21 and 22, the operation until the time ($t_7$) is the same as that of the graph (G1) mentioned above and the description for the operation will be deleted. During the auto-set operation in FIG. 24 through the start operation of FIG. 23, a film part (202) of the length corresponding to about single frame is rolled up reaching the time ($t_7$). After that, at (tr) after (Tp)–(Tp<Ts), it is presumed that the film is jammed or stopped. At ($t_7$), the supply signal (a) downs, it is escaped from the third supply check loop in the normal rotation check loop in the flow chart through "is L level?", in "edge counter addition", x becomes 7. At "is Y=1?" and ($t_6$), because Y=0, it is branched to NO. At "pulse counter addition", presuming Y=1 and returning to "timer reset". AT "is H level?", the time (tr) is at the L level and it is branched to NO. Next at "is it in time?", it is still $T < \alpha$ and it is branched to YES, so that the second supply check loop is continued. When the content (T) of the timer (219) reaches the standard ($\alpha$) or $T \geq \alpha$ is obtained, a failure signal (NG) is output from the timer (219) and branched to NO through "is it in time?" in the second supply check loop and it reaches ②. Here, the flowchart is transferred to ② of FIG. 25 and at the first "motor reverse rotation" the auto-return control portion (222) raises the reverse rotation signal (RV) to the H level after it receives the failure signal (NG) and the auto-st control portion (223) after this signal (RV) downs the normal rotation signal (GO) to the L level. The motor control portion (224) detects the level change of the signal to changeover the polarity of the drive signal (h) and to reverse turn the motor (226). When the motor (226) rotates reversely, reverse rotation force of the changeover gear portion (207) is transferred to the rolling-back mechanism portion (205) and the mechanism portion (205) rotates the care (201a) of the patrone (201) along its rewinding direction, starting the rewinding rotation of the film (202) into the patrone (201) at the time (tr').

Figure 25:
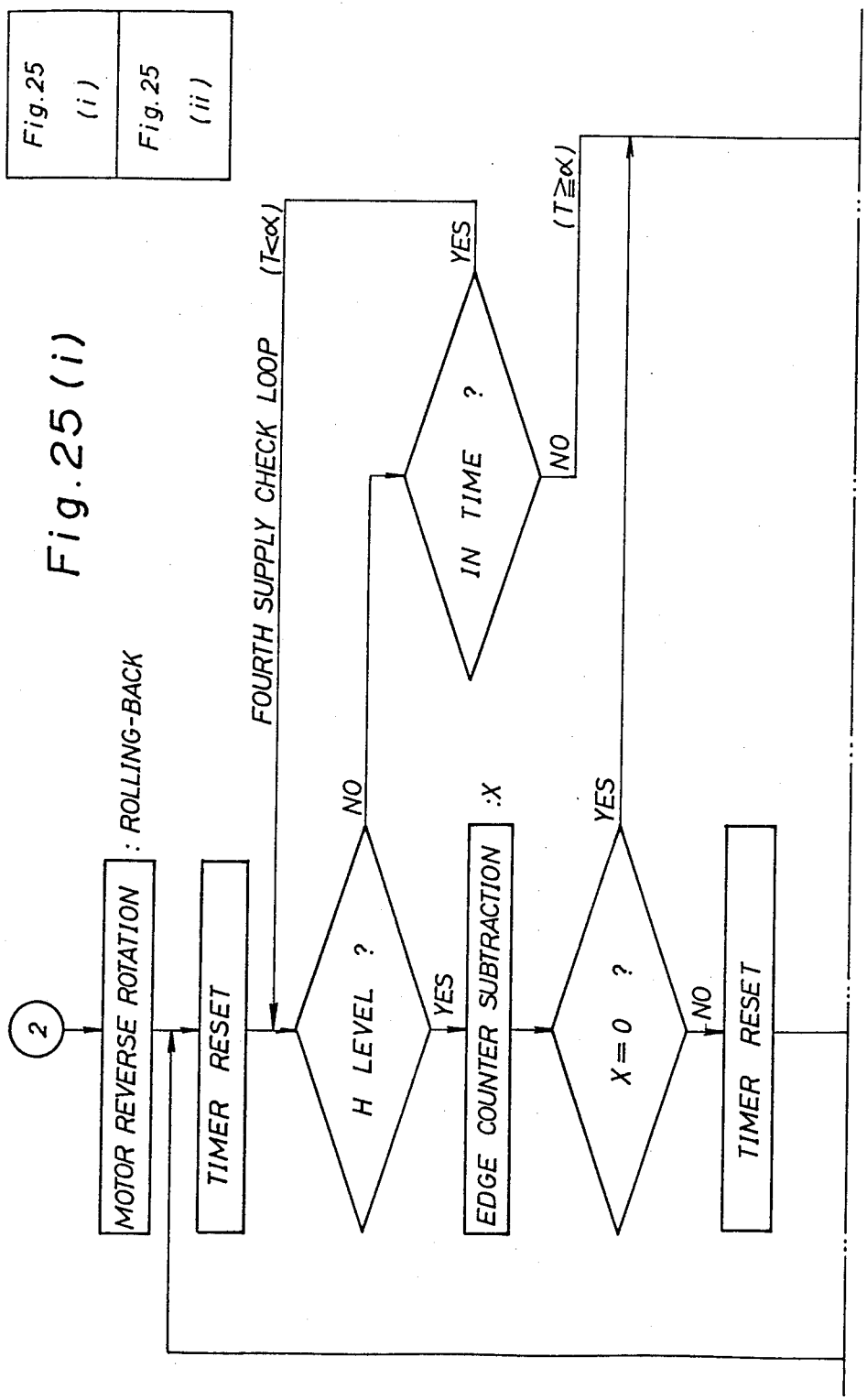
FIG. 25 is another flow chart of an automatic return in the flow chart showing the operative order in FIG. 20.

Returning to the flow chart of FIG. 25, the timer control portion (220) received the reverse rotation signal (RV) raised to the H level outputs a reset signal (R) at the next "timer reset" and resetting the timer (219) to T=0 to start again. Further, the reverse rotation signal (RV) is output to the integrated counting portion (214) and the edge counter (211) is changed to successively subtract.

At "is it H level?", the timer control portion (220) checks the level of the film supply pulse (a) and branched to NO, presuming it is at the L level during from the ($t_r'$) of reverse rotation start to the time (Tp) and it is branched to YES through the similar conditional branch "is it in time?". It is again returned to "is it H level?" and the same operations will be repeated, which operational loop is called the fourth supply check loop. The dummy sprocket which has been normally rotated for the time duration (Tp) from the time ($t_7$) of downing of the supply pulse (a) to the time ($t_r$) starts its reverse rotation from the time ($t_r'$) for the time duration (Tp) until the time ($t_7'$) corresponding to in position the time ($t_7$), at the time the supply pulse (a) rises. At that time, "is it H level?" in the fourth supply loop is branched to YES and at the next "edge counter subtraction" the edge counter (11) after receiving the edge output (b) output at the time ($t_7'$) carries out a subtraction of $X=7-1=6$. At the next conditional branch "is Z=0?", the auto-return control portion (222) checks the count-zero signal (zc). Because it is $X=6$ and not yet reached zero (0), resulting in no output and branching to NO. At the next "timer reset", the edge detecting portion (210) confirms that $X\ne 0$ or X doesn't equal to zero owing to the reverse signal (RV) is of a H level and instantly releases the reset prohibition signal (INH). The timer control portion (220) after receiving this signal (INH) outputs a reset signal (R) to reset the timer (219) to $T=0$ and makes it restart.

At the next conditional branch "is it L level?" the timer control portion (220) checks the level of the supply pulse (a) and it is still at the L level since it is not far from the time ($t_7$), and it is branched to NO. Then it is branched to YES in "is it in time?" and returned to "is it L level?" and the same operation repeated. This operational loop is called a fifth supply check loop. rewinding operation of the film (202) is continued and the reverse rotation of the dummy sprocket (208) is continued and the supply pulse (a) reaches the time ($T_6'$) and downs. Then, in the flow chart, it is branched to YES at "is it L level?" in the fifth supply check loop and out of the loop. In next step "edge counter subtraction", it is obtained of $X=6-1=5$ and branched to NO at the next "is X=0?" and returned to "timer reset" again. The operation above is repeated and it is called a reverse rotation check loop.

As shown in the graph (G2) of FIG. 22, the contents of the edge counter (211) at each time ($t_5'$)-($t_2'$) are subtracted successively and at ($t_2'$) it becomes $X=1$, and at ($t_0'$) it is branched to YES at "is H level?" in the fourth supply check loop. In next step "edge counter subtraction" the content of the edge counter (211) becomes $X=1-1=0$. Because X becomes zero (0), it outputs a zero count signal (zc). Because the auto-return control portion (222) at the next "is X=0?" receives a zero-count signal (zc), and the reverse signal (RV) is downed to the L level to branch it to YES. At the next "motor stop", the motor control portion (224) receives the reverse rotation signal (RV) at the L level to shut-out a drive signal (h) to stop the motor (206). The display control portion (229) after received the reverse signal (RV) at the L level lits the rolling-up side display member (225) at the next "auto-set failure display" in order to inform the operator of the varifocal camera according to the present invention of the failure of the auto-set operation. At last, at END the auto-return operation is finished.

An auto-return operation carried out when a supply (running) of the film (202) at the time the supply pulse (a) at the L level is stopped has been explained above and the operation is carried out when the supply pulse (a) at the H level. For example, even the supply of film (202) is stopped at any time during the times ($t_8$)-($t_9$), similar operation mentioned above is carried out. In this case, there is the difference from the former operation of the case above on only that it is branched from "is it in time?" in third supply check loop of the flow chart shown in FIG. 24 to 2 through a branching of NO and the content of the edge counter (211) is started of subtraction successively from $X=8$.

As mentioned above, according to the embodiment of the present invention, the film (202) is rolled up due to an autoset operation and simultaneously a supply pulse (a) is output. The number of rising and downing edges of the supply pulse (a) is counted and the timer (219) is reset everytime the edges above are counted to restart the timer (219). When the supply (rolling-up) of the film (202) is stopped and the standard time ($\alpha$) is over, the motor (206) is reversely turn to return the film (2) into the patrone (201) until the counted value of the counting operation becomes $X=0$ (zero). Consequently, when the auto-set operation is failed to do and the rear cover is open for recharging a roll of film, the film (202) has been already returned to the condition just before the auto-set operation. As a result, as in the conventional mechanism of the camera, troublesome procedure for pulling out the film part pulled into the spool (203) is not necessary. According to the present invention, a recharging of the roll film can be carried out very easily by pulling newly a part of the film (202) out of the patrone (201) at a sufficient length so as to have the perforations (202a) of the leading portion (202c) of the film (202) engaged with the gear (203a) for rolling up the film.

Concerning an exposition of the film (202) due to opening of the rear cover, it is the smallest length in necessary for the film to be pulled out in the present invention without wasteful exposition on the length film. As a result, not only the film can be effectively used, but also the precious visual records can not be disappeared because any film part which has been shot has been rewound in the patrone.

According to another embodiment of the present invention, for example, the rotary direction of the motor (206) is not limited to be normally rotated when the film is rolled-up and reversely rotated when it is rewound, and the rotation direction of the motor can be freely determined according to the particular construction of the film rolling-up mechanism portion (204) and of the rewinding mechanism portion (205).

Concerning each counter (211), (212) and (213) of the integrated counting portion (214), it is not restricted so as to add them when the film (202) is rolled-up and to subtract when it is rewound, they can be constructed so as to reverse the calculation according to the concrete structure of the timer (219) and the operative relationship to other parts.

On the dummy sprocket (208), it can be constructed to engage with the perforations (202b) on the opposite side, not to the perforations (202a), according to their position convenience. On a supply condition detection of the film (202), it is not limited to some mechanical means, such as the dummy sprocket (208) and any optical means which can be detect the feeding condition of the film (202) can be employed.

The film length to be rolled-up during an auto-set operation is not limited to the film part for three frames. As a result, in the flow chart of FIG. 24, it is not limited to the branch "is Z=2?" and the number of the frame can be increased or decreased when a suitable length of film is firmly obtained.

Concerning the number of the supply pulse (a), it is not limited to two for a single frame and it is possible to use another number, such as three (3) or four (4) in case that it is determined according to the control precision of film feeding operation, its speed, and manufacturing cost of the mechanism.

On the pulse counter, it is not limited to Y=0 when the content of the pulse counter becomes Y=1, it is possible to construct the counter so as to add successively Y=0, 1, 2, 3—and output a counting output (d) everytime it is even number excepting Y=0.

In addition, when the integrated counting portion (214) receives a reverse rotation signal (RV) at the H level, it is not limited to the edge counter (211) to be changed over to subtraction operation and it is possible to changeover the pulse counter (212) and the frame counter (213), simultaneously to their subtraction calculation manner.

What is claimed is:

1. A varifocal camera comprising:
   a photographic lens barrel having a photographic lens for changing a focal distance between a first focal distance and a second focal distance, said photographic lens barrel being adapted to move along an optical axis of said camera rearwardly when said photographic lens is transferred to said first focal distance side and to move along said optical axis forwardly when said photographic lens is transferred to aid second focal distance side;
   a finder barrier disposed on a camera body for screening a finder lens and being adapted to move between a first opening position at which said finder lens is exposed and a first closing position at which said finder lens is screened;
   a cam means disposed on a camera body movably between a first position and a second position, said cam means connected to said finder barrier so as to be at said first position when said finder barrier is at said first opening position and to be at said second position when said finder barrier is at said first closing position, said cam means being adapted to transmit a first signal when said cam means is at said first position and to transmit a second signal when said cam means is at said second position, said cam means having an inclined surface inclining along said optical axis in a forward direction of said lens barrel;
   a drive member disposed on said lens barrel movably between a third position and a fourth position and being adapted to be pressed with said inclined surface at said third position when said cam means is at said second position an to separate from said inclined surface at said fourth position when said cam means is at said first position;
   a photographic lens barrier disposed on said lens barrel for screening said photographic lens and being adapted to move between a second opening position at which said photographic lens is exposed and a second closing position at which said photographic lens is screened, said photographic lens barrier being adapted to be at said second opening position when said drive member is at said fourth position and to be at said second closing position when said drive member is at said third position; and
   a shutter release control means for preventing a shutter release operation on receiving said second signal from said cam means and allowing said shutter release operation on receiving said first signal from said cam mans.

2. A varifocal camera according to claim 1, wherein said drive member is adapted to rotate around an axis parallel to said optical axis.

* * * * *